US012644513B2

(12) United States Patent
  Kuhl et al.

(10) Patent No.: US 12,644,513 B2
(45) Date of Patent: Jun. 2, 2026

(54) CONTINUOUSLY VARIABLE TRANSMISSION

(71) Applicant: Polaris Industries Inc., Medina, MN (US)

(72) Inventors: Amery D. Kuhl, Wyoming, MN (US); Jacob Jain, Balsam Lake, WI (US); David J. Hicke, Chisago City, MN (US); Stephen L Nelson, Osceola, WI (US); Anthony J. Ripley, Ham Lake, MN (US)

(73) Assignee: POLARIS INDUSTRIES INC., Medina, MN (US)

( * ) Notice: Subject to any disclaimer, the term of this patent is extended or adjusted under 35 U.S.C. 154(b) by 0 days.

(21) Appl. No.: 18/813,616

(22) Filed: Aug. 23, 2024

(65) Prior Publication Data

US 2024/0410465 A1     Dec. 12, 2024

Related U.S. Application Data

(60) Division of application No. 17/947,430, filed on Sep. 19, 2022, now Pat. No. 12,072,018, which is a
(Continued)

(51) Int. Cl.
  *F16H 57/04*      (2010.01)
  *B60K 11/06*      (2006.01)
  *F16H 57/027*     (2012.01)

(52) U.S. Cl.
  CPC ....... *F16H 57/0489* (2013.01); *F16H 57/027* (2013.01); *F16H 57/0416* (2013.01); *B60K 11/06* (2013.01); *B60Y 2400/72* (2013.01)

(58) Field of Classification Search
  CPC ............ F16H 57/0489; F16H 57/0416; F16H 57/035; F16H 57/0415; F16H 57/027; B60K 11/06; B60Y 2400/72
  See application file for complete search history.

(56) References Cited

U.S. PATENT DOCUMENTS

| | | |
|---|---|---|
| 62,016 A | 2/1867 | Custer |
| 2,145,545 A | 1/1939 | Johnson et al. |

(Continued)

FOREIGN PATENT DOCUMENTS

| | | |
|---|---|---|
| AU | 2012323853 A1 | 5/2014 |
| CA | 2851626 A1 | 4/2013 |

(Continued)

OTHER PUBLICATIONS

"2011 Polaris Ranger RZR XP 900 First Look-Motorcycle USA", www.motorcycle-usa.com/2011/01/article/2011-polaris-ranger-rzr-xp-900-first-look/, Jan. 3, 2011; 10 pages.
(Continued)

*Primary Examiner* — Henry Y Liu
(74) *Attorney, Agent, or Firm* — SCHWEGMAN LUNDBERG & WOESSNER, P.A.

(57) ABSTRACT

A vehicle may include a continuously variable transmission which requires non-recycled air. The continuously variable transmission may provide non-recycled air to a first number of sheaves of the continuously variable transmission with a second number of air supply conduits, the second number being less than the first number. A cover of the continuously variable transmission may have a unitary body.

10 Claims, 37 Drawing Sheets

Related U.S. Application Data continuation of application No. 17/515,461, filed on Oct. 30, 2021, now Pat. No. 11,879,542, which is a continuation of application No. 16/855,394, filed on Apr. 22, 2020, now Pat. No. 11,306,815, which is a continuation of application No. 14/475,385, filed on Sep. 2, 2014, now Pat. No. 10,648,554.

(56)                References Cited

U.S. PATENT DOCUMENTS

| | | | |
|---|---|---|---|
| 2,953,032 A | 9/1960 | Ruess | |
| 3,465,827 A | 9/1969 | Levy et al. | |
| 3,467,177 A | 9/1969 | Hoddinott | |
| 3,623,565 A | 11/1971 | Ward et al. | |
| 3,651,506 A * | 3/1972 | Olaf | B65G 43/02 |
| | | | 324/67 |
| 3,750,129 A * | 7/1973 | Takeno | G01N 27/82 |
| | | | 198/810.02 |
| 3,789,684 A | 2/1974 | Freier | |
| 3,861,229 A * | 1/1975 | Domaas | F16H 55/563 |
| | | | 474/14 |
| 3,943,785 A | 3/1976 | Percifield | |
| 4,319,298 A | 3/1982 | Davis et al. | |
| 4,340,126 A | 7/1982 | Larson | |
| 4,395,249 A | 7/1983 | Prasad et al. | |
| 4,422,498 A | 12/1983 | Chen | |
| 4,493,677 A | 1/1985 | Ikenoya | |
| 4,531,928 A | 7/1985 | Ikenoya | |
| 4,560,369 A | 12/1985 | Hattori | |
| 4,594,537 A | 6/1986 | Arifian et al. | |
| 4,596,537 A * | 6/1986 | Te-Long | F16H 9/12 |
| | | | 474/93 |
| 4,621,727 A * | 11/1986 | Strader | B65G 43/02 |
| | | | 340/676 |
| 4,622,865 A | 11/1986 | Itoh et al. | |
| 4,631,977 A * | 12/1986 | Kawashima | B62M 9/06 |
| | | | 474/93 |
| 4,632,070 A | 12/1986 | Onda et al. | |
| 4,645,028 A | 2/1987 | Kawashima | |
| 4,671,781 A | 6/1987 | Tanaka et al. | |
| 4,671,782 A * | 6/1987 | Ochiai | F16H 57/0415 |
| | | | 474/93 |
| 4,682,511 A | 7/1987 | Wittke | |
| 4,697,665 A * | 10/1987 | Eastman | F16H 55/56 |
| | | | 180/311 |
| 4,708,699 A * | 11/1987 | Takano | F16H 57/0006 |
| | | | 474/93 |
| 4,712,629 A | 12/1987 | Takahashi et al. | |
| 4,809,179 A | 2/1989 | Klingler et al. | |
| 4,826,205 A | 5/1989 | Kouda et al. | |
| 4,854,446 A * | 8/1989 | Strader | B65G 43/02 |
| | | | 340/676 |
| 4,895,555 A * | 1/1990 | Watanabe | F16G 1/28 |
| | | | 474/263 |
| 4,905,461 A | 3/1990 | Heuer | |
| 4,905,783 A | 3/1990 | Bober | |
| 4,990,126 A * | 2/1991 | Ideta | F16H 57/037 |
| | | | 475/210 |
| 5,025,686 A | 6/1991 | Sato et al. | |
| 5,052,990 A | 10/1991 | Sakakibara et al. | |
| 5,057,061 A | 10/1991 | Sakakibara et al. | |
| 5,080,639 A | 1/1992 | Sakakibara et al. | |
| 5,086,858 A | 2/1992 | Mizuta et al. | |
| 5,094,652 A | 3/1992 | Sakakibara et al. | |
| 5,152,361 A | 10/1992 | Hasegawa et al. | |
| 5,191,755 A | 3/1993 | Gryspeerdt | |
| 5,233,530 A | 8/1993 | Shimada et al. | |
| 5,282,773 A | 2/1994 | Gryspeerdt | |
| 5,334,103 A | 8/1994 | Gryspeerdt | |
| 5,362,094 A | 11/1994 | Jensen | |
| 5,378,198 A | 1/1995 | Moroto et al. | |
| 5,432,326 A | 7/1995 | Noblett et al. | |
| 5,514,046 A | 5/1996 | Petersmann et al. | |
| 5,536,214 A * | 7/1996 | Akita | F16G 1/28 |
| | | | 474/268 |
| 5,749,596 A | 5/1998 | Jensen et al. | |
| 5,807,194 A * | 9/1998 | Knutson | B29D 29/08 |
| | | | 474/237 |
| 5,890,870 A | 4/1999 | Berger et al. | |
| 5,897,287 A | 4/1999 | Berger et al. | |
| 5,976,044 A * | 11/1999 | Kuyama | F16H 57/0489 |
| | | | 474/146 |
| 5,976,054 A | 11/1999 | Yasuoka | |
| 6,047,814 A * | 4/2000 | Alles | B65G 43/02 |
| | | | 198/810.02 |
| 6,050,911 A | 4/2000 | Feuchter et al. | |
| 6,120,411 A | 9/2000 | Booth, Jr. | |
| 6,149,540 A * | 11/2000 | Johnson | F16H 61/66227 |
| | | | 474/46 |
| 6,176,796 B1 | 1/2001 | Lislegard | |
| 6,182,784 B1 | 2/2001 | Pestotnik | |
| 6,189,412 B1 * | 2/2001 | Tsubata | F16H 61/0009 |
| | | | 74/606 R |
| 6,254,108 B1 | 7/2001 | Germain et al. | |
| 6,257,081 B1 | 7/2001 | Gagnon et al. | |
| 6,264,577 B1 * | 7/2001 | Hutchins | B60C 23/0493 |
| | | | 198/810.02 |
| 6,267,700 B1 * | 7/2001 | Takayama | F16H 57/0489 |
| | | | 474/93 |
| 6,338,688 B1 * | 1/2002 | Minami | F16H 57/035 |
| | | | 474/146 |
| 6,379,278 B1 | 4/2002 | Eguchi et al. | |
| 6,383,102 B1 | 5/2002 | Onogi | |
| 6,398,680 B1 | 6/2002 | Onogi | |
| 6,445,038 B1 | 9/2002 | Tihanyi | |
| 6,468,170 B1 | 10/2002 | Ito | |
| 6,494,798 B1 | 12/2002 | Onogi | |
| 6,657,539 B2 | 12/2003 | Yamamoto et al. | |
| 6,669,589 B2 | 12/2003 | Onogi | |
| 6,715,602 B1 * | 4/2004 | Gartland | B65G 43/02 |
| | | | 340/676 |
| 6,764,421 B2 | 7/2004 | Onogi | |
| 6,820,708 B2 | 11/2004 | Nakamura | |
| 6,848,348 B2 | 2/2005 | Liao | |
| 6,902,502 B2 | 6/2005 | Murakami et al. | |
| 6,908,405 B2 | 6/2005 | Otaki et al. | |
| 6,938,508 B1 | 9/2005 | Saagge | |
| 6,938,676 B2 | 9/2005 | Lan et al. | |
| 6,962,543 B2 | 11/2005 | Roby | |
| 6,997,832 B2 | 2/2006 | Onogi | |
| 7,002,454 B1 | 2/2006 | Gustafson | |
| 7,058,490 B2 | 6/2006 | Kim | |
| 7,062,987 B2 | 6/2006 | Yoshida et al. | |
| 7,070,527 B1 | 7/2006 | Saagge | |
| 7,086,837 B2 | 8/2006 | Kamoshita et al. | |
| 7,237,638 B2 | 7/2007 | Ishikawa et al. | |
| 7,282,010 B2 | 10/2007 | Iriyama et al. | |
| 7,363,999 B2 | 4/2008 | Hastings | |
| 7,367,420 B1 | 5/2008 | Sherrod et al. | |
| 7,392,893 B2 | 7/2008 | Inomoto et al. | |
| 7,407,462 B2 | 8/2008 | Tsukada et al. | |
| 7,427,248 B2 * | 9/2008 | Chonan | F16H 57/0415 |
| | | | 474/93 |
| 7,438,147 B2 | 10/2008 | Kato et al. | |
| 7,454,282 B2 | 11/2008 | Mizuguchi | |
| 7,505,842 B2 | 3/2009 | Luh | |
| 7,556,576 B2 | 7/2009 | Mochizuki et al. | |
| 7,641,588 B2 | 1/2010 | Thomson et al. | |
| 7,686,123 B2 * | 3/2010 | Ishida | F28F 3/12 |
| | | | 180/311 |
| 7,688,557 B2 | 3/2010 | Ishioka | |
| 7,731,613 B2 | 6/2010 | Ishida et al. | |
| 7,744,505 B2 | 6/2010 | Tanaka et al. | |
| 7,771,299 B2 | 8/2010 | Mochizuki et al. | |
| 7,823,891 B2 | 11/2010 | Bushko et al. | |
| 7,901,319 B2 | 3/2011 | Tabata et al. | |
| 7,905,803 B2 | 3/2011 | Mochizuki et al. | |
| 7,980,972 B1 | 7/2011 | Starkey et al. | |
| 8,002,061 B2 * | 8/2011 | Yamamura | B60K 11/00 |
| | | | 180/68.1 |
| 8,029,395 B2 | 10/2011 | Hokari et al. | |

(56)                  References Cited

U.S. PATENT DOCUMENTS

| | | | |
|---|---|---|---|
| 8,052,572 B2 | 11/2011 | Unno | |
| 8,069,975 B2 * | 12/2011 | Wallace | B65G 43/02 |
| | | | 198/810.02 |
| 8,104,524 B2 | 1/2012 | Manesh et al. | |
| 8,109,308 B2 | 2/2012 | Manesh et al. | |
| 8,157,039 B2 | 4/2012 | Melvin et al. | |
| 8,176,957 B2 | 5/2012 | Manesh et al. | |
| 8,256,563 B2 | 9/2012 | Suzuki et al. | |
| 8,381,855 B2 | 2/2013 | Suzuki et al. | |
| 8,382,620 B2 * | 2/2013 | Morita | F16H 9/18 |
| | | | 474/144 |
| 8,439,141 B2 | 5/2013 | Bessho et al. | |
| 8,442,731 B2 | 5/2013 | Unno | |
| 8,459,397 B2 | 6/2013 | Bessho et al. | |
| 8,460,138 B2 | 6/2013 | Unno | |
| 8,517,136 B2 | 8/2013 | Hurd et al. | |
| 8,534,397 B2 | 9/2013 | Grajkowski et al. | |
| 8,534,413 B2 | 9/2013 | Nelson et al. | |
| 8,556,015 B2 | 10/2013 | Itoo et al. | |
| 8,596,406 B2 | 12/2013 | Itoo et al. | |
| 8,613,335 B2 * | 12/2013 | Deckard | F16H 57/027 |
| | | | 180/68.1 |
| 8,662,290 B2 * | 3/2014 | Twigger | B65G 43/02 |
| | | | 198/810.01 |
| 8,682,550 B2 | 3/2014 | Nelson et al. | |
| 8,684,887 B2 | 4/2014 | Krosschell | |
| 8,746,719 B2 | 6/2014 | Safranski et al. | |
| 8,834,307 B2 | 9/2014 | Itoo et al. | |
| 8,840,496 B2 | 9/2014 | Yamanishi et al. | |
| 8,910,777 B2 * | 12/2014 | Minkin | B65G 15/36 |
| | | | 198/810.02 |
| 8,911,312 B2 | 12/2014 | Itoo et al. | |
| 8,950,290 B2 | 2/2015 | Dieter et al. | |
| 8,991,594 B2 * | 3/2015 | Nakamura | B65G 43/02 |
| | | | 324/228 |
| 8,997,908 B2 | 4/2015 | Kinsman et al. | |
| 8,997,952 B2 | 4/2015 | Getz et al. | |
| 9,027,937 B2 | 5/2015 | Ryan et al. | |
| 9,108,470 B2 | 8/2015 | Tercha et al. | |
| 9,151,384 B2 | 10/2015 | Kohler et al. | |
| 9,162,573 B2 | 10/2015 | Grajkowski et al. | |
| 9,205,717 B2 | 12/2015 | Brady et al. | |
| 9,211,924 B2 | 12/2015 | Safranski et al. | |
| 9,341,255 B2 | 5/2016 | Itoo et al. | |
| 9,365,251 B2 | 6/2016 | Safranski et al. | |
| 9,366,331 B2 | 6/2016 | Eberhardt | |
| 9,429,235 B2 | 8/2016 | Krosschell et al. | |
| 9,453,573 B2 * | 9/2016 | Renner | F16H 57/0416 |
| 9,566,858 B2 | 2/2017 | Hicke et al. | |
| 9,665,418 B2 | 5/2017 | Arnott et al. | |
| 9,695,899 B2 | 7/2017 | Smith et al. | |
| 9,718,351 B2 | 8/2017 | Ripley et al. | |
| 9,771,084 B2 | 9/2017 | Norstad | |
| 9,797,485 B2 | 10/2017 | Ebihara et al. | |
| 9,802,621 B2 | 10/2017 | Gillingham et al. | |
| 9,863,523 B2 | 1/2018 | Stocks et al. | |
| 9,909,659 B2 | 3/2018 | Bessho et al. | |
| 9,920,810 B2 | 3/2018 | Smeljanskij et al. | |
| 9,969,259 B2 | 5/2018 | Safranski et al. | |
| 10,086,698 B2 | 10/2018 | Grajkowski et al. | |
| 10,183,605 B2 | 1/2019 | Weber et al. | |
| 10,246,153 B2 | 4/2019 | Deckard et al. | |
| 10,363,941 B2 | 7/2019 | Norstad | |
| 10,369,861 B2 | 8/2019 | Deckard et al. | |
| 10,369,886 B2 | 8/2019 | Safranski et al. | |
| 10,406,884 B2 | 9/2019 | Oakden-Graus et al. | |
| 10,578,184 B2 | 3/2020 | Gilbert et al. | |
| 10,697,532 B2 | 6/2020 | Schleif et al. | |
| 10,704,640 B2 | 7/2020 | Galasso et al. | |
| 10,723,408 B2 | 7/2020 | Pelot | |
| 10,731,724 B2 | 8/2020 | Laird et al. | |
| 10,774,896 B2 | 9/2020 | Hamers et al. | |
| 10,780,770 B2 | 9/2020 | Kohler et al. | |
| 10,933,710 B2 | 3/2021 | Tong | |

| | | | |
|---|---|---|---|
| 10,981,429 B2 | 4/2021 | Tsiaras et al. | |
| 10,981,448 B2 | 4/2021 | Safranski et al. | |
| 11,001,120 B2 | 5/2021 | Cox | |
| 11,148,748 B2 | 10/2021 | Galasso | |
| 11,162,555 B2 | 11/2021 | Haugen | |
| 11,192,424 B2 | 12/2021 | Tabata et al. | |
| 11,279,198 B2 | 3/2022 | Marking | |
| 11,306,798 B2 | 4/2022 | Cox et al. | |
| 11,351,834 B2 | 6/2022 | Cox | |
| 11,413,924 B2 | 8/2022 | Cox et al. | |
| 11,448,283 B2 | 9/2022 | Strickland | |
| 11,472,252 B2 | 10/2022 | Tong | |
| 11,543,005 B2 | 1/2023 | Zurbruegg et al. | |
| 11,578,793 B2 | 2/2023 | Nelson et al. | |
| 11,649,889 B2 | 5/2023 | Nelson et al. | |
| 11,840,142 B2 | 12/2023 | Safranski et al. | |
| 12,007,014 B2 | 6/2024 | Nelson et al. | |
| 12,092,198 B2 | 9/2024 | Nelson et al. | |
| 2002/0028727 A1 | 3/2002 | Iida et al. | |
| 2002/0125675 A1 | 9/2002 | Clements et al. | |
| 2003/0096668 A1 | 5/2003 | Yoshida et al. | |
| 2004/0024515 A1 | 2/2004 | Troupe et al. | |
| 2004/0026880 A1 | 2/2004 | Bundy | |
| 2004/0094343 A1 | 5/2004 | Fukuda | |
| 2004/0097328 A1 | 5/2004 | Makiyama et al. | |
| 2004/0116245 A1 | 6/2004 | Yamamoto et al. | |
| 2004/0149049 A1 * | 8/2004 | Kuzik | B65G 43/02 |
| | | | 73/862.453 |
| 2004/0171457 A1 | 9/2004 | Fuller | |
| 2004/0195019 A1 | 10/2004 | Kato et al. | |
| 2004/0195034 A1 | 10/2004 | Kato et al. | |
| 2004/0224806 A1 * | 11/2004 | Chonan | F16H 57/0415 |
| | | | 474/93 |
| 2004/0262132 A1 * | 12/2004 | Pauley | B65G 43/02 |
| | | | 198/810.02 |
| 2005/0049772 A1 | 3/2005 | Liu | |
| 2005/0077696 A1 | 4/2005 | Ogawa | |
| 2005/0096822 A1 | 5/2005 | Aoki | |
| 2005/0205313 A1 | 9/2005 | Gilmore et al. | |
| 2005/0217953 A1 | 10/2005 | Bossard | |
| 2005/0272540 A1 | 12/2005 | Starkey | |
| 2006/0032690 A1 | 2/2006 | Inomoto et al. | |
| 2006/0055531 A1 * | 3/2006 | Cook | B60C 23/0408 |
| | | | 340/539.22 |
| 2006/0090942 A1 * | 5/2006 | Hastings | F16H 57/0489 |
| | | | 180/68.1 |
| 2006/0114452 A1 * | 6/2006 | Schnell | B65G 43/02 |
| | | | 356/237.1 |
| 2006/0137920 A1 | 6/2006 | Aoki et al. | |
| 2006/0213703 A1 | 9/2006 | Long | |
| 2006/0229811 A1 | 10/2006 | Herman et al. | |
| 2006/0270503 A1 * | 11/2006 | Suzuki | F16H 57/0415 |
| | | | 474/93 |
| 2007/0004552 A1 | 1/2007 | Matsudaira et al. | |
| 2007/0007742 A1 | 1/2007 | Allen et al. | |
| 2007/0026982 A1 | 2/2007 | Aoyama | |
| 2007/0054763 A1 | 3/2007 | Mochizuki et al. | |
| 2007/0111854 A1 | 5/2007 | Tabata et al. | |
| 2007/0207884 A1 | 9/2007 | Unno | |
| 2007/0219030 A1 | 9/2007 | Ho | |
| 2007/0244619 A1 | 10/2007 | Peterson | |
| 2007/0260372 A1 | 11/2007 | Langer | |
| 2008/0035428 A1 | 2/2008 | Omoto et al. | |
| 2008/0103019 A1 | 5/2008 | Cronin et al. | |
| 2008/0108463 A1 | 5/2008 | Unno | |
| 2008/0178838 A1 | 7/2008 | Ota | |
| 2008/0182713 A1 | 7/2008 | Asaoka | |
| 2008/0183350 A1 | 7/2008 | Noguchi | |
| 2008/0183357 A1 | 7/2008 | Asaoka | |
| 2008/0183359 A1 | 7/2008 | Sawada | |
| 2008/0194380 A1 | 8/2008 | Unno | |
| 2008/0215217 A1 | 9/2008 | Unno | |
| 2008/0257692 A1 * | 10/2008 | Wallace | B65G 43/02 |
| | | | 198/810.02 |
| 2008/0283326 A1 * | 11/2008 | Bennett | B62K 5/01 |
| | | | 180/246 |
| 2008/0284124 A1 * | 11/2008 | Brady | F16H 57/0489 |
| | | | 280/124.135 |

(56)                References Cited

U.S. PATENT DOCUMENTS

| 2008/0287256 A1 | 11/2008 | Unno |
| 2008/0314676 A1* | 12/2008 | Ishida ................... F16H 57/035 |
| | | 474/144 |
| 2008/0319596 A1 | 12/2008 | Yamada |
| 2009/0020966 A1 | 1/2009 | Germain |
| 2009/0050386 A1* | 2/2009 | Nobuhira ................ B62J 17/02 |
| | | 180/219 |
| 2009/0101482 A1* | 4/2009 | Kusel ..................... B65G 43/02 |
| | | 198/810.01 |
| 2009/0105039 A1 | 4/2009 | Sah et al. |
| 2009/0175863 A1 | 7/2009 | Kraus et al. |
| 2009/0239705 A1 | 9/2009 | Tawara et al. |
| 2009/0254249 A1 | 10/2009 | Ghoneim et al. |
| 2009/0291788 A1 | 11/2009 | Hokari et al. |
| 2009/0298627 A1 | 12/2009 | Johnson et al. |
| 2009/0308682 A1 | 12/2009 | Ripley et al. |
| 2010/0152982 A1 | 6/2010 | Bowman et al. |
| 2010/0155170 A1 | 6/2010 | Melvin et al. |
| 2010/0174456 A1 | 7/2010 | Beaudoin et al. |
| 2010/0184543 A1 | 7/2010 | Yamashita et al. |
| 2010/0280712 A1 | 11/2010 | Bowman |
| 2011/0029181 A1 | 2/2011 | Hyde et al. |
| 2011/0034279 A1 | 2/2011 | Yamaguchi et al. |
| 2011/0059821 A1 | 3/2011 | Lee et al. |
| 2011/0070991 A1 | 3/2011 | Wu et al. |
| 2011/0071712 A1 | 3/2011 | Mizuno et al. |
| 2011/0094818 A1 | 4/2011 | Suzuki et al. |
| 2011/0152020 A1 | 6/2011 | Brind et al. |
| 2011/0160696 A1 | 6/2011 | Hoss |
| 2011/0160969 A1 | 6/2011 | Oguri et al. |
| 2011/0166755 A1 | 7/2011 | Eguchi et al. |
| 2011/0190972 A1 | 8/2011 | Timmons et al. |
| 2011/0240394 A1 | 10/2011 | Hurd et al. |
| 2011/0297462 A1 | 12/2011 | Grajkowski et al. |
| 2011/0297463 A1 | 12/2011 | Grajkowski et al. |
| 2011/0301824 A1 | 12/2011 | Nelson et al. |
| 2011/0301825 A1 | 12/2011 | Grajkowski et al. |
| 2011/0306457 A1 | 12/2011 | Lee et al. |
| 2012/0031693 A1* | 2/2012 | Deckard ................... B23P 6/00 |
| | | 180/68.3 |
| 2012/0031694 A1* | 2/2012 | Deckard ............. F16H 57/0489 |
| | | 29/402.03 |
| 2012/0035019 A1 | 2/2012 | Martini et al. |
| 2012/0055728 A1* | 3/2012 | Bessho ................ B60K 17/344 |
| | | 180/292 |
| 2012/0055729 A1* | 3/2012 | Bessho ..................... B60K 5/04 |
| | | 180/309 |
| 2012/0137828 A1* | 6/2012 | Dieter ................... F16H 37/021 |
| | | 74/665 F |
| 2012/0178561 A1 | 7/2012 | Lafreniere et al. |
| 2012/0238384 A1 | 9/2012 | Lee et al. |
| 2012/0289370 A1* | 11/2012 | Yamanishi ............. B60K 17/08 |
| | | 474/93 |
| 2012/0309573 A1* | 12/2012 | Well ......................... F16G 1/10 |
| | | 474/205 |
| 2012/0316933 A1 | 12/2012 | Pentland et al. |
| 2012/0323371 A1* | 12/2012 | Ballhausen ................ F16G 1/28 |
| | | 700/275 |
| 2013/0001840 A1* | 1/2013 | Reck ..................... F16F 9/3292 |
| | | 156/60 |
| 2013/0033070 A1 | 2/2013 | Kinsman et al. |
| 2013/0040771 A1* | 2/2013 | Well ......................... F16G 1/28 |
| | | 474/205 |
| 2013/0087403 A1* | 4/2013 | Itoo ....................... F16H 57/035 |
| | | 180/339 |
| 2013/0090198 A1* | 4/2013 | Itoo ......................... F16H 57/03 |
| | | 474/93 |
| 2013/0090199 A1* | 4/2013 | Itoo .................... F16H 57/0416 |
| | | 474/93 |
| 2013/0092468 A1 | 4/2013 | Nelson et al. |
| 2013/0096785 A1 | 4/2013 | Kohler et al. |
| 2013/0096793 A1 | 4/2013 | Krosschell |
| 2013/0158823 A1 | 6/2013 | Dec |
| 2013/0220766 A1 | 8/2013 | Tadych et al. |
| 2013/0240272 A1 | 9/2013 | Gass et al. |
| 2013/0244819 A1 | 9/2013 | Eo et al. |
| 2014/0038755 A1 | 2/2014 | Ijichi et al. |
| 2014/0131176 A1* | 5/2014 | Minkin ................... B65G 15/36 |
| | | 198/810.02 |
| 2014/0232082 A1 | 8/2014 | Oshita et al. |
| 2014/0239602 A1 | 8/2014 | Blankenship et al. |
| 2014/0243125 A1 | 8/2014 | Koga et al. |
| 2014/0243134 A1* | 8/2014 | Kucharczyk ............. C08J 5/243 |
| | | 427/389.9 |
| 2014/0262584 A1* | 9/2014 | Lovold .................... B62K 5/01 |
| | | 180/246 |
| 2014/0342110 A1* | 11/2014 | Zhu ..................... C08G 18/4854 |
| | | 428/36.9 |
| 2014/0348671 A1 | 11/2014 | Pagliarin |
| 2015/0011344 A1 | 1/2015 | Ebihara et al. |
| 2015/0024890 A1* | 1/2015 | Eberhardt ............. F16H 57/031 |
| | | 474/144 |
| 2015/0046034 A1 | 2/2015 | Kikuchi |
| 2015/0061275 A1 | 3/2015 | Deckard et al. |
| 2015/0081171 A1 | 3/2015 | Ericksen et al. |
| 2015/0308560 A1* | 10/2015 | Itoo ..................... F16H 57/0489 |
| | | 474/146 |
| 2015/0308561 A1* | 10/2015 | Itoo ........................ F16H 57/027 |
| | | 474/146 |
| 2015/0329141 A1 | 11/2015 | Preijert |
| 2015/0377341 A1* | 12/2015 | Renner ............... F16H 57/0416 |
| | | 474/93 |
| 2016/0061088 A1* | 3/2016 | Minnichsoffer ....... F16H 57/035 |
| | | 60/320 |
| 2016/0061314 A1 | 3/2016 | Kuhl et al. |
| 2016/0121905 A1 | 5/2016 | Gillingham et al. |
| 2016/0121924 A1 | 5/2016 | Norstad |
| 2016/0176283 A1 | 6/2016 | Hicke et al. |
| 2016/0176284 A1 | 6/2016 | Nugteren et al. |
| 2016/0176287 A1 | 6/2016 | Ripley et al. |
| 2016/0186841 A1 | 6/2016 | Ebihara et al. |
| 2016/0200164 A1 | 7/2016 | Tabata et al. |
| 2016/0214455 A1 | 7/2016 | Reul et al. |
| 2016/0215878 A1 | 7/2016 | Hatajima |
| 2017/0002920 A1 | 1/2017 | Bessho et al. |
| 2017/0045131 A1 | 2/2017 | Yolitz |
| 2017/0087950 A1 | 3/2017 | Brady et al. |
| 2017/0106747 A1 | 4/2017 | Safranski et al. |
| 2017/0129298 A1 | 5/2017 | Lu et al. |
| 2017/0211467 A1 | 7/2017 | Hall et al. |
| 2017/0254405 A1* | 9/2017 | Ballhausen ............... F16G 1/10 |
| 2017/0268655 A1 | 9/2017 | Stocks et al. |
| 2017/0343101 A1 | 11/2017 | Yamamoto et al. |
| 2018/0009443 A1 | 1/2018 | Norstad |
| 2018/0037212 A1 | 2/2018 | Beyer |
| 2018/0045301 A1 | 2/2018 | Kato et al. |
| 2018/0126817 A1 | 5/2018 | Russell et al. |
| 2018/0178677 A1 | 6/2018 | Swain et al. |
| 2018/0180163 A1 | 6/2018 | Schleif et al. |
| 2018/0245682 A1 | 8/2018 | Davis |
| 2018/0264902 A1 | 9/2018 | Schroeder et al. |
| 2018/0312025 A1 | 11/2018 | Danielson et al. |
| 2018/0320777 A1 | 11/2018 | Becka et al. |
| 2018/0354336 A1 | 12/2018 | Oakden-Graus et al. |
| 2018/0361853 A1 | 12/2018 | Grajkowski et al. |
| 2019/0093745 A1 | 3/2019 | Younggren et al. |
| 2019/0193501 A1 | 6/2019 | Brady et al. |
| 2019/0210457 A1 | 7/2019 | Galsworthy et al. |
| 2019/0285150 A1 | 9/2019 | Zurbruegg et al. |
| 2019/0285159 A1 | 9/2019 | Nelson et al. |
| 2019/0285160 A1 | 9/2019 | Nelson et al. |
| 2019/0389478 A1 | 12/2019 | Norstad |
| 2020/0016953 A1 | 1/2020 | Oakden-Graus et al. |
| 2020/0096075 A1 | 3/2020 | Lindblad |
| 2020/0108709 A1 | 4/2020 | Kohler et al. |
| 2020/0164742 A1 | 5/2020 | Safranski et al. |
| 2020/0223279 A1 | 7/2020 | Mckeefery |
| 2020/0248793 A1 | 8/2020 | Kuhl et al. |
| 2020/0269648 A1 | 8/2020 | Halper |
| 2020/0282786 A1 | 9/2020 | Lorenz et al. |
| 2021/0031579 A1 | 2/2021 | Booth et al. |

(56) References Cited

U.S. PATENT DOCUMENTS

| 2021/0088100 | A1 | 3/2021 | Woelfel |
| 2021/0102596 | A1 | 4/2021 | Malmborg et al. |
| 2021/0108696 | A1 | 4/2021 | Connor |
| 2021/0206263 | A1 | 7/2021 | Grajkowski et al. |
| 2021/0300140 | A1 | 9/2021 | Ericksen et al. |
| 2021/0379957 | A1 | 12/2021 | Tabata et al. |
| 2022/0032708 | A1 | 2/2022 | Tabata et al. |
| 2022/0041029 | A1 | 2/2022 | Randall et al. |
| 2022/0056976 | A1 | 2/2022 | Anderson |
| 2022/0082167 | A1 | 3/2022 | Kuhl et al. |
| 2022/0088988 | A1 | 3/2022 | Menden et al. |
| 2022/0243810 | A1 | 8/2022 | Truskolaski et al. |
| 2022/0397194 | A1 | 12/2022 | Kohler et al. |
| 2023/0019039 | A1 | 1/2023 | Kuhl et al. |
| 2023/0083658 | A1 | 3/2023 | Nelson et al. |
| 2023/0184318 | A1 | 6/2023 | Nelson et al. |
| 2024/0271690 | A1 | 8/2024 | Nelson et al. |

FOREIGN PATENT DOCUMENTS

| CA | 2807101 | A1 | 8/2013 |
| CA | 2965309 | A1 | 5/2016 |
| CN | 101372930 | A | 2/2009 |
| CN | 101382193 | A | 3/2009 |
| CN | 101960175 | A | 1/2011 |
| CN | 103032535 | A | 4/2013 |
| CN | 103476621 | A | 12/2013 |
| CN | 103486233 | A | 1/2014 |
| CN | 103912664 | A | 7/2014 |
| CN | 103857576 | B | 8/2017 |
| CN | 107002859 | A | 8/2017 |
| CN | 107406094 | A | 11/2017 |
| CN | 107521449 | A | 12/2017 |
| CN | 107521499 | A | 12/2017 |
| DE | 4328551 | | 3/1994 |
| DE | 10231210 | A1 | 1/2004 |
| EP | 0421241 | A2 | 4/1991 |
| EP | 0829383 | A2 | 3/1998 |
| EP | 1022169 | A2 | 7/2000 |
| EP | 1238833 | A1 | 9/2002 |
| EP | 1865227 | A1 | 12/2007 |
| EP | 2131074 | A1 | 12/2009 |
| EP | 3150454 | A1 | 4/2017 |
| GB | 2377415 | A | 1/2003 |
| JP | 59-009365 | A | 1/1984 |
| JP | 59-077924 | | 5/1984 |
| JP | 2009-228708 | A | 10/2009 |
| JP | 2011-069457 | A | 4/2011 |
| JP | 5990365 | B2 | 9/2016 |
| WO | 98/50248 | A1 | 11/1998 |
| WO | 2014/059258 | A1 | 4/2014 |
| WO | 2016/069405 | A2 | 5/2016 |
| WO | 2017/187411 | A1 | 11/2017 |
| WO | 2018/118470 | A1 | 6/2018 |
| WO | 2019/126485 | A1 | 6/2019 |

OTHER PUBLICATIONS

"Alba Racing Belt Gauge", www.Maverick-forums.net; 8 pages.
"The Avid Off Racing BITD/SCORE factory Can Am Maverick race build", www.Maverickforums.net; Dec. 13, 2016; 31 pages.
"UTVOutpost.com-UTV Side by Side Parts, Accessories & Videos", http://www.utvoutpost.com/new-can-am-maverick-belt-cover-back-plate-transmission-clutch-cover-420612313; Jun. 29, 2015; 13 pages.
Amended claims submitted to the European Patent Office on May 5, 2014, in related European Patent Application No. 12787562.3 (Publication No. EP2766238); 9 pages.
Communication pursuant to Article 94(3) EPC issued by the European Patent Office, dated Mar. 27, 2020, for European Patent Application No. 16198993.4; 5 pages.

Decision Institution of Inter Partes Review 37 CFR .sctn. 42.108 issued by the U.S. Patent and Trademark Office Trial and Appeal Board, *Arctic Cat, Inc.* v. *Polaris Industries Inc.*, Feb. 3, 2016; 34 pages.
Decision to Institute 37 C.F.R. .sctn. 42.108 issued by the U.S. Patent and Trademark Office Trial and Appeal Board, *Arctic Cat, Inc.* v. *Polaris Industries, Inc.*, Feb. 3, 2016; 22 pages.
European Search Report issued by the European Patent Office, dated Mar. 2, 2017, for related European patent application No. 16198993. 4; 11 pages.
Examination Report issued by the Intellectual Property India, dated Jun. 10, 2019, for Indian Patent Application No. 3632/DELNP/2014; 7 pages.
Gangadurai et al.; Development of control strategy for optimal control of a continuously variable transmission operating in combination with a throttle controlled engine; SAE International; Oct. 12, 2005.
http://www.hilliardcorp.com/centrifugal-clutch.html, Motion Control Division, Centrifugal Clutches, accessed Jan. 8, 2013.
International Preliminary Report on Patentability issued by the European Patent Office, dated Feb. 6, 2014, for International Application No. PCT/US2012/060269; 22 pages.
International Preliminary Report on Patentability received for PCT Patent Application No. PCT/US19/22912, mailed on Apr. 2, 2020, 24 pages.
International Preliminary Report on Patentability received for PCT Patent Application No. PCT/US2017/065520, mailed on Jul. 4, 2019, 9 pages.
International Preliminary Report on Patentability received for PCT Patent Application No. PCT/US2019/022706, mailed on Mar. 31, 2020, 16 pages.
International Preliminary Report on Patentability received for PCT Patent Application No. PCT/US2022/014291, mailed on Aug. 10, 2023, 8 pages.
International Preliminary Report on Patentability, issued by the European Patent Office, dated Apr. 14, 2015, for International Patent Application No. PCT/US2013/064516; 18 pages.
International Search Report and Written Opinion issued by the European Patent Office, dated Jul. 17, 2013, for International Application No. PCT/US2012/060269; 18 pages.
International Search Report and Written Opinion of the International Searching Authority, mailed Mar. 25, 2014, for International Patent Application No. PCT/US2013/064516; 23 pages.
International Search Report and Written Opinion received for PCT Patent Application No. PCT/US2022/014291, mailed on Jun. 21, 2022, 15 pages.
International Search Report and Written Opinion received for PCT Patent Application No. PCT/US19/22912, mailed on Jun. 20, 2019, 14 pages.
International Search Report and Written Opinion received for PCT Patent Application No. PCT/US2017/065520, mailed on Mar. 19, 2018, 10 pages.
International Search Report and Written Opinion received for PCT Patent Application No. PCT/US2019/022706, mailed on May 17, 2019, 6 pages.
Non-final Office Action mailed Apr. 9, 2015, in corresponding U.S. Appl. No. 13/652,289; 19 pages.
Office Action issued by the Canadian Intellectual Property Office, dated Jul. 26, 2018, for Canadian Patent Application No. 2,851,626; 4 pages.
Office Action issued by the Canadian Intellectual Property Office, dated Jul. 8, 2020, for Canadian Patent Application No. 3,046,825; 5 pages.
U.S. Appl. filed Oct. 15, 2012, Primary Clutch Electronic CVT., U.S. Appl. No. 13/652,304, U.S. Appl. No. 13/652,304.
U.S. Appl. No. 13/652,297, filed Oct. 15, 2012 and issued as U.S. Pat. No. 9,151,384 on Oct. 6, 2015, entitled Primary Clutch Electronic CVT.
U.S. Appl. No. 13/399,422, filed with the U.S. Patent Office on Feb. 17, 2012, and issued as U.S. Pat. No. 8,534,413 on Sep. 17, 2013; 33 pages.
U.S. Appl. No. 13/652,253, filed with the U.S. Patent Office on Oct. 15, 2012, and issued as U.S. Pat. No. 8,682,550 on Mar. 25, 2014; 59 pages.

(56) References Cited

OTHER PUBLICATIONS

U.S. Appl. No. 13/652,278, filed with the U.S. Patent Office on Oct. 15, 2012, and issued as U.S. Pat. No. 8,684,887 on Apr. 1, 2014; 59 pages.

U.S. Appl. No. 13/652,289, filed with the U.S. Patent Office on Oct. 15, 2012; 60 pages.

Unno et al.; Development of Electronically Controlled DVT Focusing on Rider's Intention of Acceleration and Deceleration; SAE International; Oct. 30, 2007.

* cited by examiner

CONTINUOUSLY VARIABLE TRANSMISSION

CROSS-REFERENCE TO RELATED APPLICATIONS

The present application is a divisional of U.S. patent application Ser. No. 17/947,430, filed Sep. 19, 2022, which is a continuation of U.S. patent application Ser. No. 17/515, 461, filed Oct. 30, 2021, now U.S. Pat. No. 11,879,542, which is a continuation of U.S. patent application Ser. No. 16/855,394, filed Apr. 22, 2020, now U.S. Pat. No. 11,306, 815, which is a continuation of U.S. patent application Ser. No. 14/475,385, filed Sep. 2, 2014, now U.S. Pat. No. 10,648,554, titled "CONTINUOUSLY VARIABLE TRANSMISSION", the complete disclosures of which are expressly incorporated by reference herein.

FIELD

The present invention relates generally to a continuously variable transmission and in particular to a continuously variable transmission for a vehicle.

BACKGROUND AND SUMMARY

Continuously variable transmissions are known. Continuously variable transmissions include a driven clutch operatively coupled to a drive clutch through a belt. The drive clutch is coupled to an input shaft of the continuously variable transmission and the drive clutch is coupled to an output shaft of the continuously variable transmission. As is known in the art, as the rotation speed of the input shaft varies, the drive clutch, the driven clutch, and the belt cooperate to vary the rotation speed of the output shaft. Typically, the drive clutch, the driven clutch, and the belt are positioned within a housing and ambient air is pulled into the housing to assist in cooling the drive clutch, the driven clutch, and the belt.

The present disclosure relates to continuously variable transmissions. By way of example, the present disclosure relates to systems and methods to cool one or more components of a continuously variable transmission, systems and methods to monitor a temperature of one or more components of a continuously variable transmission vehicles, and an outer cover for a housing of a continuously variable transmission.

In exemplary embodiment of the present disclosure, a continuously variable transmission for coupling a drive shaft and a driven shaft is provided. The continuously variable transmission comprising a housing including a base having a first opening adapted to receive the drive shaft and a second opening adapted to receive the driven shaft and a cover being coupled to the base. The cover and the base cooperating to define an interior of the housing. The continuously variable transmission further comprising a drive clutch positioned within the interior of the housing and adapted to be operatively coupled to the drive shaft and a driven clutch positioned within the interior of the housing and adapted to be operatively coupled to the driven shaft. The drive clutch including a first drive clutch sheave and a second drive clutch sheave moveable relative to the first drive clutch sheave. The driven clutch being operatively coupled to the drive clutch and including a first driven clutch sheave and a second driven clutch sheave moveable relative to the first driven clutch sheave. The continuously variable transmission further comprising a first number of air supply conduits coupled to the housing, each providing non-recycled air from an exterior of the housing to the interior of the housing through at least one air supply openings in the housing; and at least one air outlet conduit coupled to the housing. A second number of the first drive clutch sheave, the second drive clutch sheave, the first driven clutch sheave, and the second driven clutch sheave are directly contacted by the non-recycled air provided by the first number of air supply conduits. The second number being greater than the first number and the second number is at least equal to three.

In one example, the first number is one. In a variation thereof, the second number is four. In another example, the second number is four. In still another example, the first number is two. In a variation thereof, the second number is three. In a further example, the second number is three.

In still a further example, an first air supply opening in the housing is positioned within an envelope of a first side of the driven clutch perpendicular to a rotational axis of the driven clutch and a first air supply conduit of the first number of air supply conduits is positioned to provide non-recycled air through the first air supply opening in the housing to contact the first side of the driven clutch. In a variation thereof, the first air supply opening is positioned laterally outboard of the driven clutch. In another variation thereof, the rotational axis of the driven clutch extends through the first air supply opening. In yet another variation thereof, the first supply opening is centered around the rotational axis of the driven clutch. In still another variation thereof, the housing includes a flat surface which overlaps an outer portion of the first side of the driven clutch and cooperates with the driven clutch to define a gap between the driven clutch and the housing which causes air to be accelerated towards the drive clutch when the driven clutch is rotating about the rotational axis of the driven clutch. In a refinement of the variation, the gap has a generally constant thickness between the driven clutch and the housing. In another refinement of the variation, the gap has a thickness between the driven clutch and the housing of about 9 millimeters. In still another refinement of the variation, the gap generates a low pressure region which draws air from the first supply opening and accelerates the air to about 60 meters per second. In yet another refinement of the variation, the housing has a smooth profile from proximate the first air supply opening to the flat surface. In yet still another refinement of the variation, the housing has a smooth profile from proximate the first air supply opening to the flat surface, a portion of the smooth profile having a plunger shape.

In still a further example, an air diverter is supported by the housing and is positioned between the drive clutch and the driven clutch. The air diverter having an upper portion, a lower portion, and a waist portion between the upper portion and the lower portion. The air diverter channels air to travel from proximate the driven clutch to proximate the drive clutch in a first region in the interior of the housing above the upper portion of the air diverter and channels air to travel from proximate the drive clutch to proximate the driven clutch in a second region in the interior of the housing below the lower portion of the air diverter. In a variation thereof, the lower portion of the air diverter has an air peeler. The air peeler dividing the air into a first portion which is channeled to travel from proximate the drive clutch to proximate the driven clutch in the second region in the interior of the housing below the lower portion of the air diverter and a second portion which is directed back towards the drive clutch. In a refinement of the variation, the air diverter extends from the flat surface of the housing in a first direction and a pocket to receive the drive clutch extends from the flat surface of the housing in a second direction, opposite the first direction. The housing further including a channel extending from the pocket to the flat surface of the housing, the channel being positioned below the air diverter.

In another exemplary embodiment of the present disclosure, a continuously variable transmission for coupling a drive shaft and a driven shaft is provided. The continuously variable transmission comprising a housing including a base having a first opening adapted to receive the drive shaft and a second opening adapted to receive the driven shaft and a cover being coupled to the base. The cover and the base cooperating to define an interior of the housing. The cover having a unitary body. The continuously variable transmission further comprising a drive clutch positioned within the interior of the housing and adapted to be operatively coupled to the drive shaft. The drive clutch including a first drive clutch sheave and a second drive clutch sheave moveable relative to the first drive clutch sheave. The continuously variable transmission further comprising a driven clutch positioned within the interior of the housing and adapted to be operatively coupled to the driven shaft. The driven clutch being operatively coupled to the drive clutch and including a first driven clutch sheave and a second driven clutch sheave moveable relative to the first driven clutch sheave. The unitary body of the cover including a flat surface which overlaps an outer portion of a first side of the driven clutch which is perpendicular to a rotational axis of the driven clutch and the flat surfaces cooperates with the driven clutch to define a gap between the driven clutch and the housing which causes air to be accelerated towards the drive clutch when the driven clutch is rotating about the rotational axis of the driven clutch.

In one example, the gap has a generally constant thickness between the driven clutch and the housing. In another example, the gap has a thickness between the driven clutch and the housing of about 9 millimeters. In a further example, the unitary body of the cover has a smooth profile from proximate a first air supply opening to the flat surface. In a variation thereof, the first air supply opening is positioned within an envelope of the first side of the driven clutch perpendicular to a rotational axis of the driven clutch. A first air supply conduit is coupled to the housing and positioned to provide non-recycled air through the first air supply opening in the unitary body of the cover to contact the first side of the driven clutch. In another variation thereof, a portion of the smooth profile having a plunger shape.

In a further example, the unitary body of the cover includes an air diverter positioned between the drive clutch and the driven clutch. The air diverter having an upper portion, a lower portion, and a waist portion between the upper portion and the lower portion. The air diverter channels air to travel from proximate the driven clutch to proximate the drive clutch in a first region in the interior of the housing above the upper portion of the air diverter and channels air to travel from proximate the drive clutch to proximate the driven clutch in a second region in the interior of the housing below the lower portion of the air diverter. In a variation thereof, the lower portion of the air diverter has an air peeler. The air peeler dividing the air into a first portion which is channeled to travel from proximate the drive clutch to proximate the driven clutch in the second region in the interior of the housing below the lower portion of the air diverter and a second portion which is directed back towards the drive clutch. In a refinement thereof, the air diverter extends from the flat surface of the unitary body of the cover in a first direction and a pocket to receive the drive clutch extends from the flat surface of the unitary body of the cover in a second direction, opposite the first direction. The unitary body of the cover further including a channel extending from the pocket to the flat surface of the unitary body of the cover. The channel being positioned below the air diverter.

In a further exemplary embodiment of the present disclosure, a method of cooling a continuously variable transmission which includes a housing, a drive clutch positioned within an interior of the housing and including a first drive clutch sheave and a second drive clutch sheave moveable relative to the first drive clutch sheave, and a driven clutch positioned within the interior of the housing and including a first driven clutch sheave and a second driven clutch sheave moveable relative to the first driven clutch sheave is provided. The method comprising the steps of coupling a first number of air supply conduits to the housing, each providing non-recycled air from an exterior of the housing to the interior of the housing through at least one air supply opening in the housing; and directing the non-recycled air to directly contact a second number of the first drive clutch sheave, the second drive clutch sheave, the first driven clutch sheave, and the second driven clutch sheave. The second number being greater than the first number and the second number is at least equal to three.

In still a further exemplary embodiment of the present disclosure, a method of cooling a continuously variable transmission which includes a housing, a drive clutch positioned within an interior of the housing and including a first drive clutch sheave and a second drive clutch sheave moveable relative to the first drive clutch sheave, and a driven clutch positioned within the interior of the housing and including a first driven clutch sheave and a second driven clutch sheave moveable relative to the first driven clutch sheave is provided. The method comprising the steps of coupling a first air supply conduit to a first air supply opening in the housing, the first air supply opening being positioned within an envelope of a first side of the driven clutch, the first side being perpendicular to a rotational axis of the driven clutch; providing a flat surface which overlaps an outer portion of the first side of the driven clutch and cooperates with the driven clutch to define a gap between the driven clutch and the housing; and providing an airflow path extending from proximate the first air supply opening to the flat surface, the airflow path having a smooth profile.

The above mentioned and other features of the invention, and the manner of attaining them, will become more apparent and the invention itself will be better understood by reference to the following description of embodiments of the invention taken in conjunction with the accompanying drawings. These above mentioned and other features of the invention may be used in any combination or permutation.

BRIEF DESCRIPTION OF THE DRAWINGS

Corresponding reference characters indicate corresponding parts throughout the several views. Unless stated otherwise the drawings are proportional.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a continuously variable transmission, it should be understood that the features disclosed herein may be incorporated into one or more vehicles. Exemplary vehicles include all-terrain vehicles, side-by-side UTVs, utility vehicles, motorcycles, snowmobiles, golf carts, and other vehicles or devices incorporating a continuously variable transmission.

Figure 1:
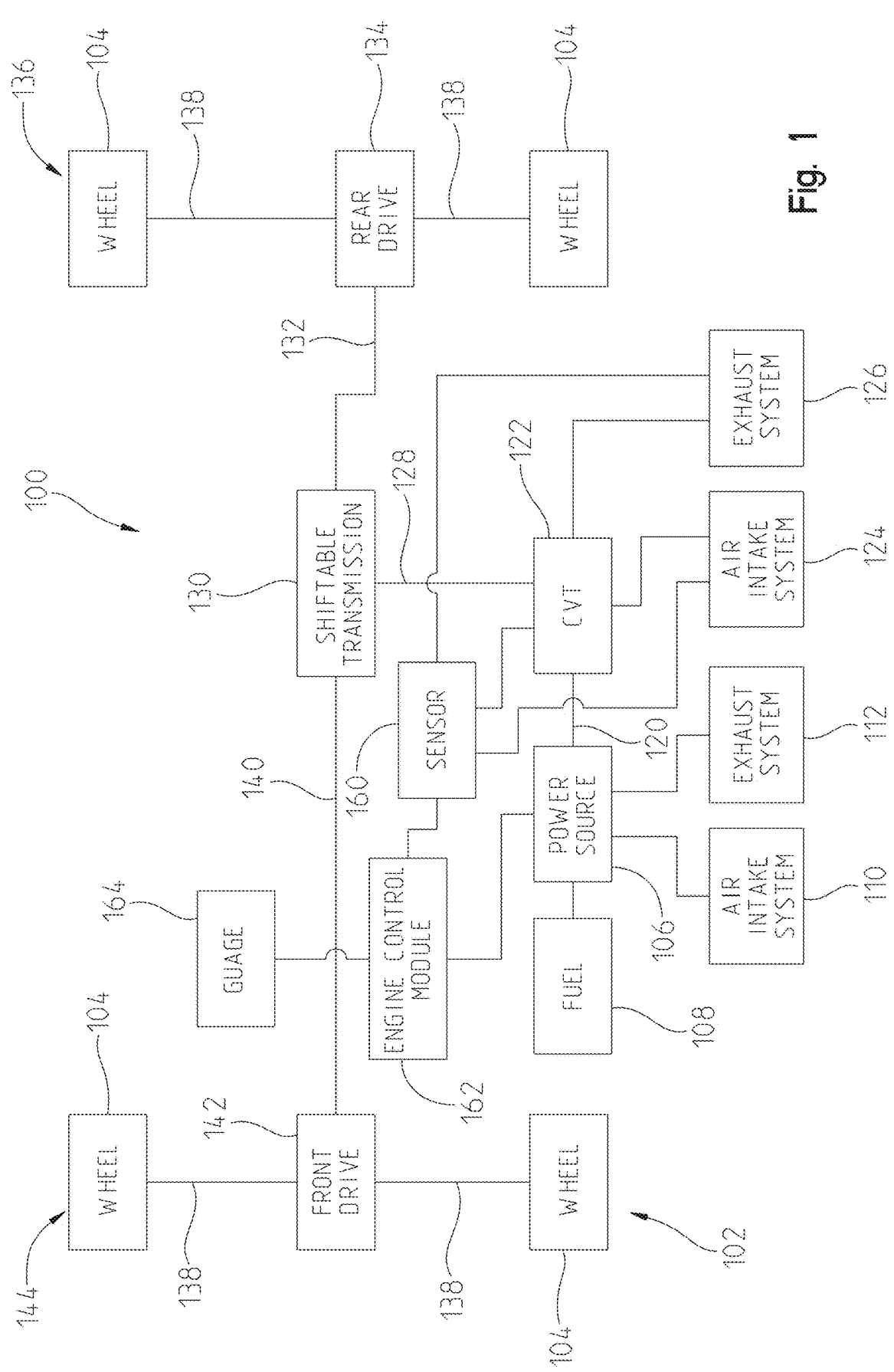
FIG. 1 illustrates a representative view of a drive train of an exemplary side-by-side vehicle.

Referring to FIG. 1, a representative view of a vehicle 100 is shown. Vehicle 100 as illustrated includes a plurality of ground engaging members 102. Illustratively, ground engaging members 102 are wheels 104 with associated tires. Other exemplary ground engaging members include skis and tracks. In one embodiment, one or more of the wheels may be replaced with tracks, such as the Prospector II Tracks available from Polaris Industries, Inc. located at 2100 Highway 55 in Medina, Minn. 55340.

One or more of ground engaging members 102 are operatively coupled to a shiftable transmission 130 to power the movement of vehicle 100. Exemplary power sources 106 include internal combustion engines and electric motors. In the illustrated embodiment, the power source 106 is an internal combustion engine.

An internal combustion power source 106 is represented in FIG. 1. Power source 106 receives fuel from a fuel source 108 and ambient air from an air intake system 110. Exhaust is expelled from power source 106 through an exhaust system 112. An output shaft 120 of power source 106 is coupled to a drive member of a continuously variable transmission ("CVT unit") 122. A driven member of the CVT unit 122 is operatively coupled to the drive member of the CVT unit 122 through a drive belt. CVT unit 122 receives ambient air through an air intake system 124 and expels air from an interior of CVT unit 122 through an exhaust system 126. The driven member is coupled to an output shaft 128 which is operatively coupled to an input of a shiftable transmission 130.

A first output shaft 132 of shiftable transmission 130 is coupled to a rear drive unit 134. Rear drive unit 134 is coupled to corresponding wheels 104 of a rear axle 136 through half shafts 138. Rear drive unit 134 may be a differential. A second output shaft 140 of shiftable transmission 130 is coupled to a front drive unit 142. Front drive unit 142 is coupled to corresponding wheels 104 of a front axle 144 through half shafts 138. Front drive unit 142 may be a differential.

Various configurations of rear drive unit 134 and front drive unit 142 are contemplated. Regarding rear drive unit 134, in one embodiment rear drive unit 134 is a locked differential wherein power is provided to both of the wheels of axle 136 through output shafts 150. In one embodiment, rear drive unit 134 is a lockable/unlockable differential relative to output shafts 150. When rear drive unit 134 is in a locked configuration power is provided to both wheels of axle 136 through output shafts 150. When rear drive unit 134 is in an unlocked configuration, power is provided to one of the wheels of axle 136, such as the wheel having the less resistance relative to the ground, through output shafts 150. Regarding front drive unit 142, in one embodiment front drive unit 142 has a first configuration wherein power is provided to both of the wheels of front axle 144 and a second configuration wherein power is provided to one of the wheels of axle 144, such as the wheel having the less resistance relative to the ground.

In one embodiment, front drive unit 142 includes active descent control ("ADC"). ADC is a drive system that provides on-demand torque transfer to the front wheels when one of the wheels 104 of rear axle 136 lose traction and that provides engine braking torque to the wheels 104 of front axle 144. Both the on-demand torque transfer and the engine braking feature of front drive unit 142 may be active or inactive. In the case of the on-demand torque transfer, when active, power is provided to both of the wheels of front axle 144 and, when inactive, power is provided to one of the wheels of front axle 144. In the case of the engine braking, when active, engine braking is provided to the wheels of front axle 144 and, when inactive, engine braking is not provided to the wheels of front axle 144. Exemplary front drive units are disclosed in U.S. patent application Ser. No. 12/816,052, filed Jun. 15, 2010, titled ELECTRIC VEHICLE, U.S. Pat. No. 5,036,939, and U.S. Pat. RE38,012E, the disclosures of which are expressly incorporated herein by reference.

In one embodiment, one or more of CVT unit 122, air intake system 124, and exhaust system 126 includes a sensor 160 which monitors a characteristic of the air within the interior of the respective CVT unit 122, air intake system 124, and exhaust system 126. Exemplary sensors include a temperature sensor. In one embodiment, sensor 160 provides an indication of a temperature of the air within the interior of the respective CVT unit 122, air intake system 124, and exhaust system 126 to an engine control module 162 which includes logic to control the operation of power source 106. When a monitored air temperature exceeds a threshold amount, engine control module 162 responds by at least one of limiting an output speed of output shaft 120 of power source 106, limiting a speed of vehicle 100, and indicating an overheat condition to an operator of vehicle 100 through a gauge 164 within an operator area of vehicle 100. Exemplary indicators of an overheat condition include a light, a warning message on a display, and other suitable ways of communicating a condition to an operator. By limiting an engine speed or a vehicle speed, the temperature of the air in an interior of CVT unit 122 is reduced and a temperature of a drive belt in the interior of CVT unit 122 is reduced. This reduces the risk of a drive belt failure.

Figure 2A:
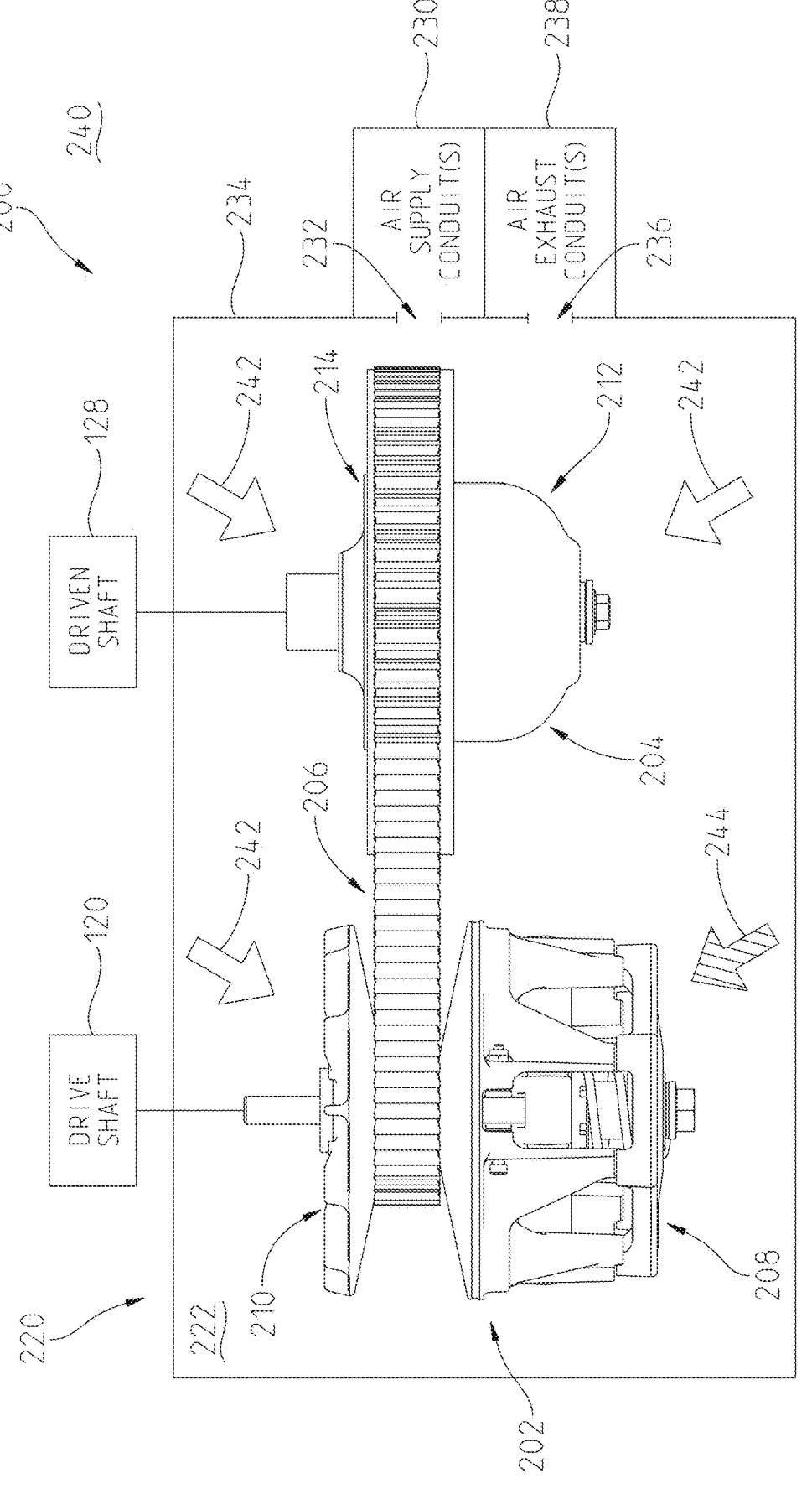
FIG. 2A illustrates a representative view of initial air flow to an exemplary continuously variable transmission.

Referring to FIG. 2A, an exemplary continuously variable transmission 200 is represented. Continuously variable transmission 200 includes a drive clutch 202 operatively coupled to output shaft 120, a driven clutch 204 operatively coupled to output shaft 128, and a drive belt 206 operatively coupled to drive clutch 202 and driven clutch 204 to transfer power from drive clutch 202 to driven clutch 204. Drive clutch 202 includes a first drive clutch sheave 208 and a second drive clutch sheave 210 moveable relative to the first drive clutch sheave 208. Driven clutch 204 includes a first driven clutch sheave 212 and a second driven clutch sheave 214 moveable relative to the first driven clutch sheave 212. FIGS. 12, 13, 15, and 16 illustrate exemplary movement of the sheaves of drive clutch 202 and driven clutch 204.

Both of drive clutch 202 and driven clutch 204 are positioned within a housing 220 having an interior 222. Housing 220 may be comprised of multiple components which cooperate to form housing 220. The multiple components may also include features to direct air flow through interior 222 of housing 220. In one example, housing 220 includes a base having a first opening adapted to receive the drive shaft 120 and a second opening adapted to receive the driven shaft 128 and a cover coupled to the base. The cover and the base cooperating to define interior 222 of the housing 220. The cover and base may include features to direct air flow through interior 222 of housing 220.

As represented in FIG. 2A, one or more air supply conduits 230 are coupled to housing 220. Exemplary air supply conduits include hoses. In one embodiment, each air supply conduit 230 provides air to the interior 222 of housing 220 through a respective air supply opening 232 in an exterior 234 of housing 220. The air supply conduits 230 provide air to the interior 222 of housing 220 to cool drive clutch 202, driven clutch 204, and drive belt 206. The supplied air is directed towards one or more of first drive clutch sheave 208, second drive clutch sheave 210, first driven clutch sheave 212, and second driven clutch sheave 214 whereat, the supplied air will take on heat to cool the respective one or more of first drive clutch sheave 208, second drive clutch sheave 210, first driven clutch sheave 212, and second driven clutch sheave 214. The air will then circulate within interior 222 of housing 220 potentially or intentionally contacting one or more of first drive clutch sheave 208, second drive clutch sheave 210, first driven clutch sheave 212, and second driven clutch sheave 214 and then exiting interior 222 of housing 220 through one or more air exhaust openings 236 in wall 234 of housing 220. One or more exhaust or outlet conduits 238 are coupled to the exhaust openings 236.

Referring to FIG. 2A, in one embodiment, one or more air supply conduits 230 are coupled to housing 220. Each of air supply conduits 230 provides air from an exterior 240 of housing 220 to the interior 222 of housing 220 through at least one air supply opening 232 in wall 234 of housing 220. Air provided from the exterior 240 of housing 220 is referred to as non-recycled air and is represented in FIG. 2A by arrows with an open middle, arrows 242. Once the air in interior 222 of housing 220 contacts at least one of first drive clutch sheave 208, second drive clutch sheave 210, first driven clutch sheave 212, and second driven clutch sheave 214 the air is referred to as recycled air and is represented in FIG. 2A by arrows with a hatched middle, arrow 244. In the example shown in FIG. 2A, first drive clutch sheave 208 is downstream of first driven clutch sheave 212 and receives recycled air from first driven clutch sheave 212. In one embodiment, one or more of second drive clutch sheave 210, first driven clutch sheave 212, and second driven clutch sheave 214 receives at least about 60 kilograms (kg) per hour (hr) of non-recycled air when the rpm of output shaft 120 is not idling and vehicle 100 is not stationary. In one example, the rpm of output shaft 120 is at least 4500 rpm. In one embodiment, one or more of second drive clutch sheave 210, first driven clutch sheave 212, and second driven clutch sheave 214 receives at least about 100 kg/hr of non-recycled air when the rpm of output shaft 120 is not idling and vehicle 100 is not stationary. In one embodiment, one or more of second drive clutch sheave 210, first driven clutch sheave 212, and second driven clutch sheave 214 receives at least about 200 kg/hr of non-recycled air when the rpm of output shaft 120 is not idling and vehicle 100 is not stationary. In one embodiment, one or more of second drive clutch sheave 210, first driven clutch sheave 212, and second driven clutch sheave 214 receives at least about 300 kg/hr of non-recycled air when the rpm of output shaft 120 is not idling and vehicle 100 is not stationary. In one embodiment, one or more of second drive clutch sheave 210, first driven clutch sheave 212, and second driven clutch sheave 214 receives between about 60 kg/hr to 300 kg/hr of non-recycled air when the rpm of output shaft 120 is not idling and vehicle 100 is not stationary. In one example, the rpm of output shaft 120 is at least 4500 rpm. Once the non-recycled air, arrows 242, has contacted the respective one of second drive clutch sheave 210, first driven clutch sheave 212, and second driven clutch sheave 214 it is referred to as recycled air.

In one embodiment, continuously variable transmission 200 includes a first number of air supply conduits 230 coupled to the housing 220, each providing non-recycled air, arrows 242, from an exterior 240 of the housing 220 to the interior 222 of the housing 220 through at least one air supply openings 236 in the housing 220. The non-recycled air, arrows 242, directly contacts a second number of first drive clutch sheave 208, second drive clutch sheave 210, first driven clutch sheave 212, and second driven clutch sheave 214. The second number is greater than the first number and the second number is at least equal to three. In one example, the first number is one and the second number is three. In another example, the first number is two and the second number is three.

Figure 2B:
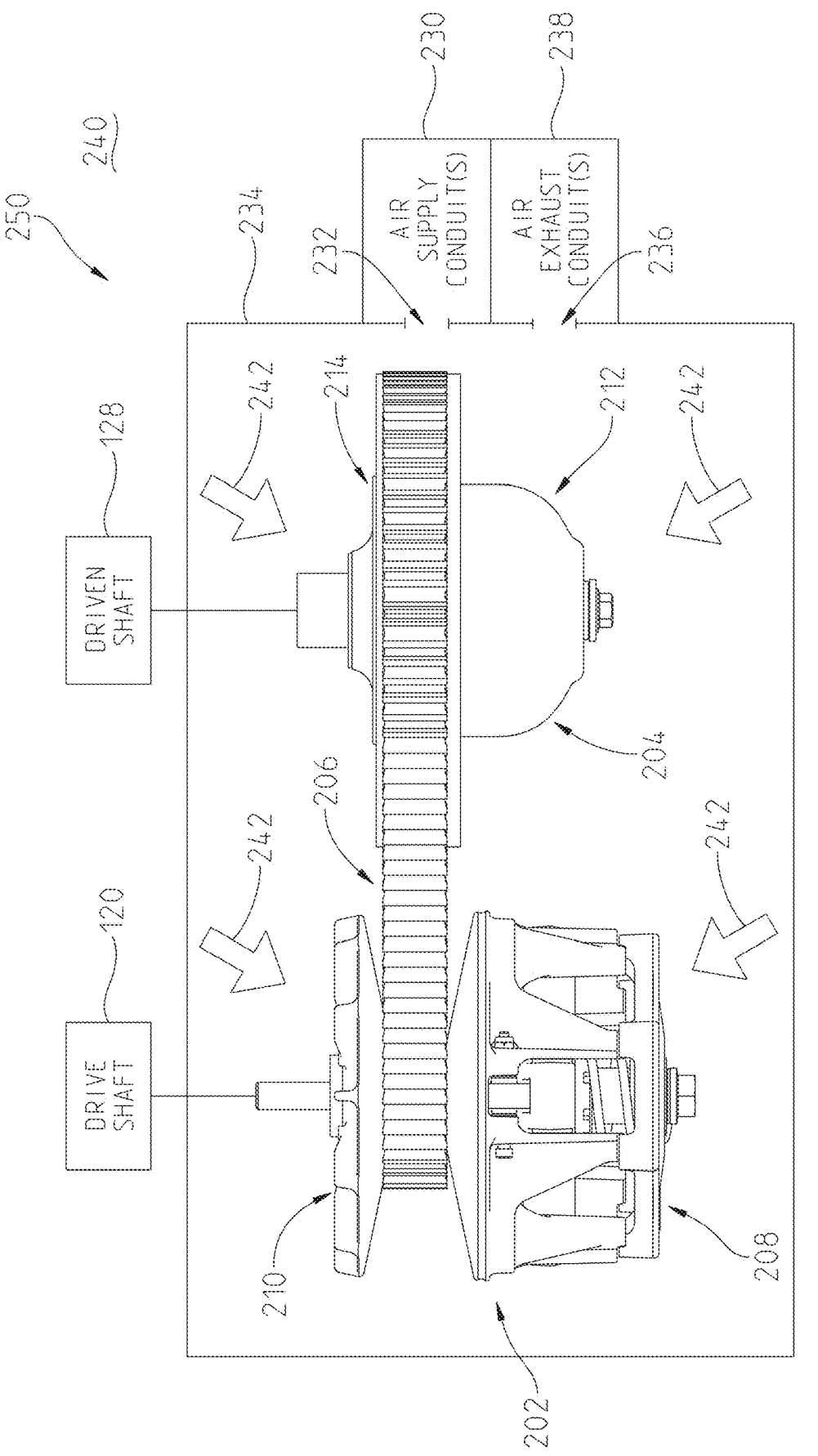
FIG. 2B illustrates another representative view of initial air flow to another exemplary continuously variable transmission.

Referring to FIG. 2B, continuously variable transmission 250 is shown. Continuously variable transmission 250 is generally the same as continuously variable transmission 200, except that each of first drive clutch sheave 208, second drive clutch sheave 210, first driven clutch sheave 212, and second driven clutch sheave 214 receives non-recycled air, arrows 244, from air supply conduits 230. In one embodiment, one or more of first drive clutch sheave 208, second drive clutch sheave 210, first driven clutch sheave 212, and second driven clutch sheave 214 receives at least about 60 kilograms (kg) per hour (hr) of non-recycled air when the rpm of output shaft 120 is not idling and vehicle 100 is not stationary. In one example, the rpm of output shaft 120 is at least 4500 rpm. In one embodiment, one or more of first drive clutch sheave 208, second drive clutch sheave 210, first driven clutch sheave 212, and second driven clutch sheave 214 receives at least about 100 kg/hr of non-recycled air when the rpm of output shaft 120 is not idling and vehicle 100 is not stationary. In one embodiment, one or more of first drive clutch sheave 208, second drive clutch sheave 210, first driven clutch sheave 212, and second driven clutch sheave 214 receives at least about 200 kg/hr of non-recycled air when the rpm of output shaft 120 is not idling and vehicle 100 is not stationary. In one embodiment, one or more of first drive clutch sheave 208, second drive clutch sheave 210, first driven clutch sheave 212, and second driven clutch sheave 214 receives at least about 300 kg/hr of non-recycled air when the rpm of output shaft 120 is not idling and vehicle 100 is not stationary. In one embodiment, one or more of first drive clutch sheave 208, second drive clutch sheave 210, first driven clutch sheave 212, and second driven clutch sheave 214 receives between about 60 kg/hr to 300 kg/hr of non-recycled air when the rpm of output shaft 120 is not idling and vehicle 100 is not stationary.

In one embodiment, continuously variable transmission 250 includes a first number of air supply conduits 230 coupled to the housing 220, each providing non-recycled air, arrows 242, from an exterior 240 of the housing 220 to the interior 222 of the housing 220 through at least one air supply openings 236 in the housing 220. The non-recycled air, arrows 242, directly contacts a second number of first drive clutch sheave 208, second drive clutch sheave 210, first driven clutch sheave 212, and second driven clutch sheave 214. The second number is greater than the first number and the second number is equal to four. In one example, the first number is one. In another example, the first number is two. In a further example, the first number is three.

Figure 3:
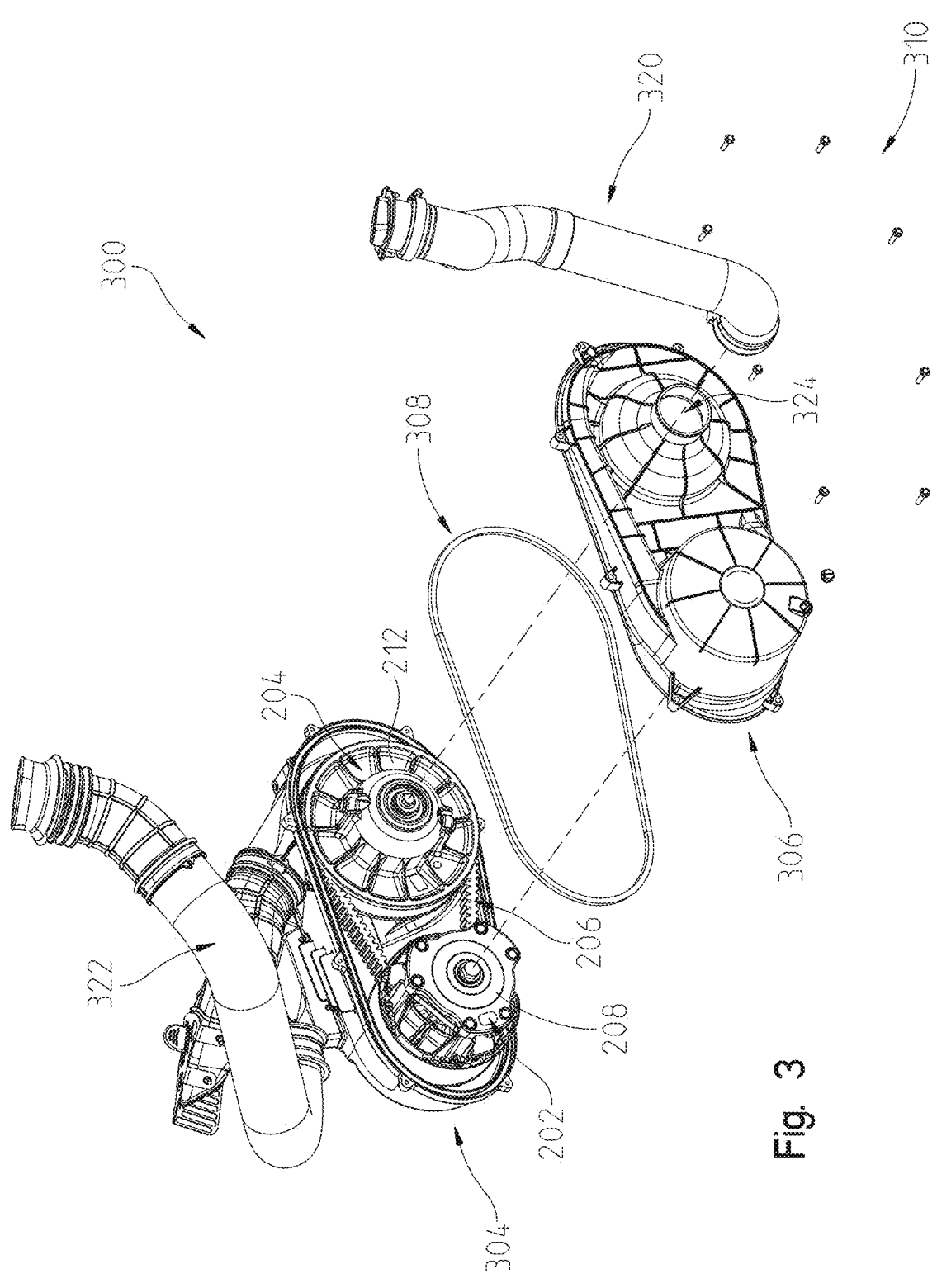
FIG. 3 illustrates an exploded, perspective view of an exemplary continuously variable transmission.
Figure 4:
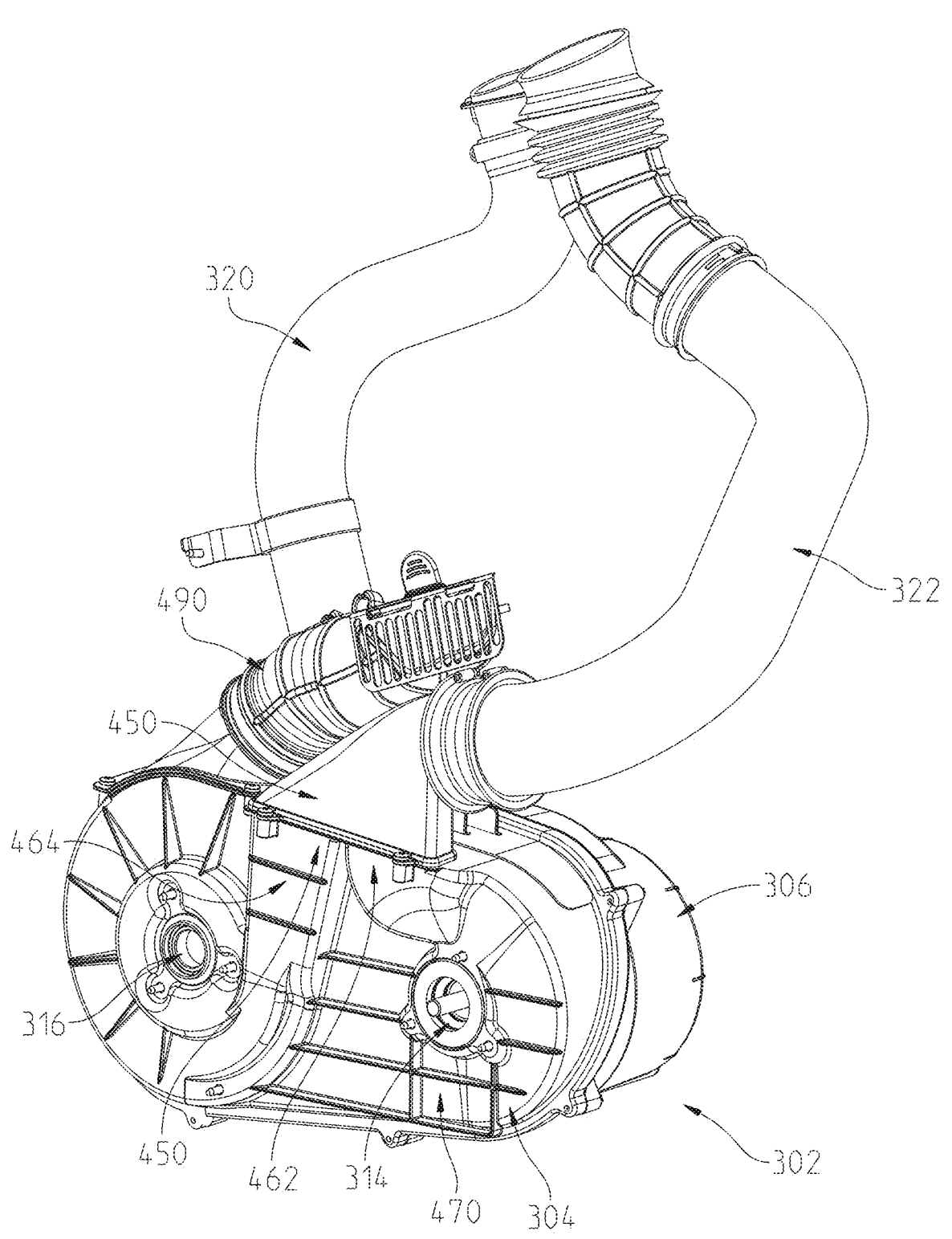
FIG. 4 illustrates a rear, perspective view of the continuously variable transmission of FIG. 3.
Figure 5:
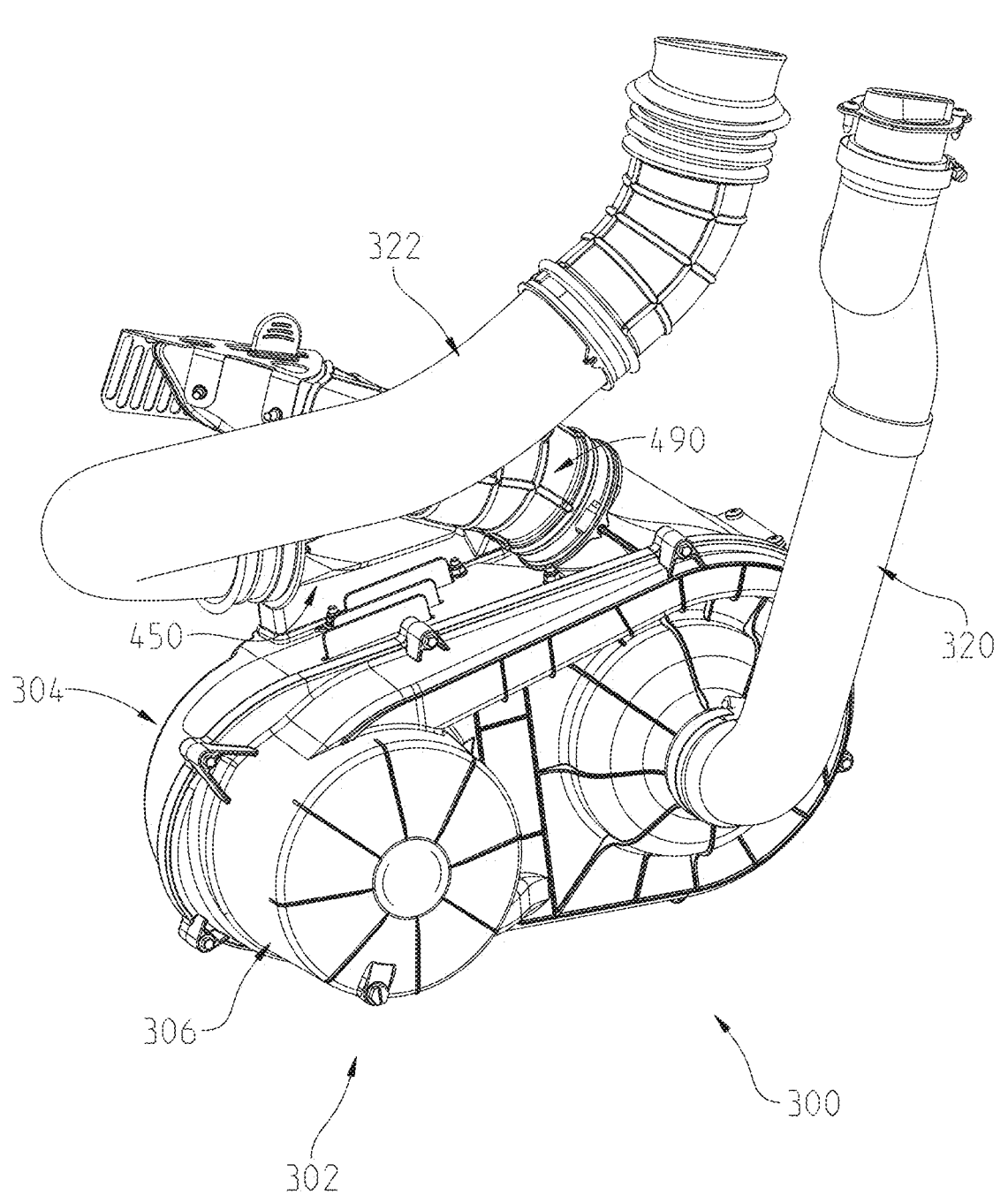
FIG. 5 illustrates a front, perspective view of the continuously variable transmission of FIG. 3.
Figure 6:
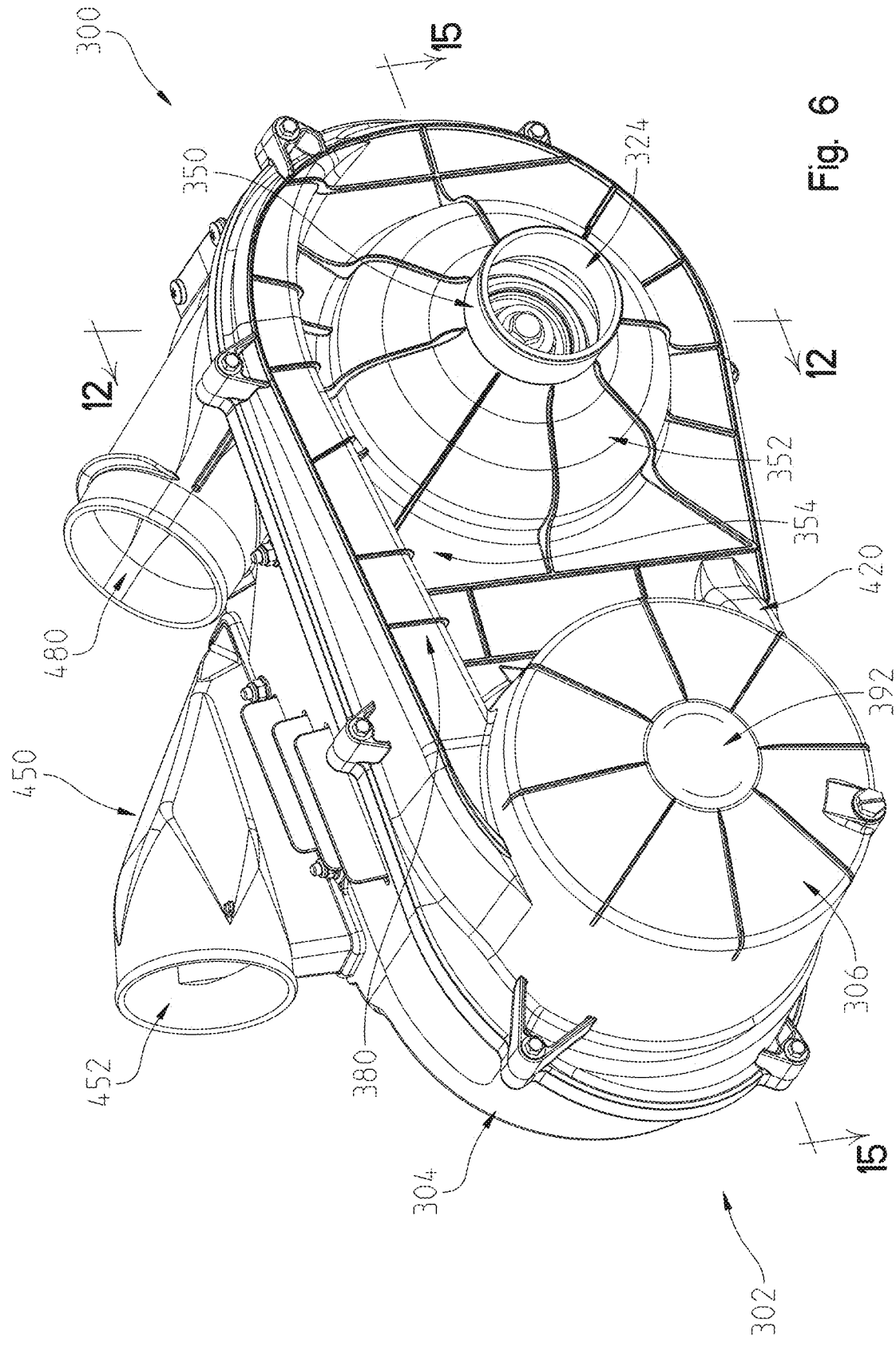
FIG. 6 illustrates a front, perspective view of the continuously variable transmission of FIG. 3 with the air supply conduits and exhaust conduit removed.

Referring to FIGS. 3-19, an exemplary continuously variable transmission 300 is illustrated. Referring to FIGS. 3 and 4, continuously variable transmission 300 includes a housing 302 (FIG. 4) including a base 304 and a cover 306. Cover 306 is coupled to base 304 with a plurality of fasteners 310. A seal 308 is positioned between base 304 and cover 306 to minimize dust entering an interior 312 (see FIG. 12) of housing 302. Base 304 and cover 306 cooperate to define interior 312 of housing 302.

As shown in FIG. 3, drive clutch 202, driven clutch 204, and drive belt 206 are positioned within interior 312 of housing 302. Referring to FIG. 4, base 304 includes a first opening 314 through which drive clutch 202 is coupled to output shaft 120 and a second opening 316 through which driven clutch 204 is coupled to output shaft 128. In one embodiment, base 304 is coupled to power source 106 and shiftable transmission 130 to minimize dust entering first opening 314 and second opening 316.

Figure 15:
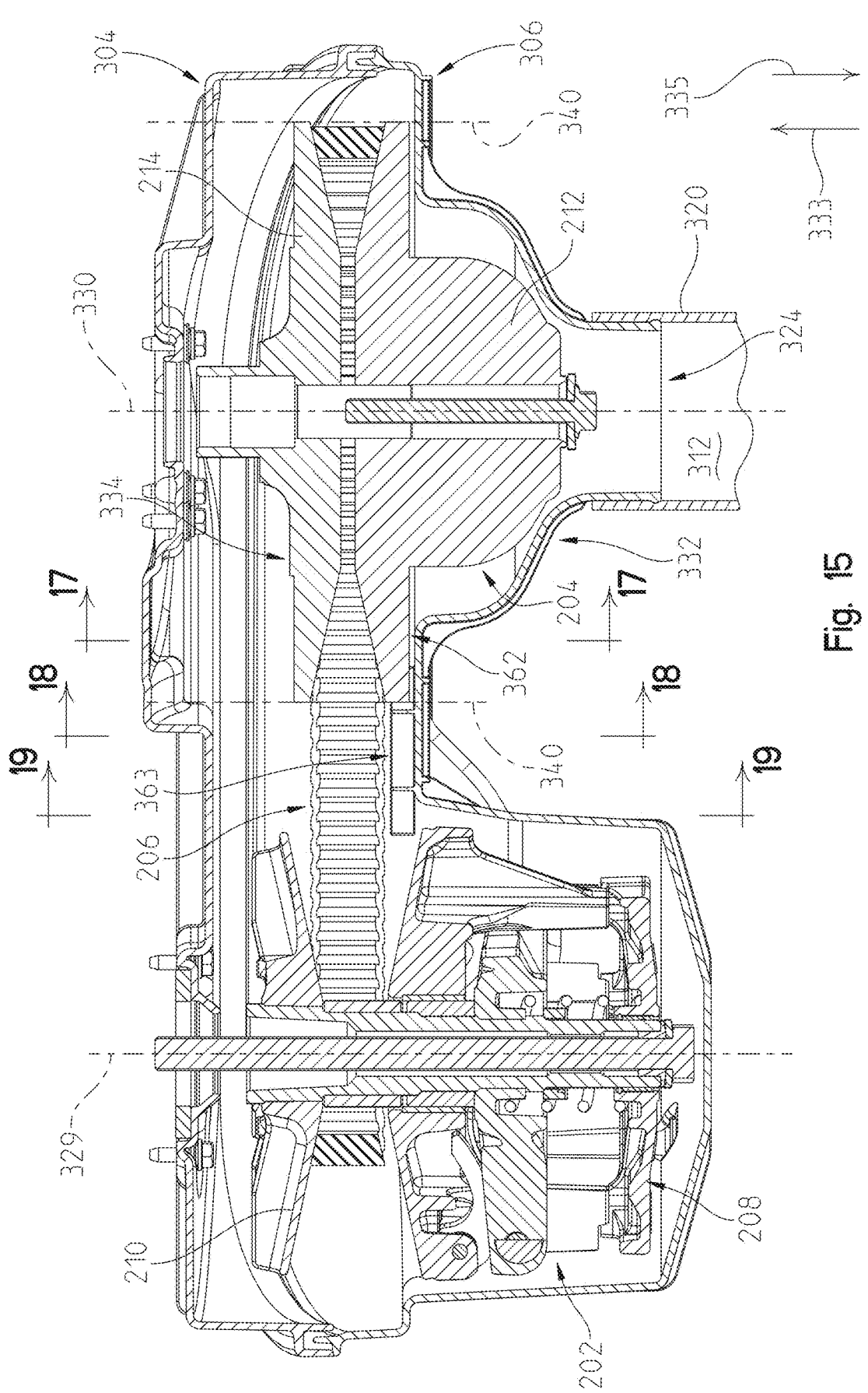
FIG. 15 illustrates a sectional view along lines 15-15 in FIG. 6.

Continuously variable transmission 300 includes a first air supply conduit 320 and a second air supply conduit 322. First air supply conduit 320 is coupled to cover 306 and an interior 321 of first air supply conduit 320 is in fluid communication with a first air supply opening 324 in cover 306. Non-recycled air from first air supply conduit 320 enters housing 302 through first air supply opening 324 in cover 306 and directly contacts first driven clutch sheave 212 of driven clutch 204. As shown in FIG. 15, first air supply opening 324 is positioned laterally outboard of driven clutch 204.

Figure 15A:
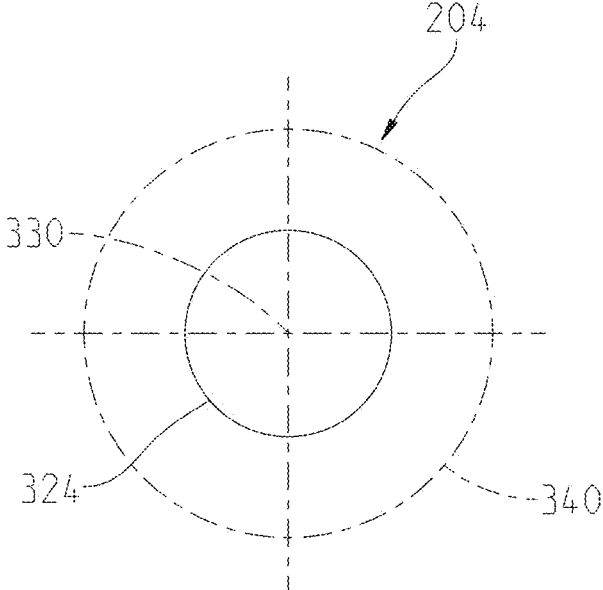
FIG. 15A illustrates a representative view of an envelope of a driven clutch of the continuously variable transmission of FIG. 3 and an air inlet opening in a cover of the continuously variable transmission of FIG. 3.
Figure 16:
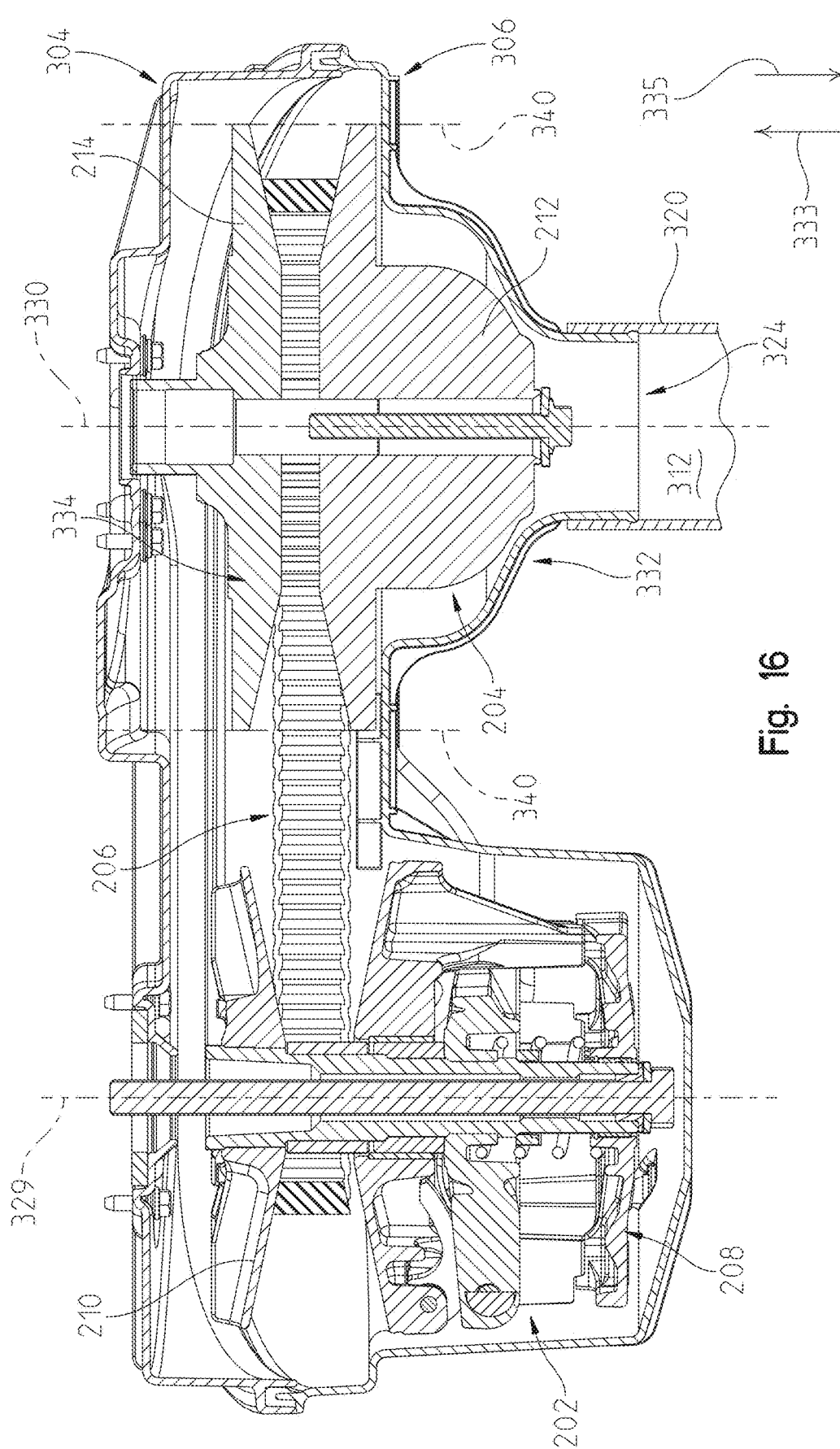
FIG. 16 illustrates the sectional view of FIG. 15 with one of the sheaves of the driven clutch moved relative to the other sheave of the driven clutch.
Figure 17:
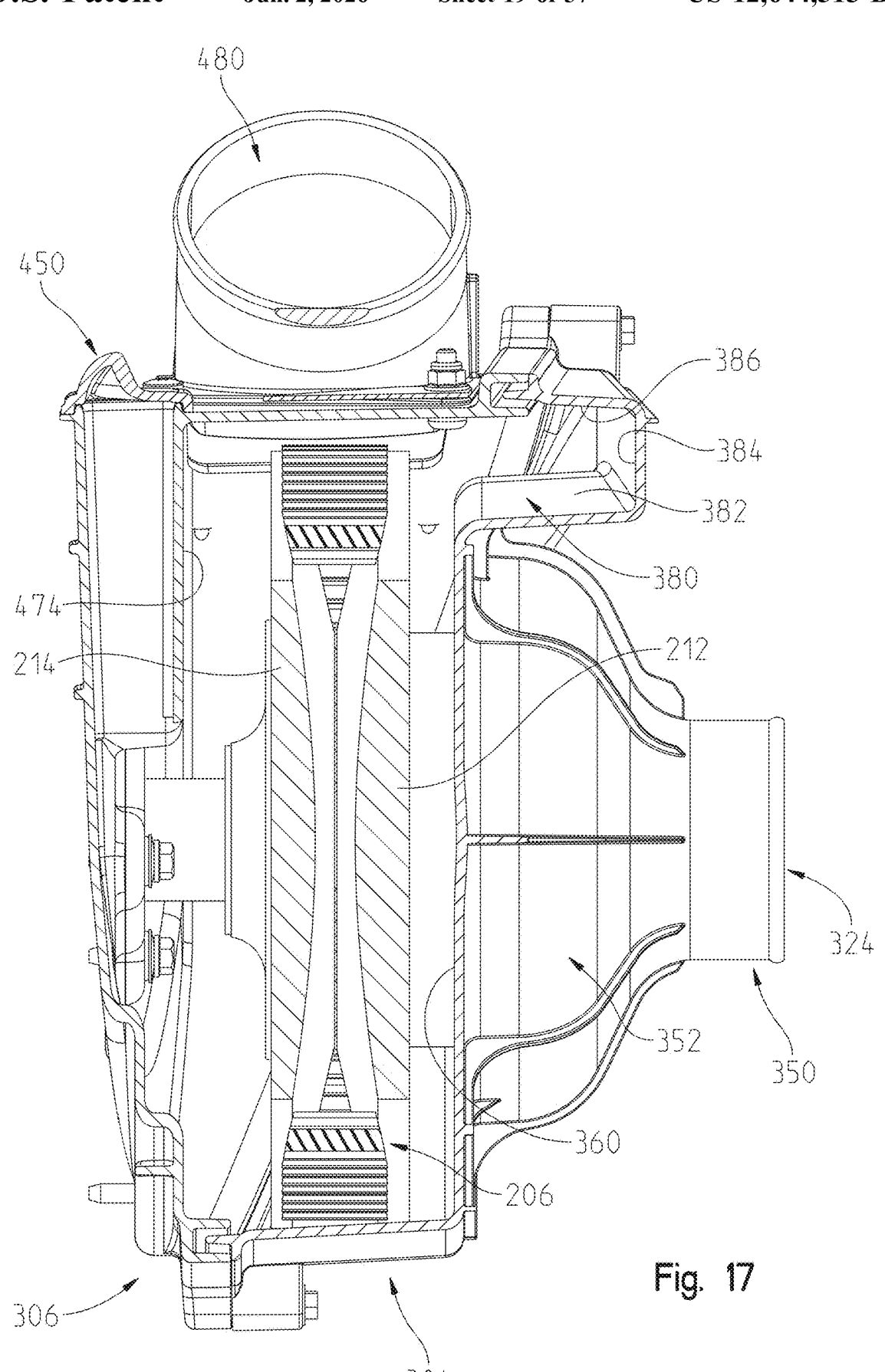
FIG. 17 illustrates a sectional view along lines 17-17 in FIG. 15.
Figure 18:
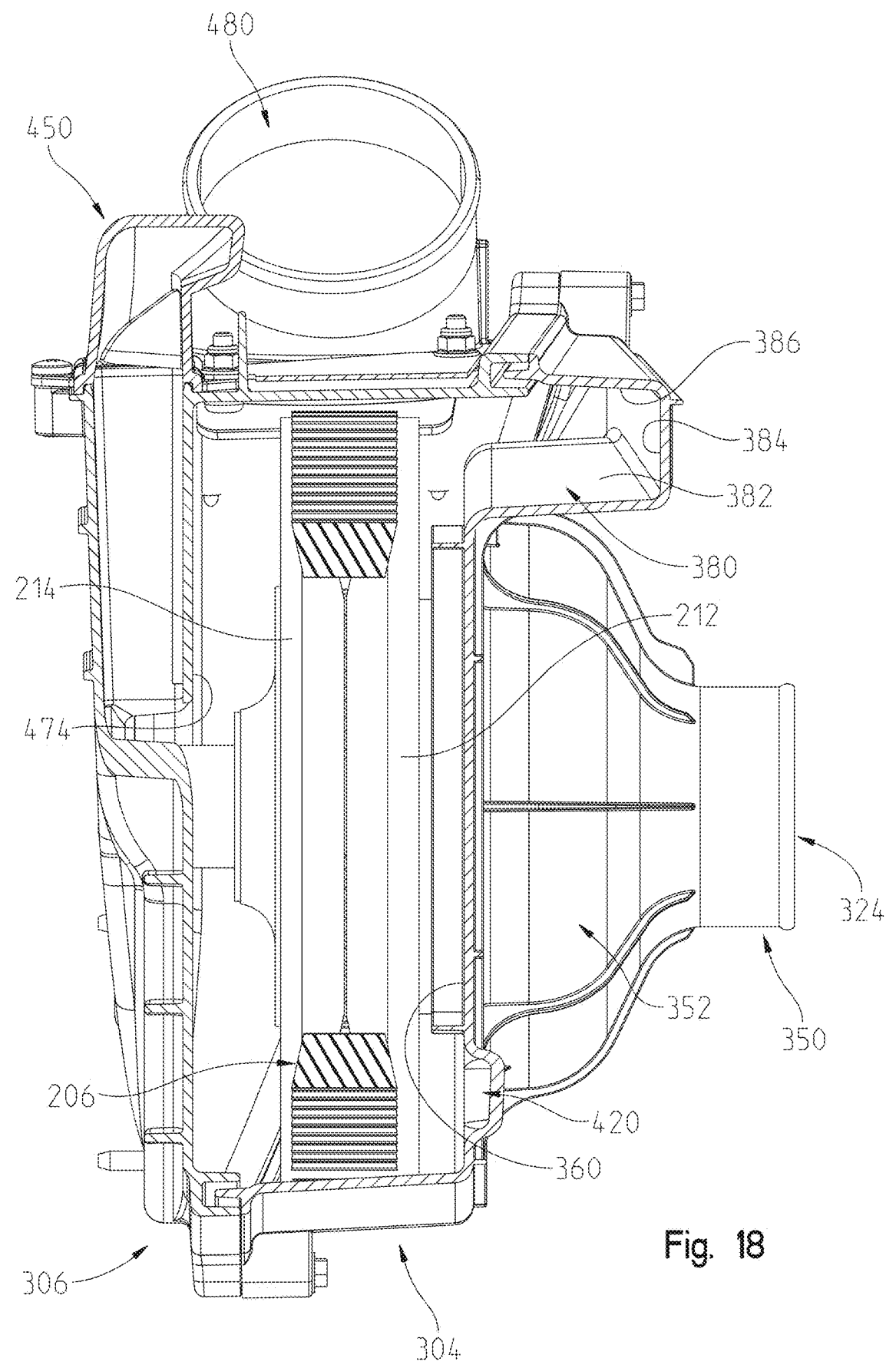
FIG. 18 illustrates a sectional view along lines 18-18 in FIG. 15.
Figure 19:
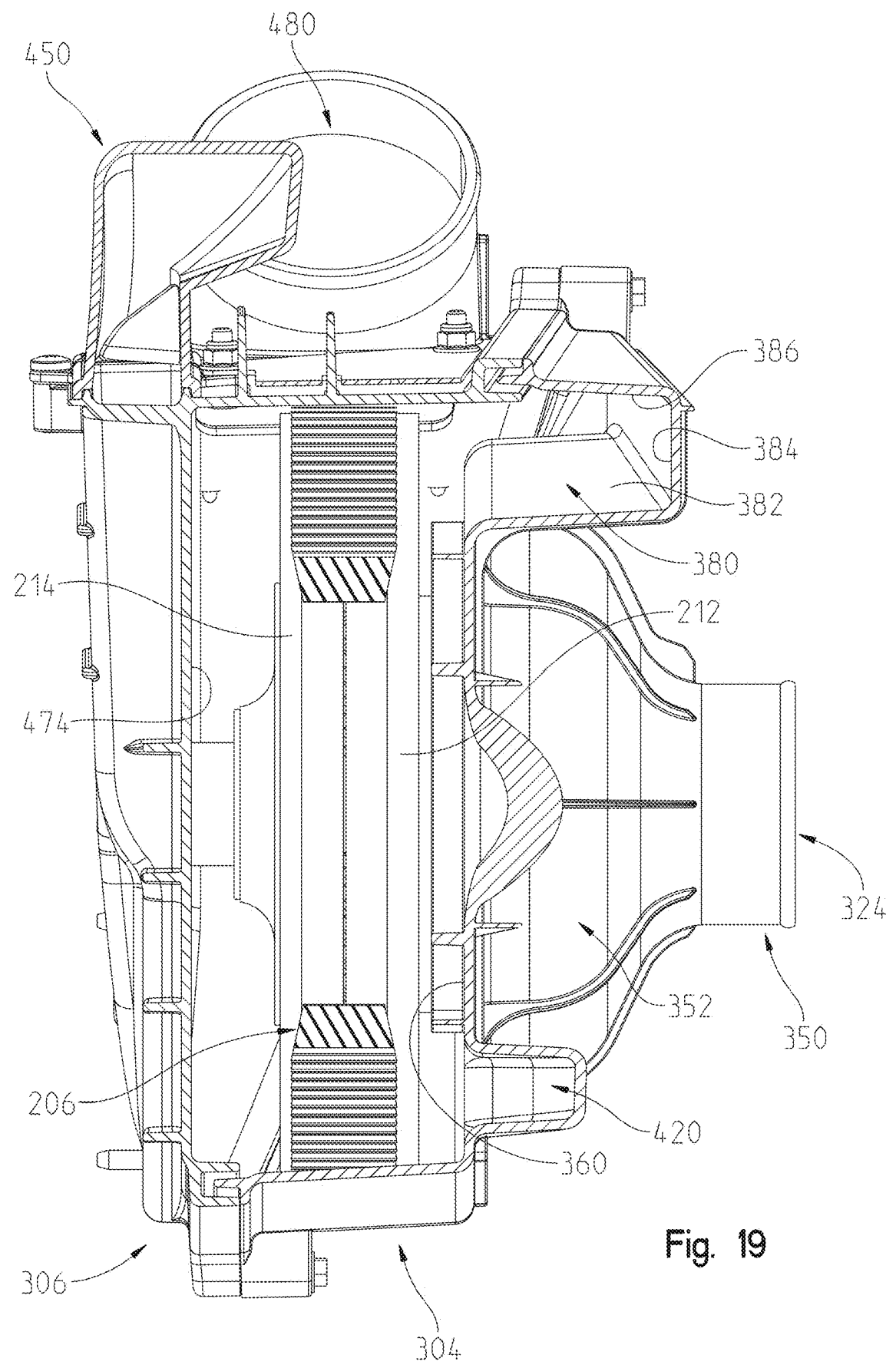
FIG. 19 illustrates a sectional view along lines 19-19 in FIG. 15.

Referring to FIG. 15, drive clutch 202 rotates about a rotational axis 329 and driven clutch 204 rotates about a rotational axis 330. Driven clutch 204 has a first side 332 which extends radially outward from rotational axis 330 and faces cover 306 and a second side 334 which extends radially outward from rotational axis 330 and faces base 304. Referring to FIG. 15A, an envelope 340 of driven clutch 204 is shown. FIG. 15A illustrates envelope 340 as the projection of driven clutch 204 along direction 333 onto a plane perpendicular to rotational axis 330.

As shown in both FIG. 15 and FIG. 15A, first air supply opening 324 is completely positioned within envelope 340 of driven clutch 204. Further, rotational axis 330 extends through first air supply opening 324. First air supply opening 324 is illustratively shown as being centered around rotational axis 330 of driven clutch 204. In one embodiment first air supply opening 324 is completely positioned within envelope 340 of driven clutch 204 and rotational axis 330 does not extend through first air supply opening 324. In one embodiment, first air supply opening 324 partially overlaps envelope 340 of driven clutch 204.

Figure 12:
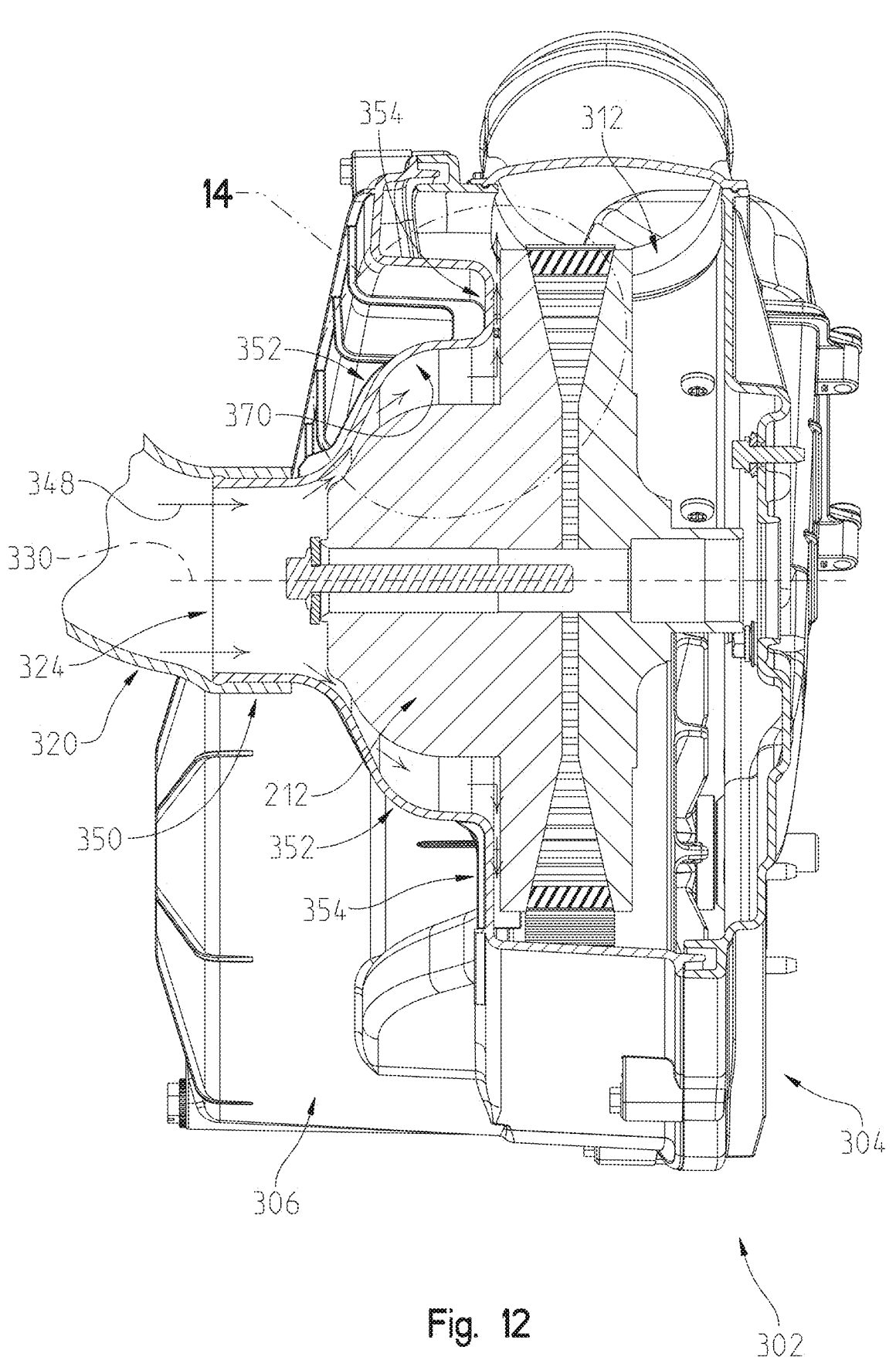
FIG. 12 illustrates a sectional view along lines 12-12 in FIG. 6.
Figure 13:
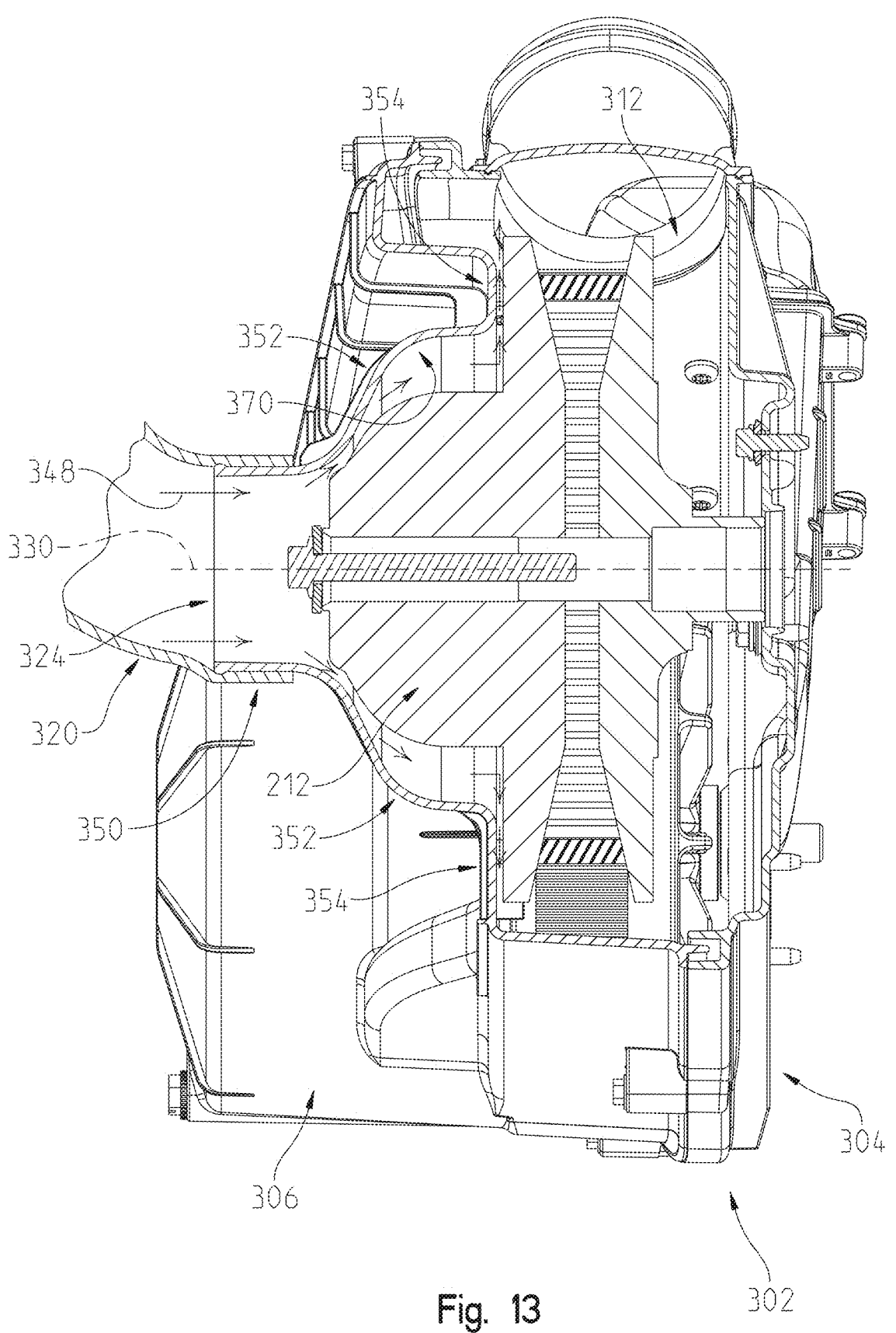
FIG. 13 illustrates the sectional view of FIG. 12 with one of the sheaves of the driven clutch moved relative to the other sheave of the driven clutch.
Figure 14:
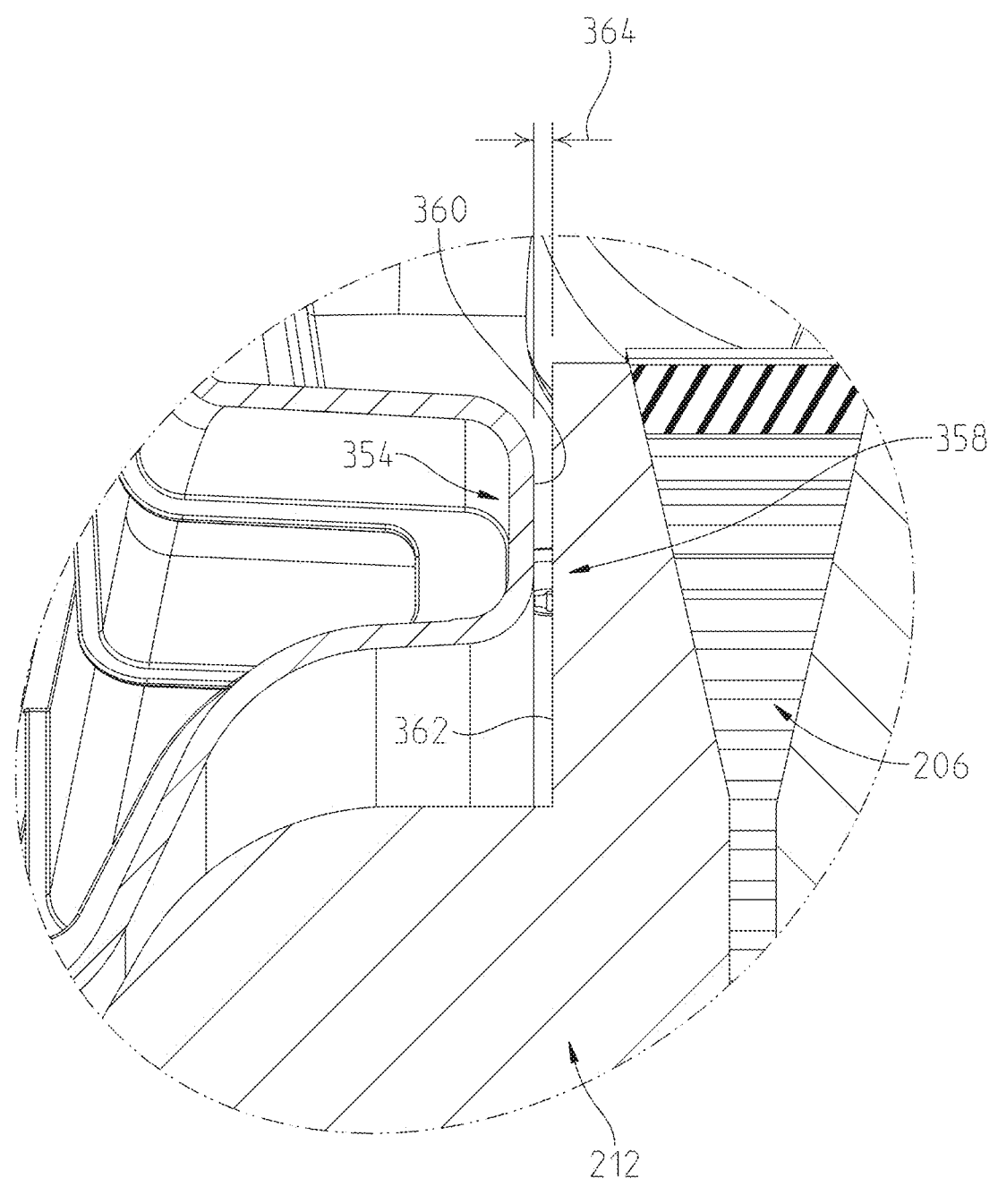
FIG. 14 is a detail view of FIG. 12.

Referring to FIG. 12, the flow of non-recycled air 348 from first air supply conduit 320 into interior 312 of housing 302 is represented. Cover 306 includes a generally cylindrical portion 350 which is coupled to first air supply conduit 320 and receives non-recycled air 348 from first air supply conduit 320. Adjacent the cylindrical portion 350 is a plunger shaped portion 352 having an expanded diameter to receive first driven clutch sheave 212 of driven clutch 204.

Adjacent to plunger shaped portion 352 is a flat portion 354 which is adjacent to an outer portion 358 of first driven clutch sheave 212. Flat portion 354 has a surface 360 which faces a surface 362 of outer portion 358 of first driven clutch sheave 212. In one embodiment, flat surface 360 of flat portion 354 and flat surface 362 of first driven clutch sheave 212 maintain a generally constant separation 364. In one example, separation 364 is about 9 millimeters (mm). In another example, separation 363 is from about 5 mm to about 50 mm. In a further example, separation 363 is from about 5 mm to about 30 mm. In yet another example, separation 363 is from about 5 mm to about 20 mm. In still another example, separation 363 is from about 9 mm to about 50 mm. In another example, separation 363 is from about 9 mm to about 30 mm. In still another example, separation 363 is from about 9 mm to about 20 mm. In the illustrated embodiment, both flat surface 360 and flat surface 362 are generally flat surfaces.

The shape of cover 306 results in recycled air 366 (see FIG. 11) from first driven clutch sheave 212 of driven clutch 204 to be fed to and contact first drive clutch sheave 208 of drive clutch 202. Referring back to FIG. 12, cover 306 has a smooth profile 370 from proximate the first air supply opening 324 to the flat surface 360 of flat portion 354. This profile 370 is void of any sharps corners or bends that would be obstacles to air flow. In one embodiment, smooth profile 370 has a plurality of contours each of which are generally tangent to each other at their intersections and are each devoid of discontinuities in slope. In one embodiment, smooth profile 370 has a plurality of contours each of which are tangent to each other at their intersections and are each devoid of discontinuities in slope. In one embodiment, cover 306 is molded and smooth profile 370 is a profile of a single molded part. In one embodiment, cover 306 is molded and a wall forming smooth profile 370 has a generally constant wall thickness.

Both the smooth profile 370 of cover 306 and the gap 364 between flat surface 360 of cover 306 and flat surface 362 of first driven clutch sheave 212 contribute to the acceleration of recycled air towards first drive clutch sheave 208 of drive clutch 202. When first driven clutch sheave 212 is rotating about rotation axis 330 gap 364 is a low pressure region that pulls air from along smooth profile 370 into the low pressure region. In one embodiment, recycled air 366 is accelerated to a speed of at least about 60 meters per second. In one embodiment, recycled air 366 is accelerated to a speed of at least about 1 meter per second. In one embodiment, recycled air 366 is accelerated to a speed of at least about 15 meters per second. In one embodiment, recycled air 366 is accelerated to a speed of between about 1 meter per second and about 60 meters per second.

Figure 9:
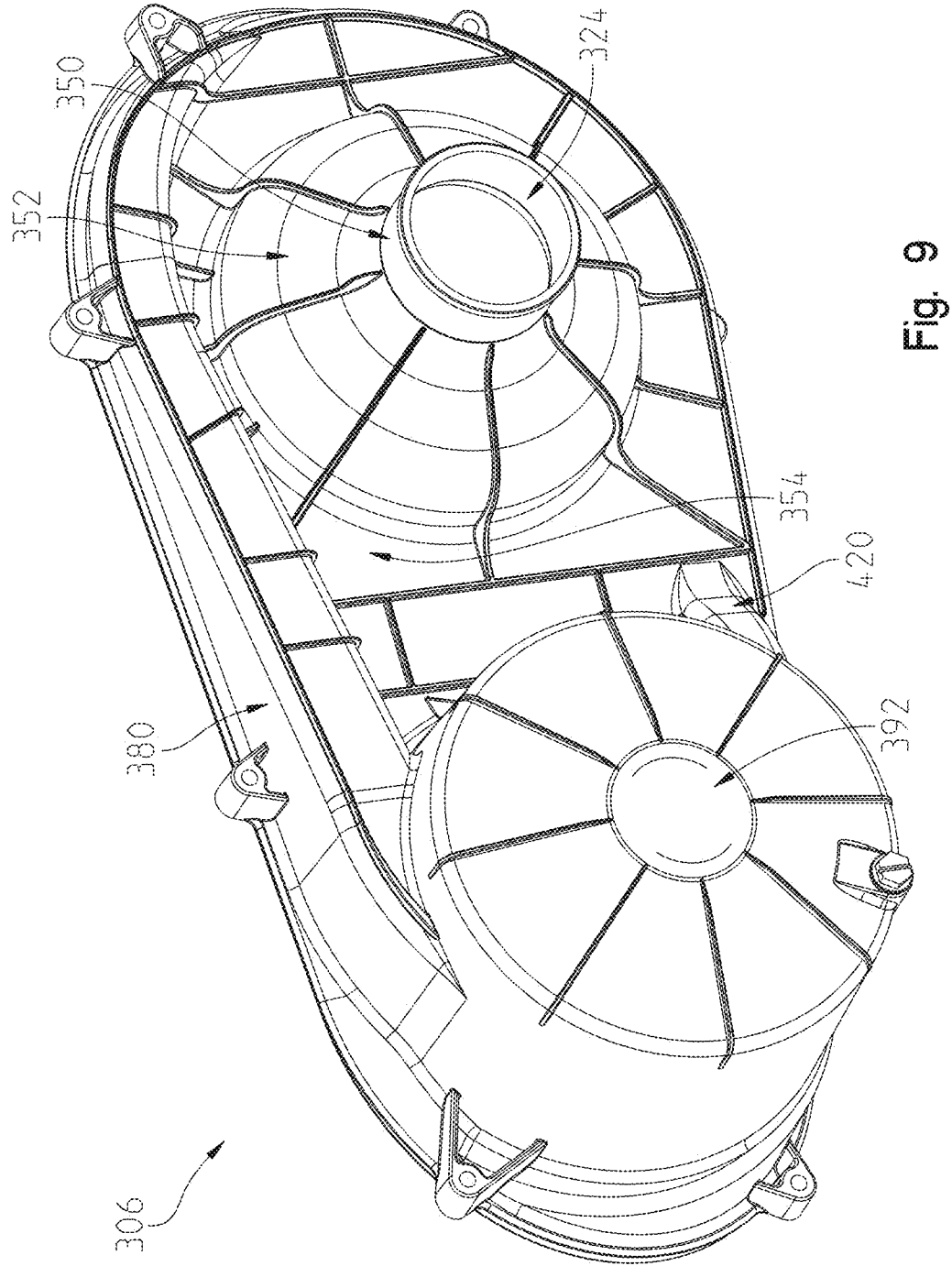
FIG. 9 illustrates a front, perspective view of a cover of the continuously variable transmission of FIG. 3.
Figure 10:
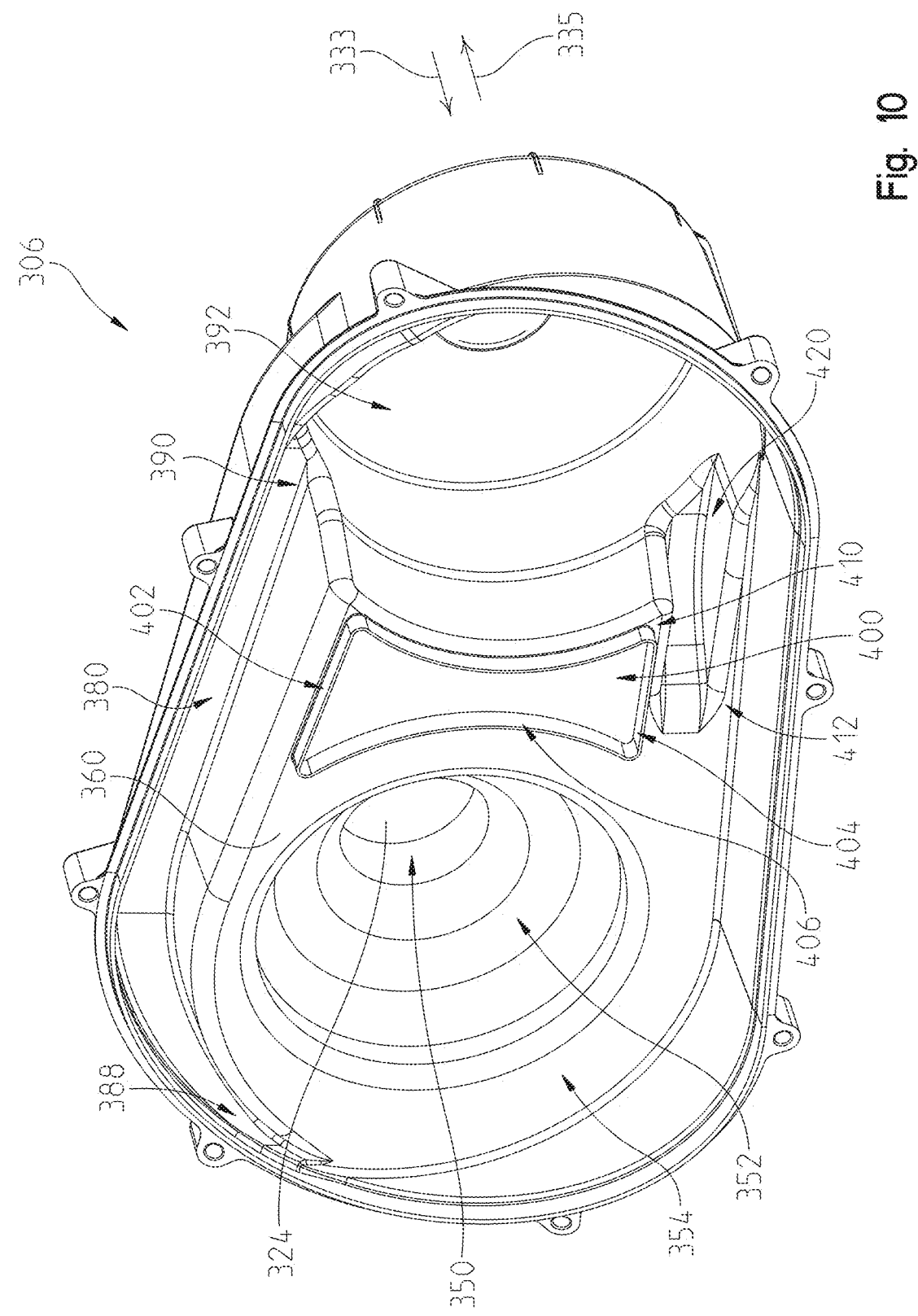
FIG. 10 illustrates a rear, perspective view of the cover of FIG. 9.

Referring to FIGS. 9 and 10, recycled air 366 exits gap 364 and is driven into air channel 380 of cover 306. Air channel 380 is bounded by wall 382, 384, and 386 (see FIG. 17). Wall 384 on a first end 388 blends into flat surface 360, as shown in FIG. 10. On a second end 390 the wall 384 terminates into a pocket 392 of cover 306 which receives first drive clutch sheave 208 of drive clutch 202.

Cover 306 further includes an air diverter 400 positioned to be located between drive clutch 202 and driven clutch 204. The air diverter 400 includes an upper portion 402, a lower portion 404, and a waist portion 406 between the upper portion 402 and the lower portion 404. Air diverter 400 channels air 366 to travel from proximate the driven clutch 204 to proximate the drive clutch 202 in a first region aligned with channel 380 the interior 312 of the housing 302 above the upper portion 402 of the air diverter 400. Air diverter 400 further channels air to travel from proximate the drive clutch 202 to proximate the driven clutch 204 in a second region 412 in the interior 312 of the housing 302 below the lower portion 404 of the air diverter 400.

The lower portion 404 of the air diverter 400 has an air peeler 410. Air peeler 410 divides the air into a first portion 412 which is channeled to travel from proximate the drive clutch 202 to proximate the driven clutch 204 in the second region 412 in the interior 312 of the housing 302 below the lower portion 404 of the air diverter 400 and a second portion 416 which is directed back towards the drive clutch 202. The air diverter 400 reduces any dead zones of low air flow or spinning air flow in the region of interior 312 between drive clutch 202 and driven clutch 204 while still permitting interaction between drive clutch 202 and driven clutch 204.

Figure 11:
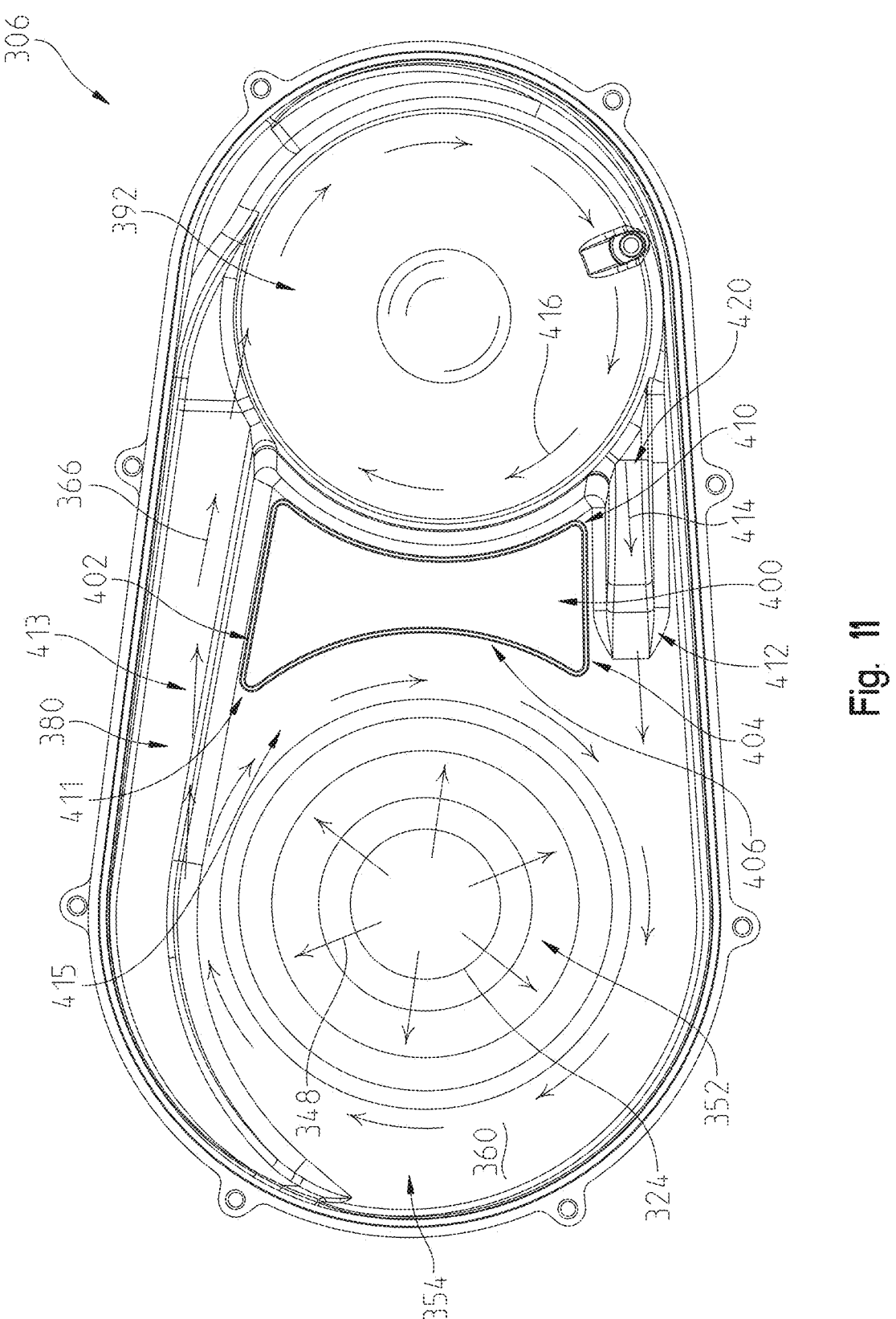
FIG. 11 illustrates a rear view of the cover of FIG. 9.

The upper portion 402 of the air diverter 400 has an air peeler 411 (see FIG. 11). Air peeler 411 divides the air into a first portion 413 which is channeled to travel towards the drive clutch 202 through channel 380 and a second portion 415 which is directed back towards the driven clutch 204. As shown in FIG. 15, a top surface 363 of air diverter 400 and hence air peeler 411 extends beyond flat surface 362 of drive clutch 204. Thus, air in gap 364 contacts air diverter 400 as it moves away from driven clutch 204.

In the illustrated embodiment, air diverter 400 extends from the flat surface 360 of cover 306 of housing 302 in a first direction 333 and pocket 392 to receive drive clutch 202 extends from flat surface 360 of cover 306 of housing 302 in a second direction 335, opposite the first direction 333. Cover 306 of housing 302 further includes a channel 420 positioned below air diverter 400 and extending from pocket 392 to flat surface 360 of cover 306 of housing 302.

Figure 7:
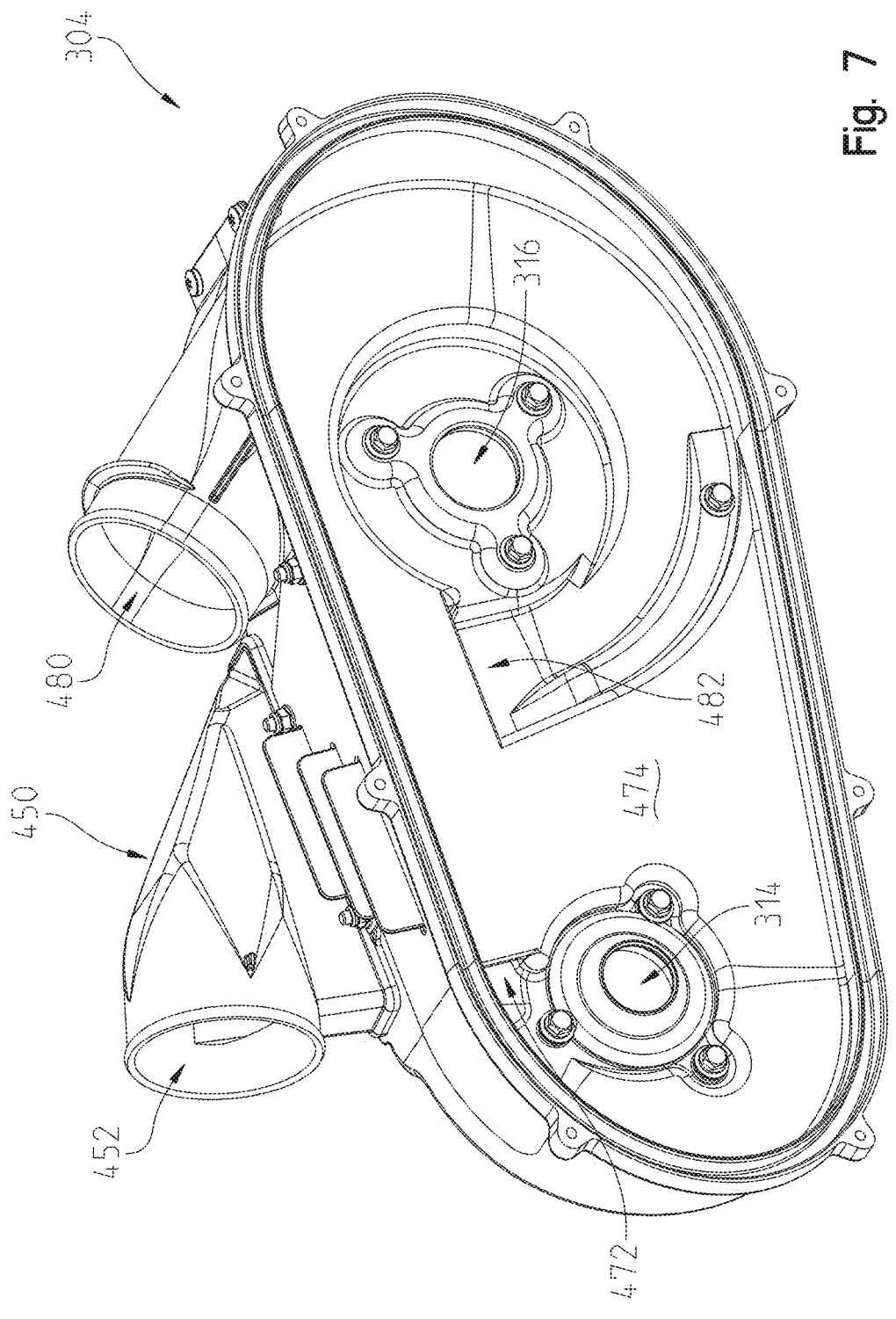
FIG. 7 illustrates a front, perspective view of a base of the continuously variable transmission of FIG. 3.
Figure 8:
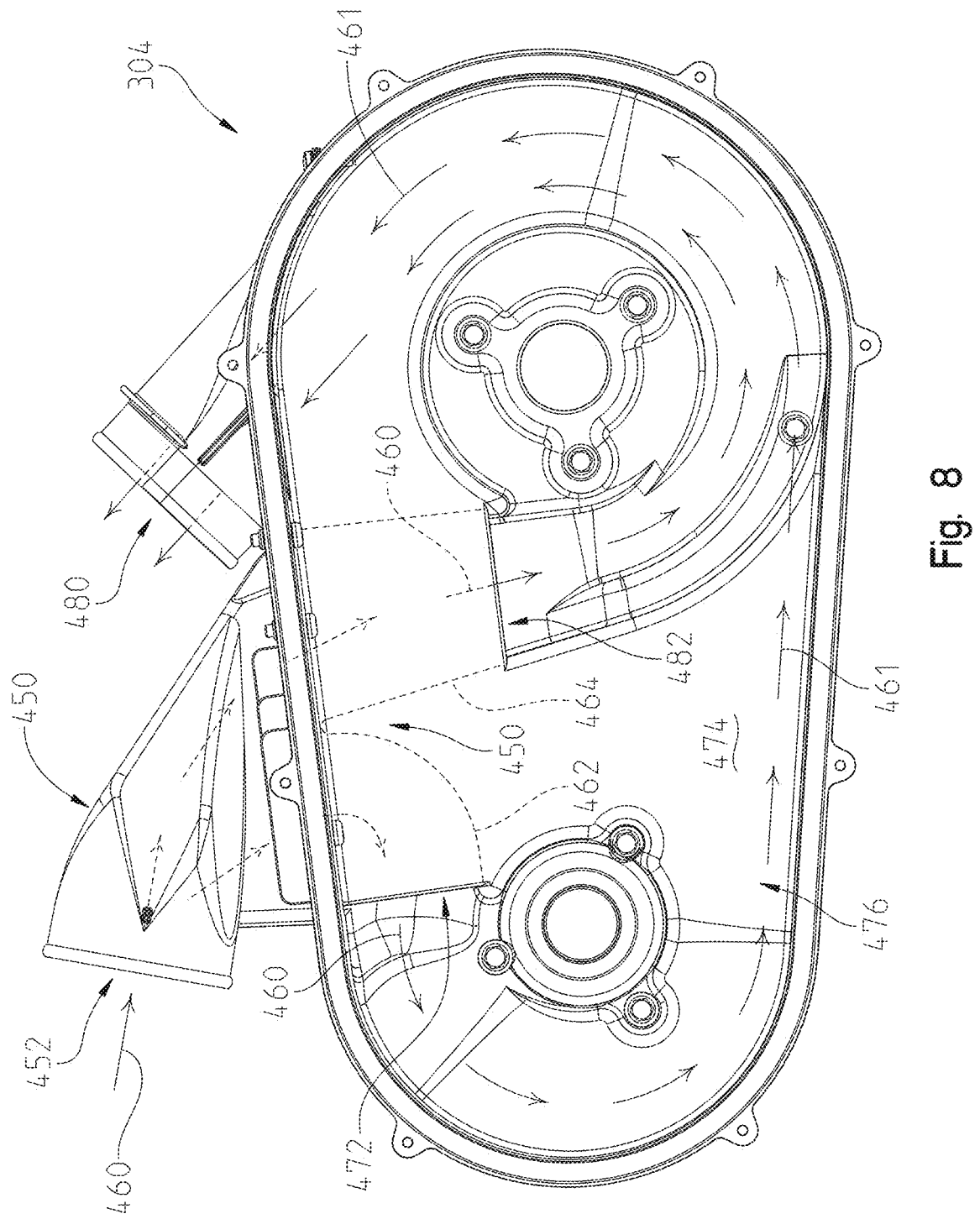
FIG. 8 illustrates a front view of the base of FIG. 7.

As discussed above, first driven clutch sheave 212 of driven clutch 204 receives non-recycled air from first air supply conduit 320 through first air supply opening 324 of cover 306 and first drive clutch sheave 208 of drive clutch 202 receives recycled air 366 from first driven clutch sheave 212 of driven clutch 204. Referring to FIGS. 4, 7, and 8, second drive clutch sheave 210 of drive clutch 202 and second driven clutch sheave 214 of driven clutch 204 receive non-recycled air from second air supply conduit 322 through an air duct 450. Air duct 450 includes a first open end 452 which receives the ambient air from second air supply conduit 322 and a second open end which mates with a diverter portion 354 of base 304. Diverter portion 454 receives the non-recycled air 460 from fluid duct 450 and communicates it to interior 312 of continuously variable transmission 300. Diverter portion 450 includes a plurality of conduits which direct the ambient air to various portions of interior 312 of continuously variable transmission 300. In one embodiment, diverter portion 450 includes a first conduit 462 (see FIG. 4) and a second conduit 464 (see FIG. 4). As shown in FIG. 4, conduit 390 and conduit 392 are provided as part of the wall 470 of base 304.

Referring to FIG. 8, first conduit 462 enters interior 312 of housing 302 through opening 472 in interior wall 474 of base 304. Opening 472 is positioned proximate drive clutch 202. Non-recycled air 460 passes through opening 472 and contacts second drive clutch sheave 210 of drive clutch 202 or otherwise takes on heat from second drive clutch sheave 210 of drive clutch 202, thus becoming recycled air 461 which is fed along a lower portion 476 of base 304 around driven clutch 204 and out of an air outlet 480 of continuously variable transmission 300. Second conduit 464 enters interior 312 of continuously variable transmission 300 through opening 482 in interior wall 474 of base 304.

Opening 482 is positioned proximate to second driven clutch sheave 214 of driven clutch 204. Non-recycled air 460 passes through opening 482 and contacts second driven clutch sheave 214 of driven clutch 204 or otherwise takes on heat from second driven clutch sheave 214 of driven clutch 204, thus becoming recycled air 461 which is fed to air outlet 480 of continuously variable transmission 300. Air outlet 480 is in fluid communication with an interior of an air exhaust conduit 490 (see FIG. 5). In one embodiment, an outlet of the air exhaust conduit 490 is positioned so that the recycled air is blown over a portion of power source 106.

In one embodiment, drive clutch 202 and driven clutch 204 includes fins which direct airflow. An exemplary CVT member with fins is disclosed in U.S. patent application Ser. No. 12/069,521, filed Feb. 11, 2008, docket PLR-02-1962.04P, titled SUSPENSION FOR AN ALL TERRAIN VEHICLE, the entire disclosure of which is expressly incorporated by reference herein. Additional details regarding an exemplary air duct 450 and exemplary air conduits 462, 464 are disclosed in U.S. patent application Ser. No. 14/133,138, filed Dec. 18, 2013, titled SIDE-BY-SIDE VEHICLE, the entire disclosure of which is expressly incorporated by reference herein.

As explained herein, housing 302 provides geometry which facilitates interaction between drive clutch 202 and driven clutch 204. Specifically, housing 302 facilitates the feeding of air from driven clutch 204 to drive clutch 202. Further, housing 302 facilitates the feeding of air from drive clutch 202 to driven clutch 204.

Continuously variable transmission 300 is one example of a continuously variable transmission wherein non-recycled air is provided to three of first drive clutch sheave 208 of drive clutch 202, second drive clutch sheave 210 of drive clutch 202, first driven clutch sheave 212 of driven clutch 204, and second driven clutch sheave 214 of driven clutch 204 through less than three air supply conduits, illustratively air supply conduits 320 and 322. Each one of first air supply conduit 320 and second air supply conduit 322 provides non-recycled air from an exterior of the housing 302 to the interior 312 of the housing 302 through at least one air supply openings, illustratively openings 324, 472, and 482, in the housing 302. Referring to FIGS. 20-30, continuously variable transmission 500 is illustrated. Continuously variable transmission 500 is one example of a continuously variable transmission wherein non-recycled air is provided to all four of first drive clutch sheave 208 of drive clutch 202, second drive clutch sheave 210 of drive clutch 202, first driven clutch sheave 212 of driven clutch 204, and second driven clutch sheave 214 of driven clutch 204 through less than four air supply conduits which provide non-recycled air from an exterior of the housing of continuously variable transmission 500 to the interior of the housing of continuously variable transmission 500 through at least one air supply openings in the housing of continuously variable transmission 500.

Figure 20:
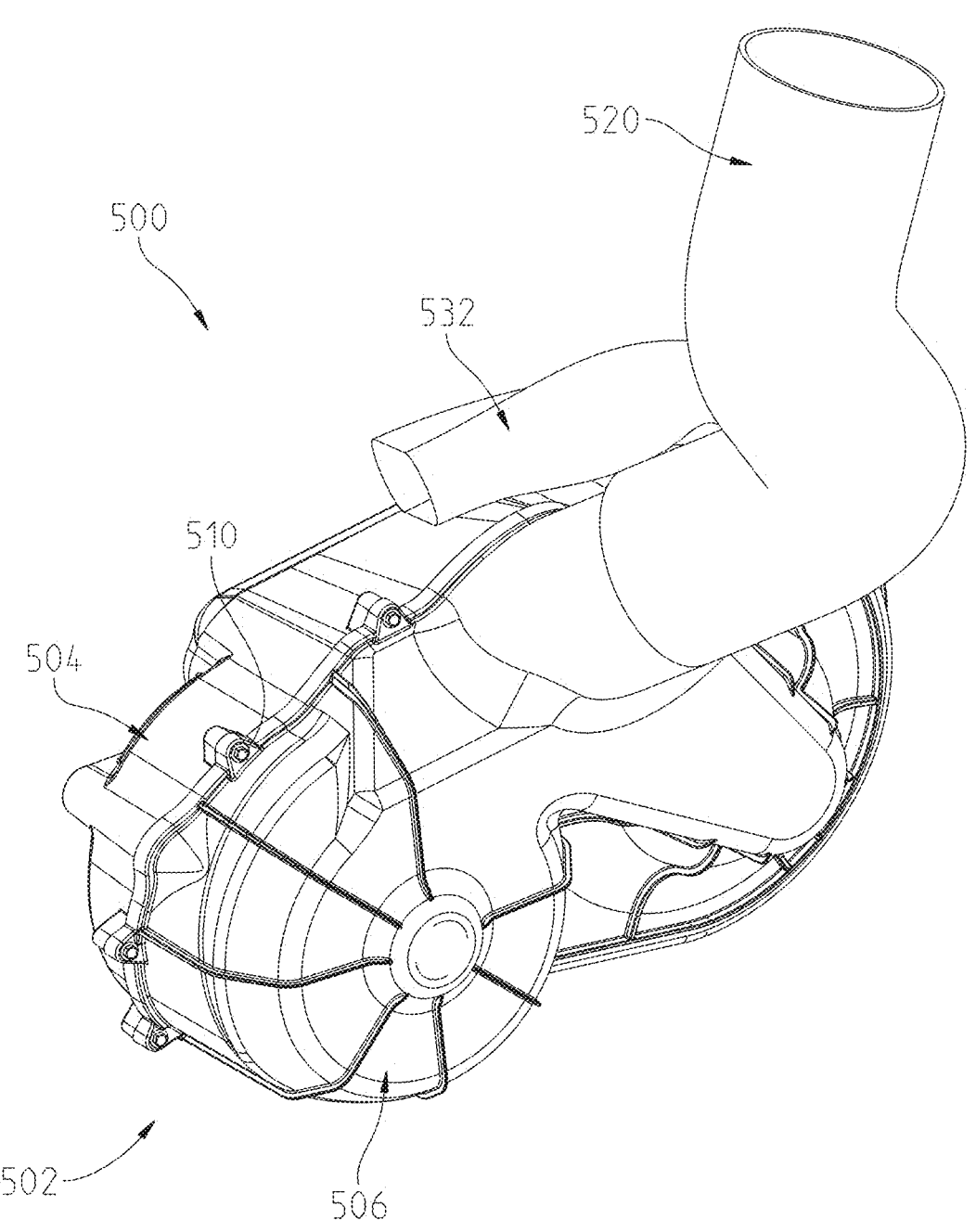
FIG. 20 illustrates a front, perspective view of another exemplary continuously variable transmission.
Figure 22:
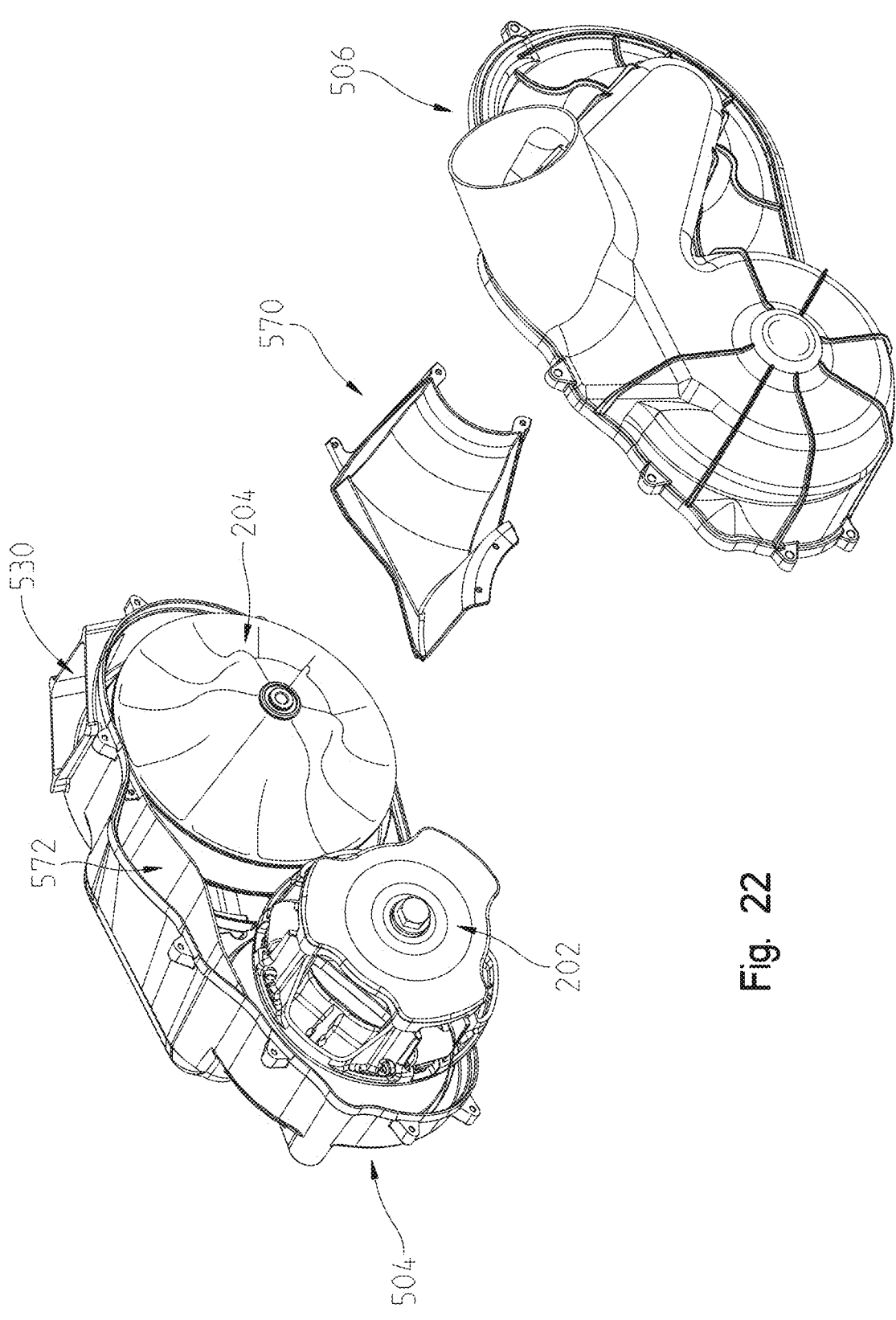
FIG. 22 illustrates a front, perspective view of the continuously variable transmission of FIG. 20 with the air supply conduit and exhaust conduit removed and a cover and air diverter exploded.
Figure 23:
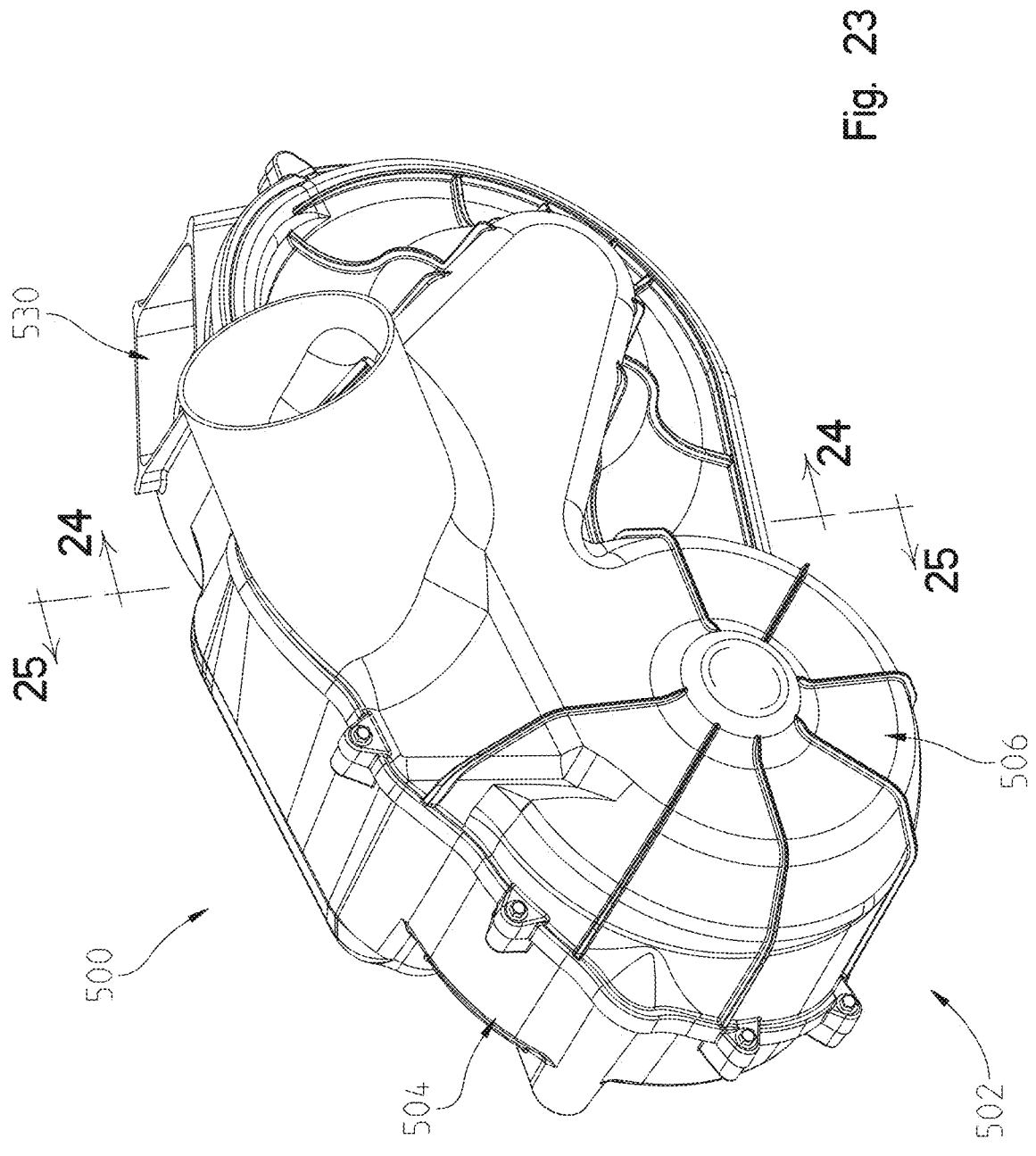
FIG. 23 illustrates a front, perspective view of the continuously variable transmission of FIG. 20 with the air supply conduit and exhaust conduit removed.
Figure 24:
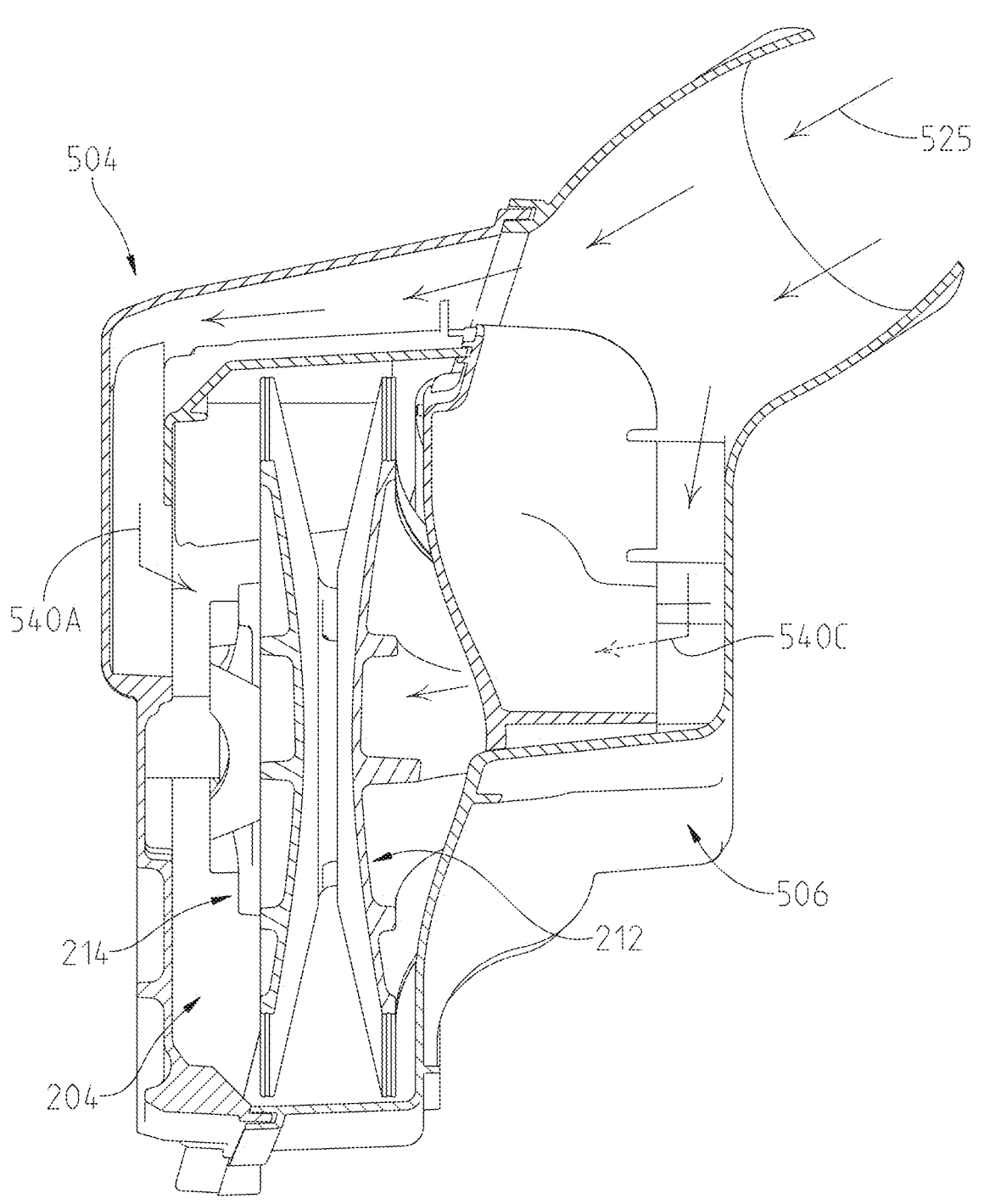
FIG. 24 illustrates a sectional view along lines 24-24 in FIG. 23.
Figure 25:
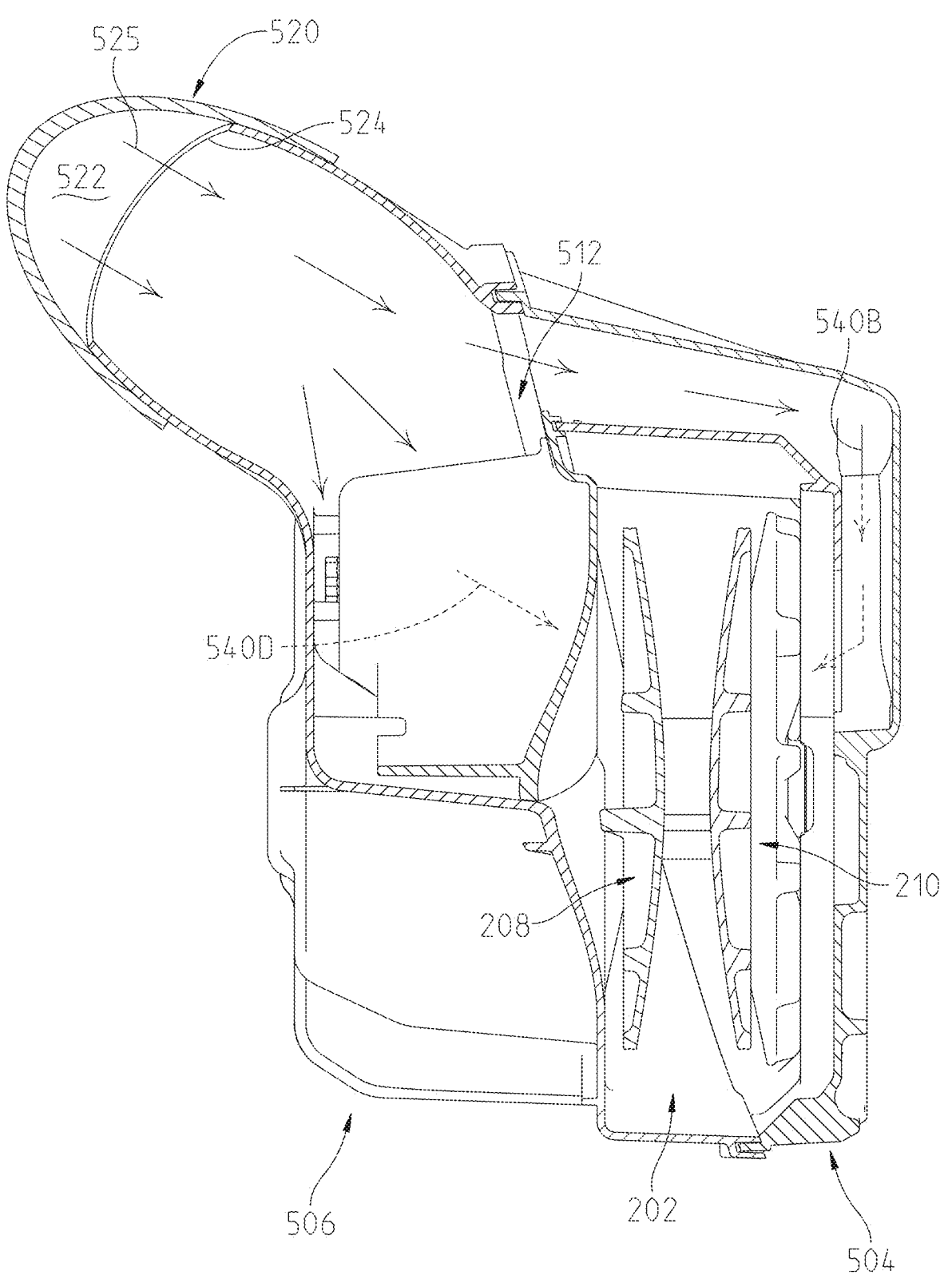
FIG. 25 illustrates a sectional view along lines 25-25 in FIG. 23.

Referring to FIGS. 20-30, an exemplary continuously variable transmission 500 is illustrated. Referring to FIGS. 20 and 22, continuously variable transmission 500 includes a housing 502 (FIG. 4) including a base 504 and a cover 506. Cover 506 is coupled to base 504 with a plurality of fasteners 510. In one embodiment, a seal (not shown) positioned between base 504 and cover 506 to minimize dust entering an interior 512 (see FIG. 24) of housing 502. Base 504 and cover 506 cooperate to define interior 512 of housing 502.

Figure 26:
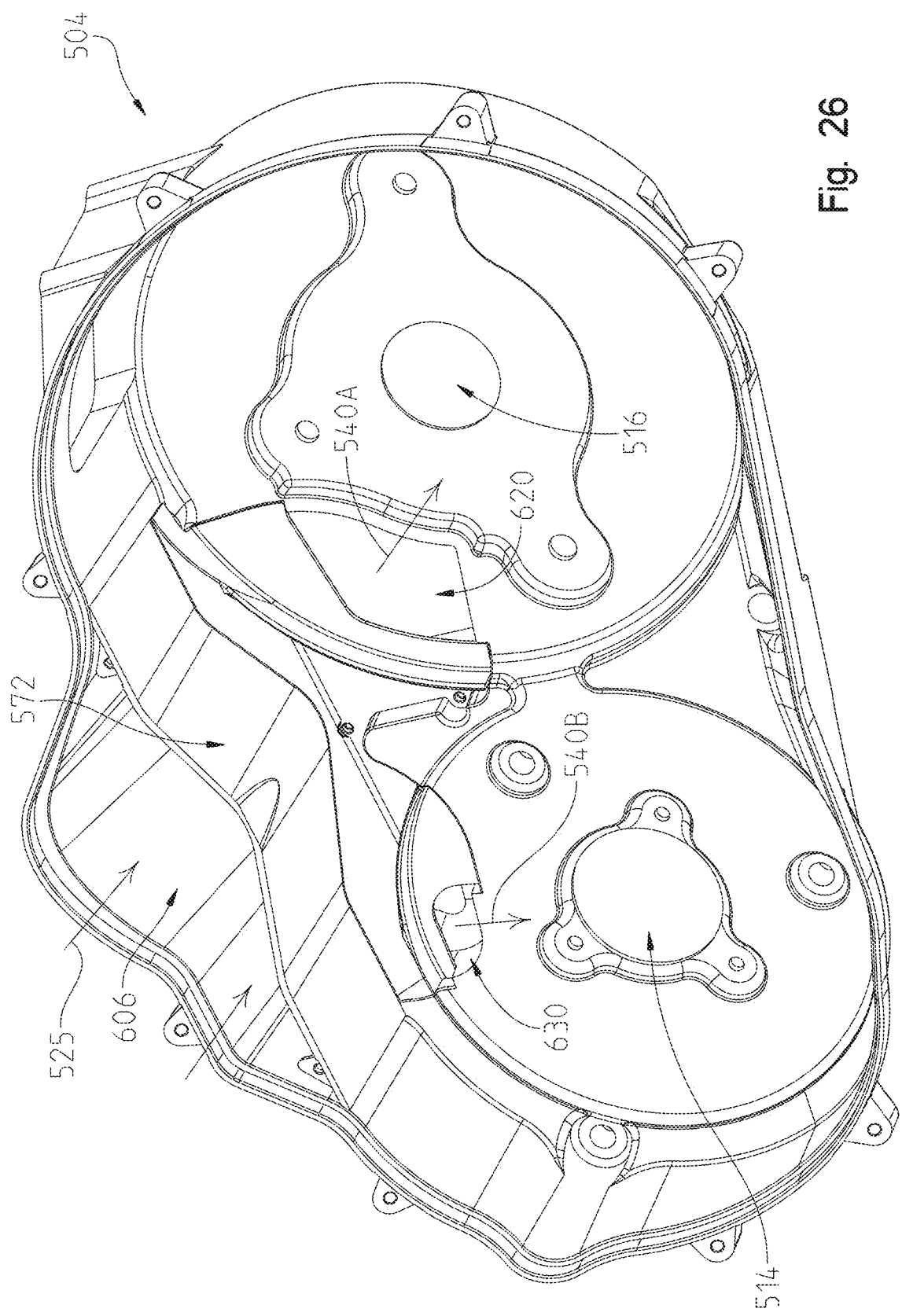
FIG. 26 illustrates a front, perspective view of an assembly of a base of the continuously variable transmission of FIG. 20 and an air diverter of the continuously variable transmission of FIG. 20.

As shown in FIG. 22, drive clutch 202, driven clutch 204, and drive belt (not shown) are positioned within interior 512 of housing 502. Referring to FIG. 26, base 504 includes a first opening 514 through which drive clutch 202 is coupled to output shaft 120 and a second opening 516 through which driven clutch 204 is coupled to output shaft 128. In one embodiment, base 504 is coupled to power source 106 and shiftable transmission 130 to minimize dust entering first opening 514 and second opening 516.

Continuously variable transmission 500 includes a single air supply conduit 520 coupled to housing 502. An interior 522 (see FIG. 24) of air supply conduit 520 is in fluid communication with an air supply opening 524 in cover 506 of housing. Non-recycled air 525 from air supply conduit 520 enters interior 512 of housing 502 through first air supply opening 524 in cover 506 and is routed to directly contact each one of first drive clutch sheave 208 of drive clutch 202, second drive clutch sheave 210 of drive clutch 202, first driven clutch sheave 212 of driven clutch 204, and second driven clutch sheave 214 of driven clutch 204. As such, each one of first drive clutch sheave 208 of drive clutch 202, second drive clutch sheave 210 of drive clutch 202, first driven clutch sheave 212 of driven clutch 204, and second driven clutch sheave 214 of driven clutch 204 receives non-recycled air from interior 522 of single air supply conduit 520. Air is exhausted from interior 512 of housing 502 through an air outlet opening 530 (see FIG. 22). The exhausted air is communicated to an air exhaust conduit 532.

As explained herein, housing 502 includes geometry to divide the non-recycled air 525 entering into interior 512 into at least four streams of non-recycled air. In the illustrated embodiment, a first stream 540A which contacts second driven clutch sheave 214 of driven clutch 204 (see FIG. 24), a second stream 540B which contacts second drive clutch sheave 210 of drive clutch 202 (see FIG. 25), a third stream 540C which contacts first driven clutch sheave 212 of driven clutch 204 (see FIG. 24), and a fourth stream 540D which contacts first drive clutch sheave 208 of drive clutch 202 (see FIG. 25).

Figure 30:
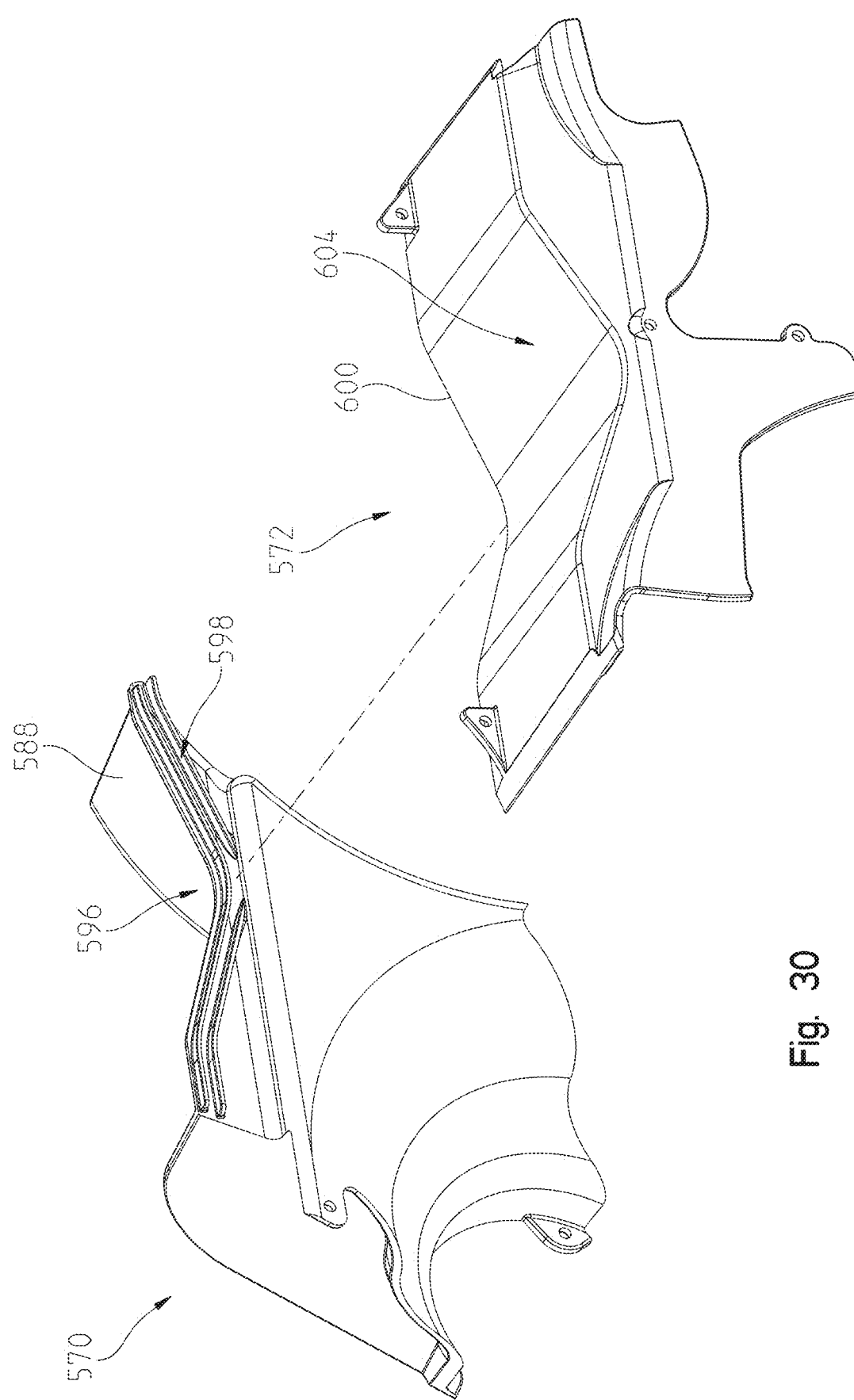
FIG. 30 illustrates an exploded view of the air diverter of FIG. 26 and the air diverter of FIG. 28.

Referring to FIG. 30, a first air diverter 570 and a second air diverter 572 are shown. First air diverter 570 and second air diverter 572 are both positioned within housing 502 and are supported by at least one of base 504 and cover 506. First air diverter 570 and second air diverter 572 divide non-recycled air 525 into first stream 540A, second stream 540B, third stream 540C, and fourth stream 540D within interior 512 of housing 502.

Figure 28:
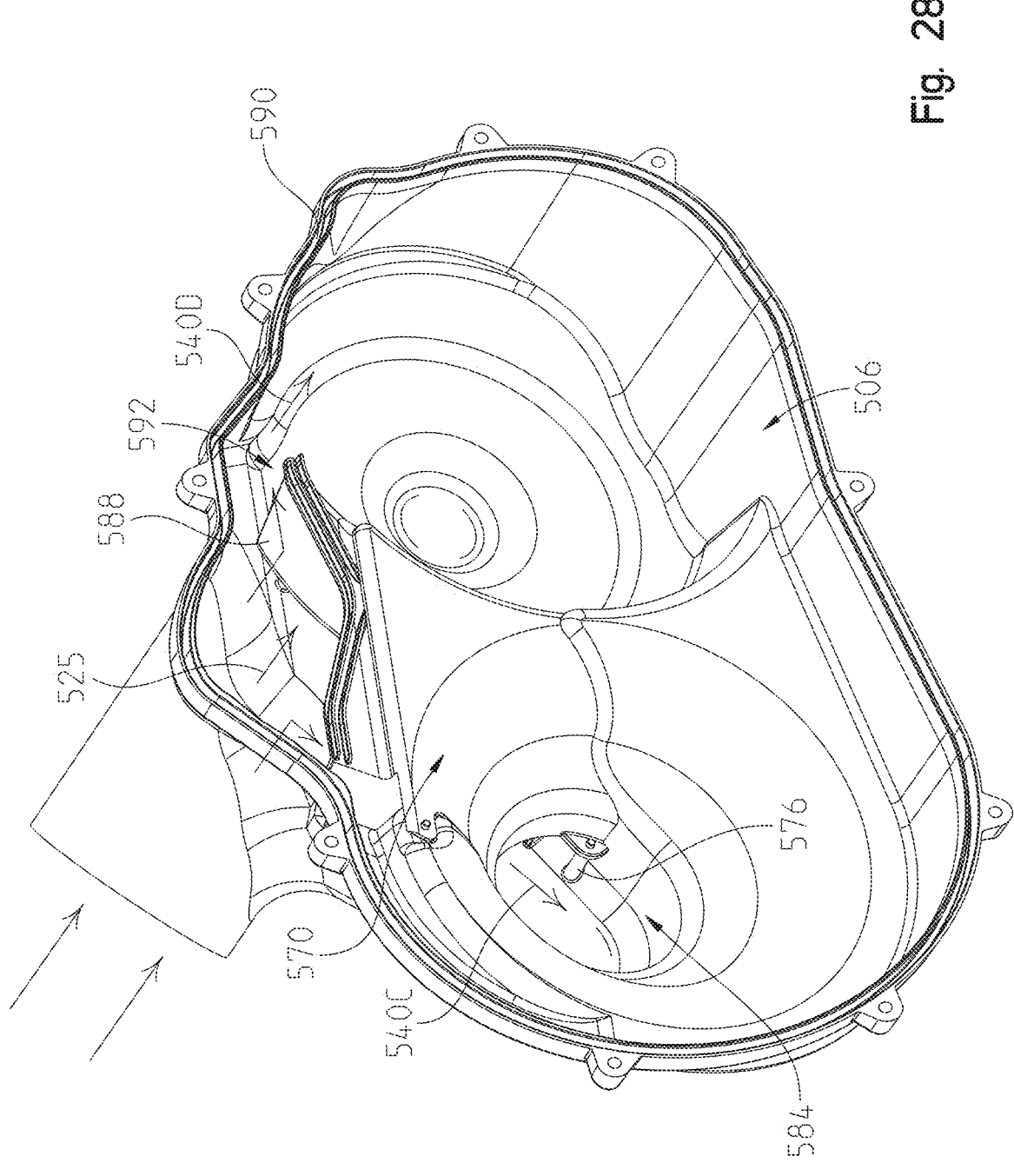
FIG. 28 illustrates a rear, perspective view of an assembly of the cover of the continuously variable transmission of FIG. 20 and an air diverter of the continuously variable transmission of FIG. 20.
Figure 29:
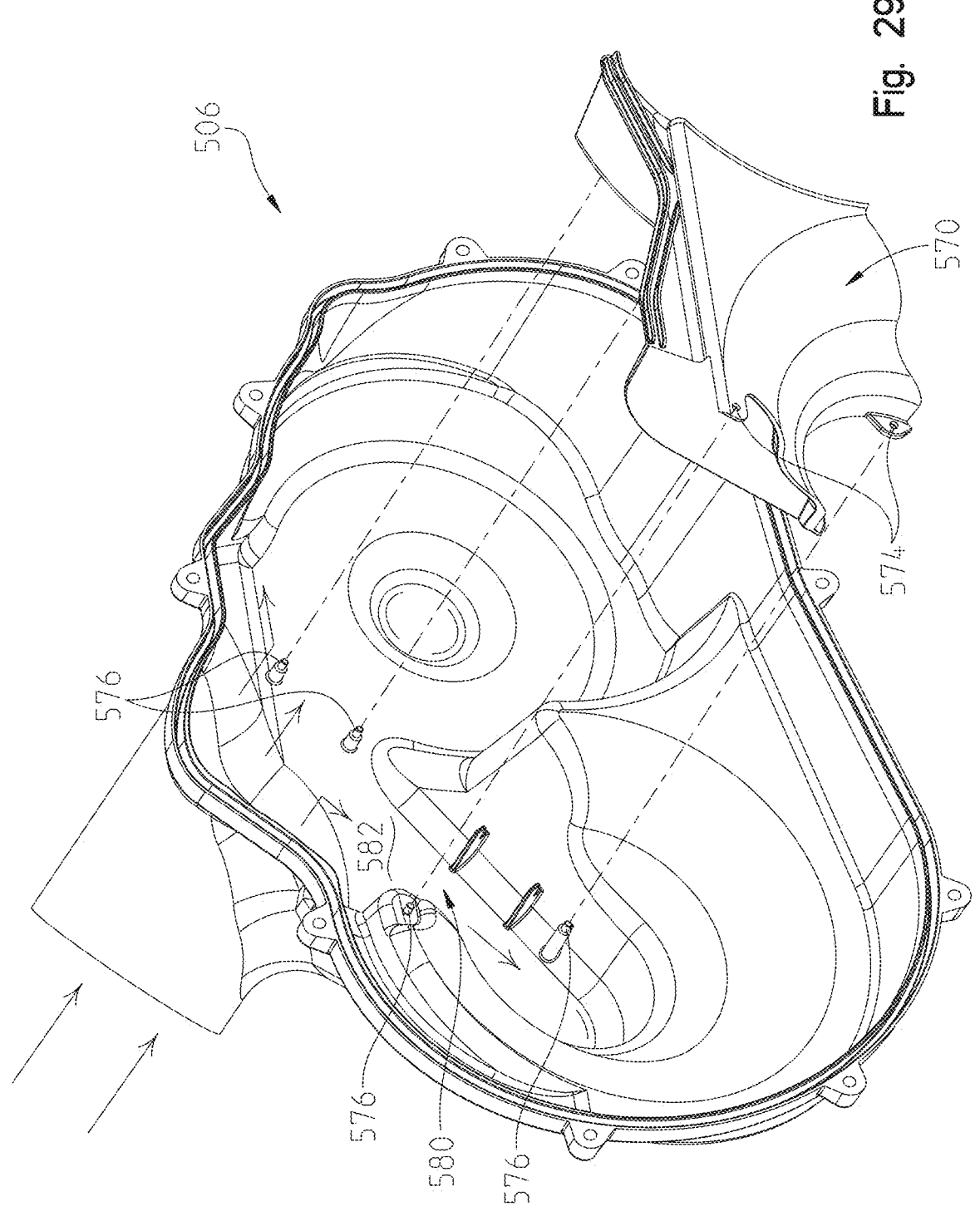
FIG. 29 illustrates the assembly of FIG. 28 with the air diverter exploded from the cover.

Referring to FIGS. 28 and 29, first air diverter 570 includes apertures 574 which receive corresponding protrusions 576 on the inside surface of cover 506. First air diverter 570 may be secured to cover 506 with one or more fasteners.

An air conduit is formed in a pocket 580 of cover 506 between an inner wall 582 of cover 506 and first air diverter 570. The air conduit terminates in an air opening 584 formed by pocket 580 and first air diverter 570. Through air opening 584, third stream 540C passes to contact first driven clutch sheave 212 of driven clutch 204. Another air conduit is formed between an upper surface 588 of first air diverter 570 and an upper portion 590 of cover 506. The air conduit terminates in an air opening 592 formed by upper surface 588 of first air diverter 570 and an upper portion 590 of cover 506. Through air opening 592, fourth stream 540D passes to contact first drive clutch sheave 208 of drive clutch 202.

Referring to FIG. 30, first air diverter 570 includes a valley portion 596. Non-recycled air 525 travels over upper surface 588 and through valley portion 596 to each of second driven clutch sheave 214 of driven clutch 204 and second drive clutch sheave 210 of drive clutch 202. As shown in FIG. 30, first air diverter 570 includes a recess 598 which receives an edge 600 of second air diverter 572. The air flowing through valley portion 596 of first air diverter 570 travels over an upper surface 604 of second air diverter 572. As shown in FIG. 26, the air travels in a space between upper surface 604 and an upper portion 606 of base 504.

Figure 27:
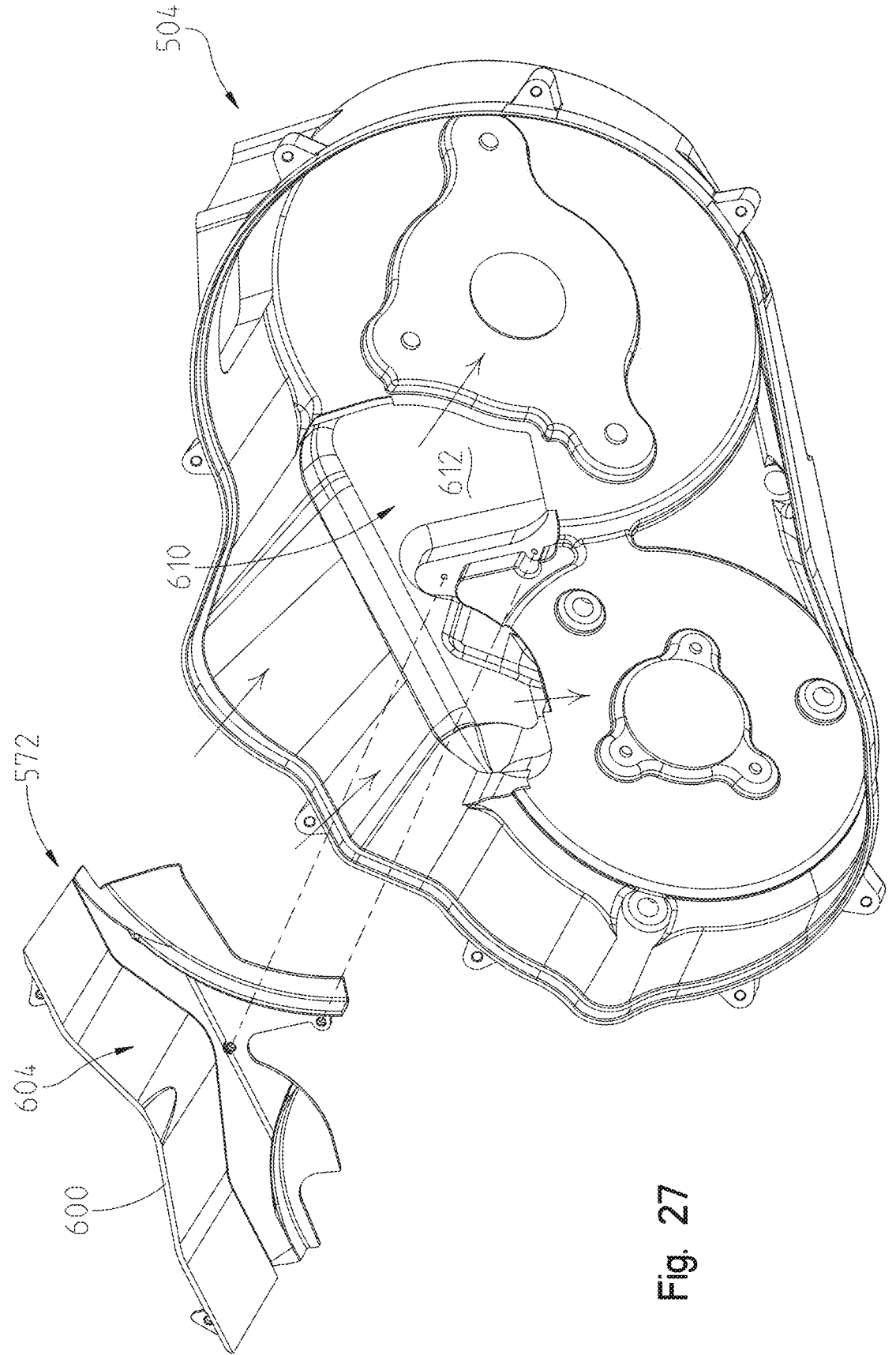
FIG. 27 illustrates the assembly of FIG. 26 with the air diverter exploded from the base.

Referring to FIG. 27, second air diverter 572 is assembled to base 504 to form air conduits for first stream 540A and second stream 540B. Second air diverter 572 may be secured to base 504 with fasteners. An air conduit is formed in a pocket 610 of base 504 between an inner wall 612 of base 504 and second air diverter 572. The air conduit terminates in an air opening 620 (see FIG. 26) formed by pocket 610 and second air diverter 572. Through air opening 620, first stream 540A passes to contact second driven clutch sheave 214 of driven clutch 204. Another air conduit is formed between pocket 610 and second air diverter 572. The air conduit terminates in an air opening 630 formed by second air diverter 572 and pocket 610 of base 504. Through air opening 630, second stream 540B passes to contact second drive clutch sheave 210 of drive clutch 202.

Figure 20A:
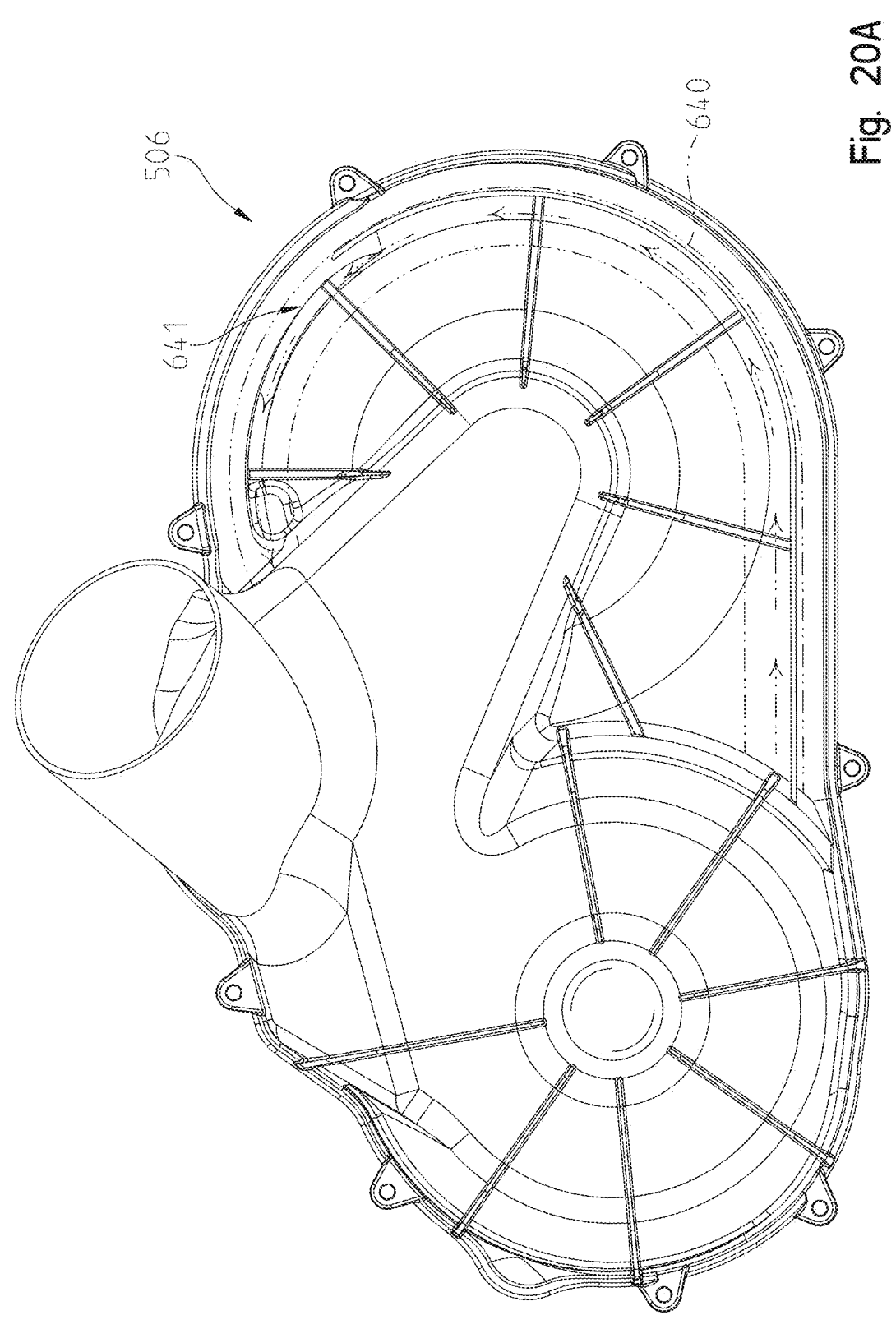
FIG. 20A illustrates a front view of one embodiment of a cover of the continuously variable transmission of FIG. 20.

Referring to FIG. 20A, in one embodiment, cover 506 includes a channel 640, similar to channel 380 of continuously variable transmission 300, which feds recycled air from proximate drive clutch 202 around driven clutch 204 and out through air outlet opening 530. Cover 506 may include a feature similar to air peeler 410 which assists in peeling air off of drive clutch 202 and into channel 640. This air is fed to atmosphere through air exhaust conduit 532 from a positive pressure area around drive clutch 202. In one embodiment, channel 640 is an open channel like channel 380. In one embodiment, channel 640 is a closed channel wherein plate or other component is coupled to cover 506 to guide the air around driven clutch 204 without interaction with driven clutch 204. In this embodiment, an opening is provided in approximately region 641 (see FIG. 20A) wherein the air is reintroduced into the area proximate driven clutch 204 and fed to air exhaust conduit 532.

Figure 20B:
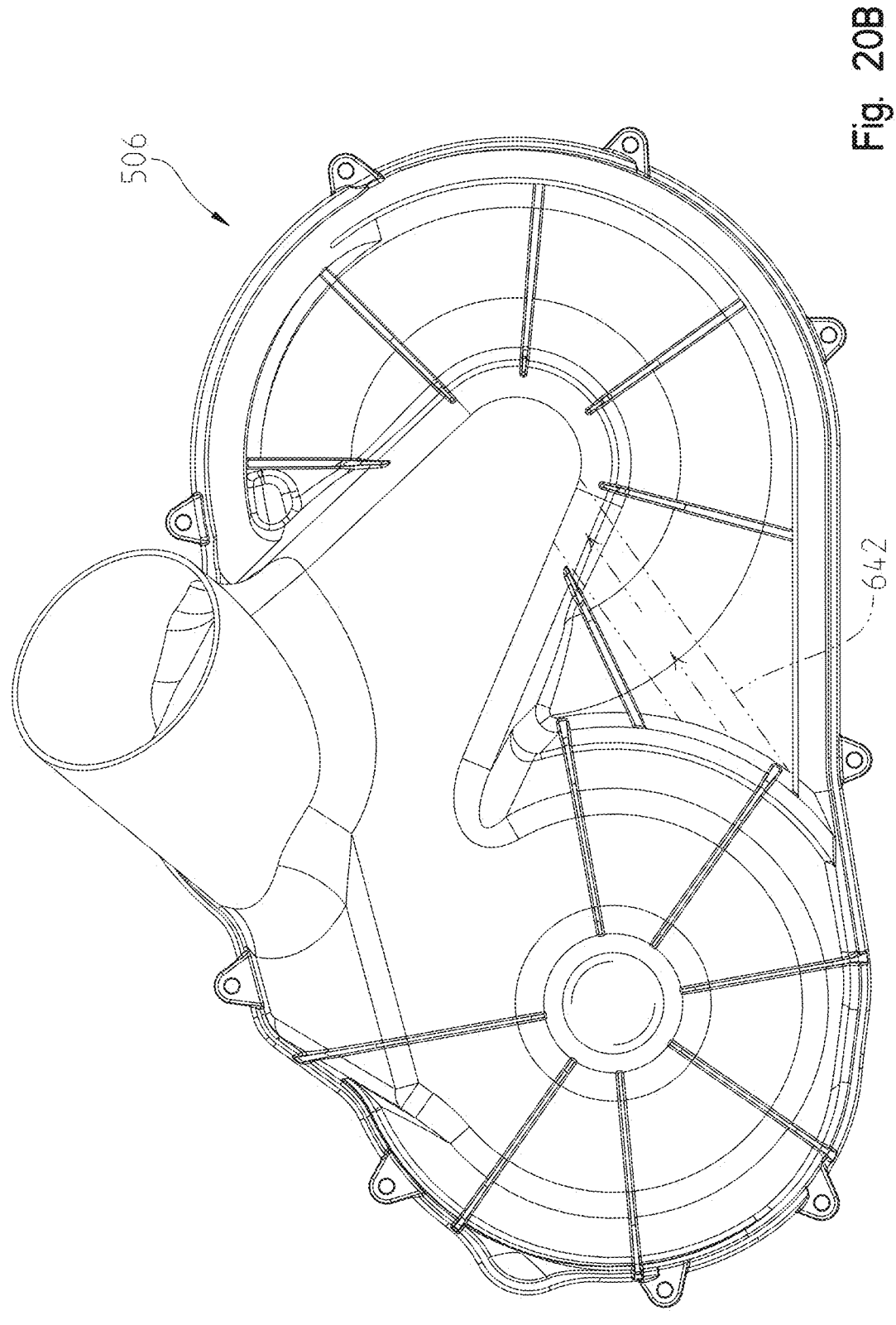
FIG. 20B illustrates a front view of one embodiment of a cover of the continuously variable transmission of FIG. 20.
Figure 21:
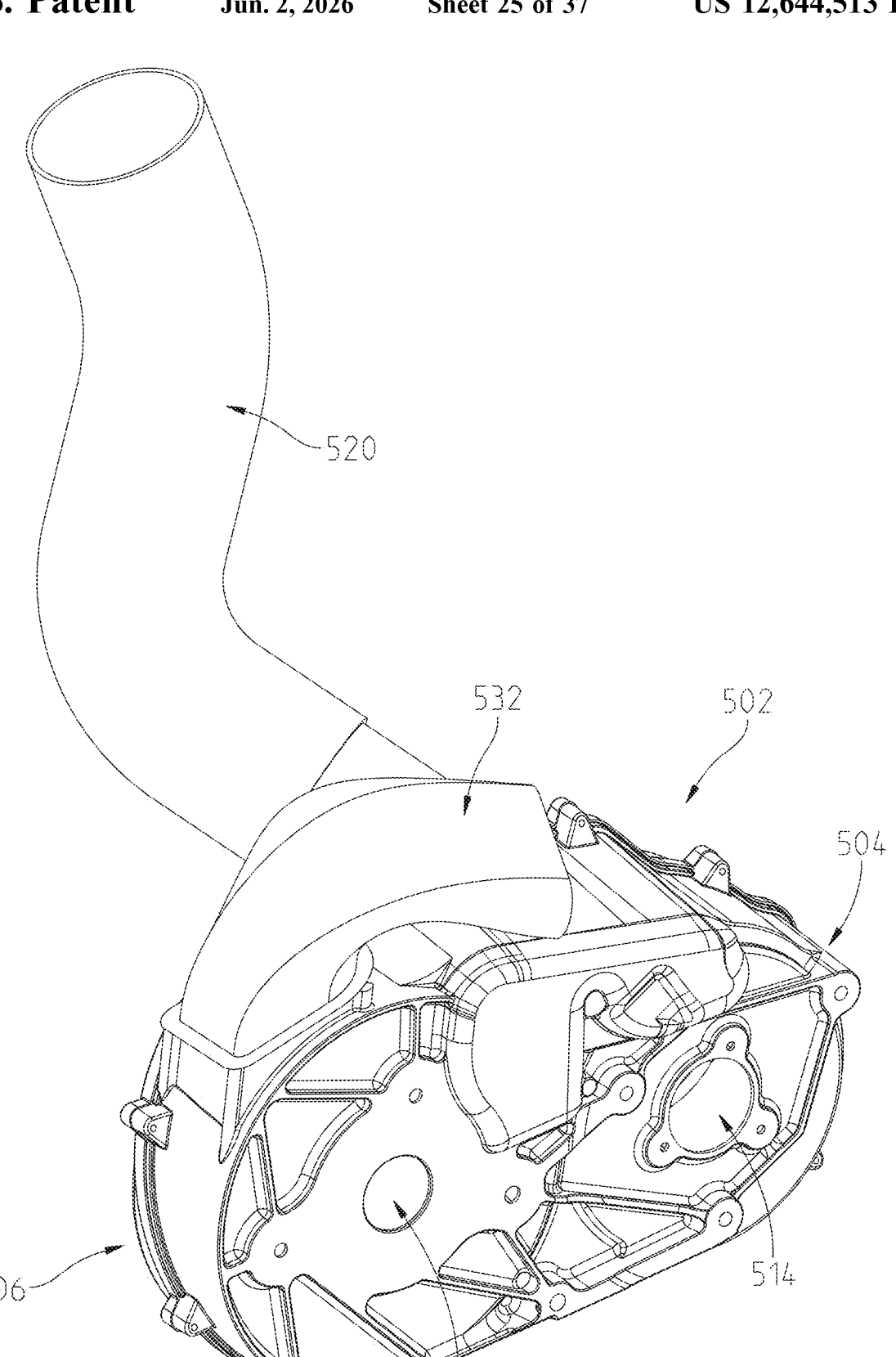
FIG. 21 illustrates a rear, perspective view of the continuously variable transmission of FIG. 20.

Referring to FIG. 20B, in one embodiment cover 506 includes a channel 642, similar to channel 380 of continuously variable transmission 300, which feds recycled air from proximate drive clutch 202 to a central portion of driven clutch 204. Cover 506 may include a feature similar to air peeler 410 which assists in peeling air off of drive clutch 202 and into channel 642. This air is fed to a negative pressure area proximate the inlet for driven clutch 204 from a positive pressure area around drive clutch 202.

Figure 31:
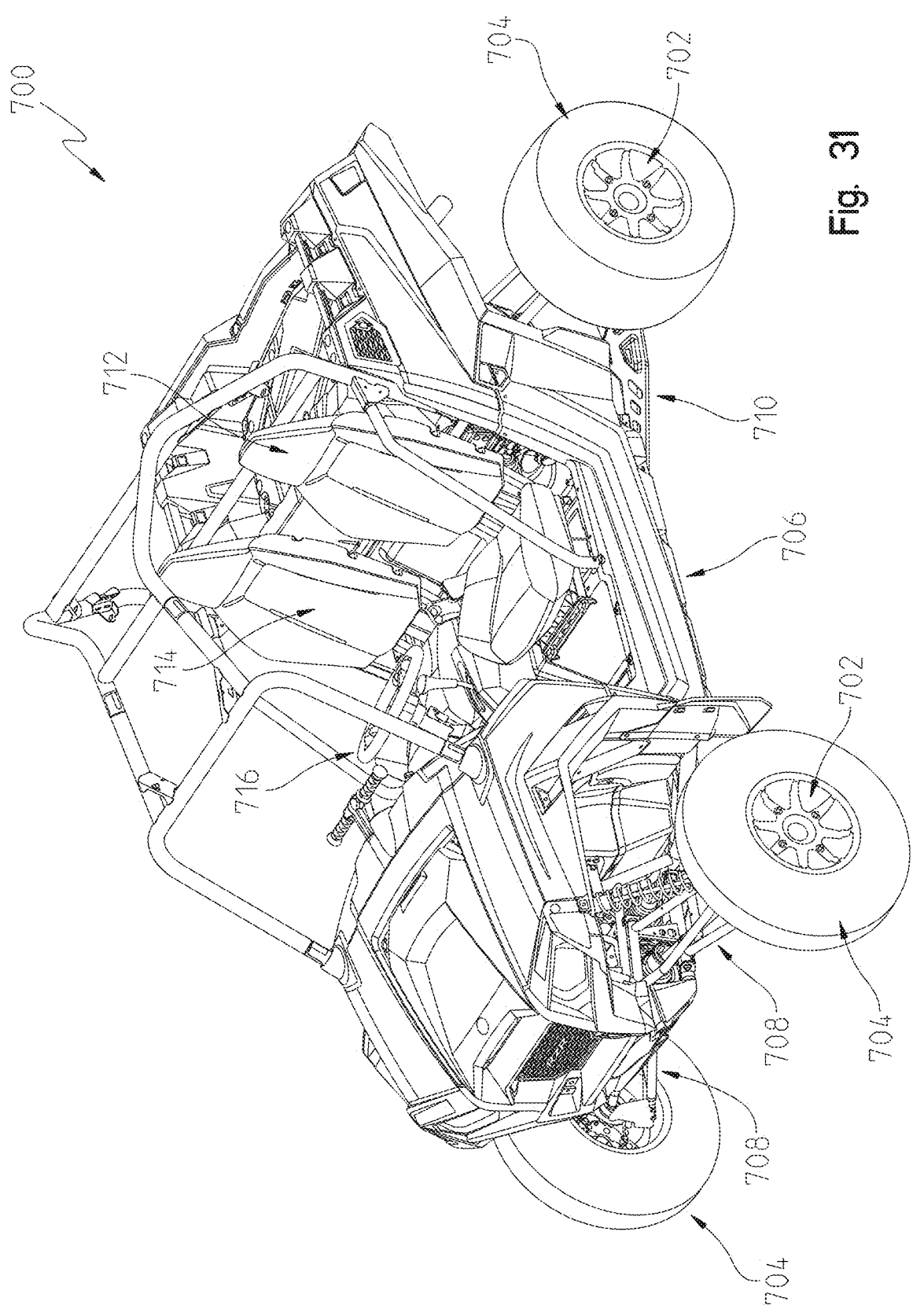
FIG. 31 illustrates an exemplary side-by-side vehicle.

The continuously variable transmissions 122, 200, 250, 300, and 500 may be used on various types of vehicles 100. Referring to FIG. 31, one exemplary vehicle, a side-by-side vehicle 700 is shown. Vehicle 700, as illustrated, includes a plurality of wheels 702 and associated tires 704 which support a frame 706 through respective front suspension 708 and rear suspension 710. Vehicle 700 includes an operator seat area 712 and a passenger seat area 714. Further, an operator may steer the front wheels 702 through steering wheel 716. Additional details regarding exemplary side-by-side vehicles are provided in U.S. patent application Ser. No. 11/494,890 and U.S. patent application Ser. No. 11/494,891, the disclosures of which are expressly incorporated by reference herein.

Figure 32:
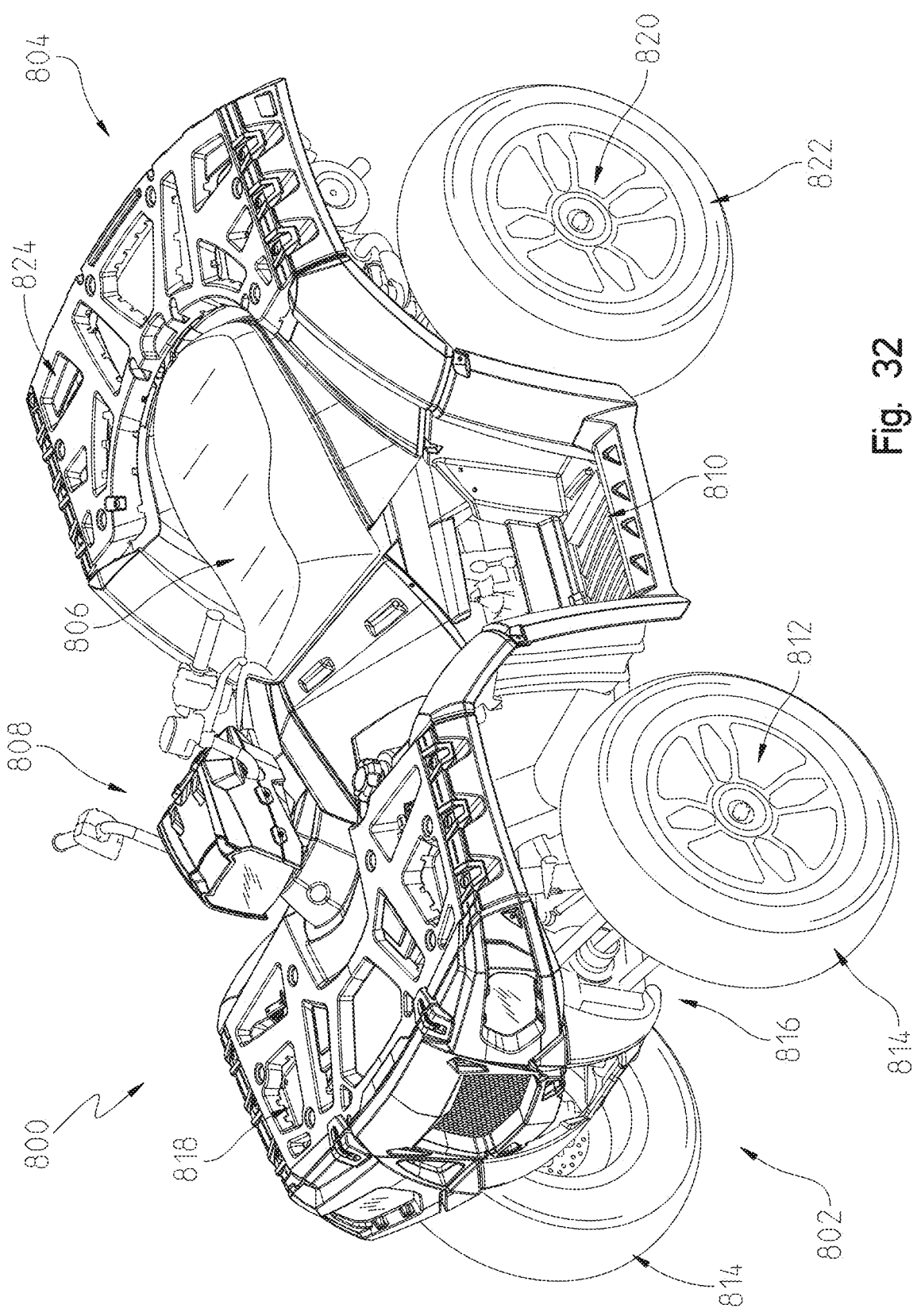
FIG. 32 illustrates an exemplary all terrain straddle seat vehicle.

Referring to FIG. 32, an exemplary ATV 800 is shown. ATV 800 includes front end 802, rear end 804, straddle-type seat 806, and handlebar assembly 808. Front end 802 and rear end 804 are separated by footwells 810 on both lateral sides of ATV 800 and separated by seat 806. Front end 802 is supported by front wheels 812 and tires 814 and front suspension 816. Front end 802 also includes front panel 818 which may include a tool storage compartment. Handlebar assembly 808 is operably coupled to front wheels 812 to allow an operator to steer ATV 800 when supported by seat 806 and/or footwells 810. Rear end 804 is supported by rear wheels 820, tires 822 and a rear suspension (not shown). Rear end 804 also includes rear panel 824 which may include a tool storage compartment. Front panel 818 and rear panel 824 may also include an accessory coupling system such as the one disclosed in U.S. Pat. No. 7,055,454, the disclosure of which is expressly incorporated by reference herein. Additional details regarding exemplary ATV vehicles are provided in U.S. patent application Ser. No. 12/069,511, U.S. patent application Ser. No. 12/069,515, U.S. patent application Ser. No. 12/069,521, and U.S. patent application Ser. No. 12/272,377, the disclosures of which are expressly incorporated by reference herein.

Figure 33:
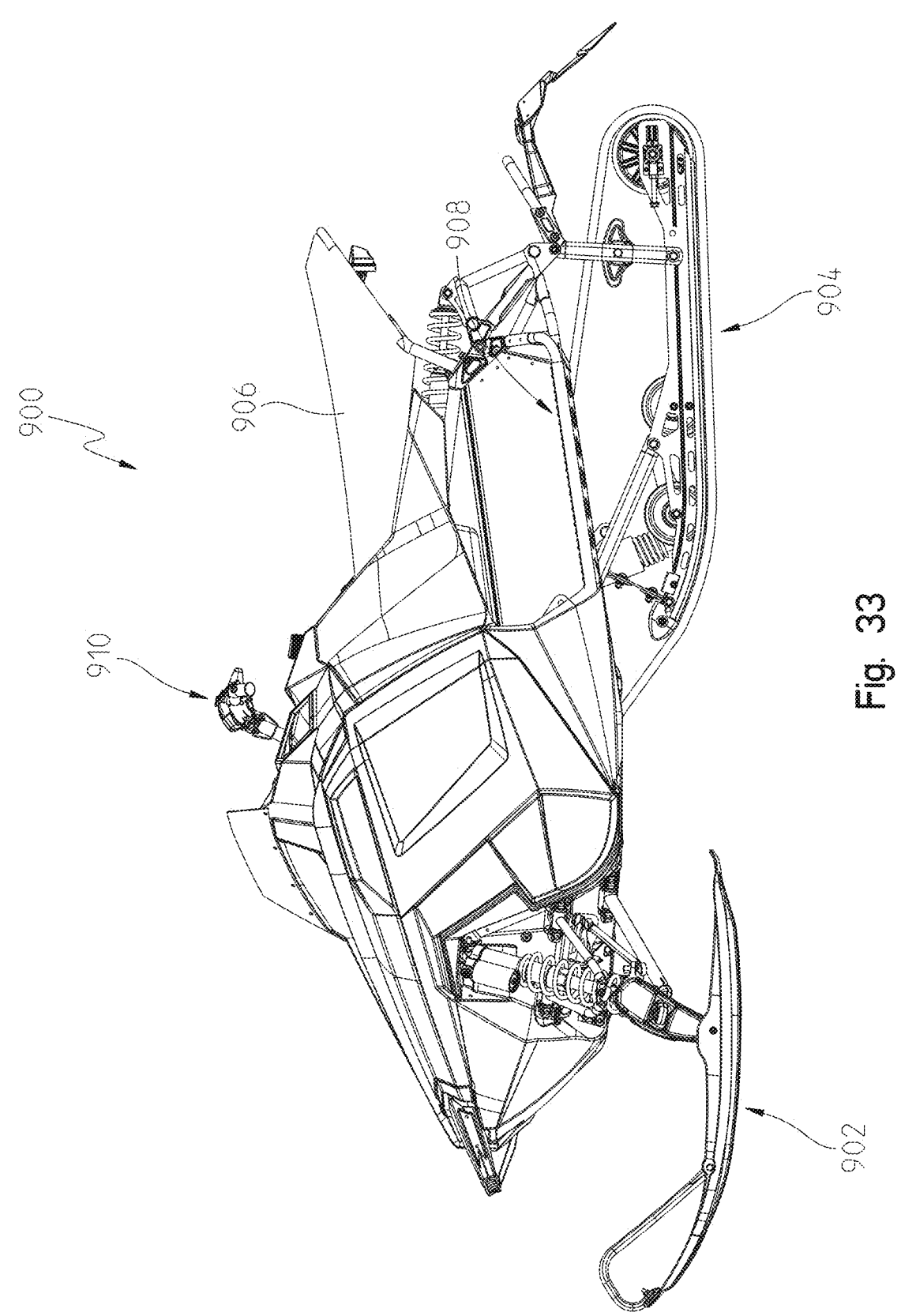
FIG. 33 illustrates an exemplary snowmobile.

Referring to FIG. 33, another exemplary vehicle, a snowmobile 900, is shown. Snowmobile 900, as illustrated, includes a pair of front skis 902 and a rear suspension 904 which is operatively coupled to a power source of snowmobile 900. snowmobile 900 further includes a handlebar assembly 910 operably coupled to skis 902 to allow an operator to steer snowmobile 900 when supported by a seat 906 and/or footwells 908. Additional details regarding exemplary snowmobiles are provided in U.S. Pat. Nos. 8,590,654 and 8,733,773, the disclosures of which are expressly incorporated by reference herein.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A continuously variable transmission ("CVT") for a vehicle, comprising:
   a drive clutch including a moveable sheave and a stationary sheave;
   a driven clutch operably coupled to the drive clutch and including a moveable sheave and a stationary sheave; and
   a housing generally surrounding the drive and driven clutches and including an inner cover and an outer cover, and the outer cover includes a channel configured to initially direct air toward the drive clutch independent of the driven clutch;
   wherein the channel is configured to direct air towards the stationary sheave of the drive clutch at a position within the inner cover.

2. The CVT of claim 1, wherein the inner cover includes a diverter member positioned adjacent the stationary sheave of the drive clutch and configured to direct air from the channel toward the stationary sheave of the drive clutch.

3. The CVT of claim 1, wherein the outer cover includes an air inlet fluidly communicating with an interior of the housing.

4. A continuously variable transmission ("CVT") for a vehicle, comprising:
   a drive clutch including a moveable sheave and a stationary sheave;
   a driven clutch operably coupled to the drive clutch and including a moveable sheave and a stationary sheave;

a housing generally surrounding the drive and driven clutches and including an inner cover and an outer cover, the outer cover defining an air supply opening, and the outer cover defining a first channel configured to direct air toward the drive clutch from the air supply opening and a second channel configured to direct air toward the driven clutch from the air supply opening; wherein the driven clutch defines a plurality of fins to direct airflow from the second channel.

5. The CVT of claim 4, further comprising an air diverter coupled to the outer cover, wherein the first channel is defined between a first portion of the air diverter and the outer cover and the second channel is defined between a second portion of the air diverter and the outer cover.

6. The CVT of claim 5, wherein a third portion of the air diverter defines a third channel, the third channel configured to direct air along an upper surface of the housing.

7. The CVT of claim 6, wherein the inner cover defines a fourth channel and a fifth channel, and the third channel is configured to direct air into the fourth channel and the fifth channel.

8. The CVT of claim 7, wherein the fourth channel is configured to direct air toward the drive clutch and the fifth channel is configured to direct air toward the driven clutch.

9. The CVT of claim 8, wherein the first channel is configured to direct air toward a moveable sheave of the drive clutch, the second channel is configured to direct air toward a moveable sheave of the driven clutch, the fourth channel is configured to direct air toward a stationary sheave of the drive clutch, and the fifth channel is configured to direct air toward a stationary sheave of the driven clutch.

10. The CVT of claim 4, wherein the drive clutch defines a plurality of fins to direct airflow from the first channel.

* * * * *